US012603772B2

(12) United States Patent
Geng et al.

(10) Patent No.: US 12,603,772 B2
(45) Date of Patent: Apr. 14, 2026

(54) VEHICLE DIAGNOSTIC SYSTEM, METHOD, AND APPARATUS

(71) Applicant: Shenzhen Yinwang Intelligent Technologies Co., Ltd., Shenzhen (CN)

(72) Inventors: Feng Geng, Suzhou (CN); Yong Li, Darmstadt (DE); Pingping Yi, Beijing (CN); Min Li, Nanjing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 18/330,030

(22) Filed: Jun. 6, 2023

(65) Prior Publication Data

US 2023/0318823 A1 Oct. 5, 2023

Related U.S. Application Data

(63) Continuation of application No. PCT/CN2020/134589, filed on Dec. 8, 2020.

(51) Int. Cl.
| | |
|---|---|
| *H04L 9/00* | (2022.01) |
| *G07C 5/08* | (2006.01) |
| *H04L 9/08* | (2006.01) |

(52) U.S. Cl.
CPC ............ *H04L 9/088* (2013.01); *G07C 5/0808* (2013.01)

(58) Field of Classification Search
CPC ............................. H04L 9/088; G07C 5/0808
(Continued)

(56) References Cited

U.S. PATENT DOCUMENTS

2010/0211770 A1* 8/2010 Alrabady ................ G06F 21/62
                                                    709/219
2011/0320089 A1* 12/2011 Lewis ..................... H04L 67/34
                                                    380/278
(Continued)

FOREIGN PATENT DOCUMENTS

CN          108536118 A          9/2018
CN          111565182 A          8/2020

OTHER PUBLICATIONS

Robert Escherich et al., "SHE—Secure Hardware Extension Functional Specification", HIS AK Security, Apr. 1, 2019, total 53 pages.
(Continued)

*Primary Examiner* — Mahmoud S Ismail
(74) *Attorney, Agent, or Firm* — Conley Rose, P.C.

(57) ABSTRACT

The vehicle diagnostic system includes a key management system and a to-be-diagnosed unit. The key management system receives a key authorization request sent by a diagnostic device, generates a temporary key based on the key authorization request, and sends a key authorization response to the diagnostic device. The key authorization response carries the temporary key. The key management system configures the temporary key for the to-be-diagnosed unit, so that the diagnostic device and the to-be-diagnosed unit complete a diagnostic based on the temporary key and obtain a diagnostic result. The temporary key is independent of a long-term key in a vehicle. The temporary key is configured to complete the vehicle diagnostic, so that the diagnostic device can be prevented from accessing the long-term key in the vehicle as much as possible.

20 Claims, 11 Drawing Sheets

Diagnostic device

To-be-diagnosed vehicle

Electronic control unit ECU 1

Electronic control unit ECU 2

Electronic control unit ECU N

Key management system KMS

(58) Field of Classification Search
USPC ........................................................ 701/32.6
See application file for complete search history.

(56) References Cited

U.S. PATENT DOCUMENTS

| | | | | |
|---|---|---|---|---|
| 2018/0254903 A1* | 9/2018 | Bardelski | ................ | G06F 21/72 |
| 2021/0288801 A1* | 9/2021 | Kulkarni | ............... | H04L 9/0631 |
| 2021/0367930 A1* | 11/2021 | Wang | .................... | H04L 9/3268 |
| 2023/0076669 A1* | 3/2023 | Acharya | ............... | H04L 9/0816 |
| 2023/0315894 A1* | 10/2023 | Tang | ..................... | H04L 9/0894 |
| | | | | 713/193 |

OTHER PUBLICATIONS

Samuel Woo et al., "A Practical Wireless Attack on the Connected Car and Security Protocol for In-Vehicle CAN", IEEE Transactions on Intelligent Transportation Systems, vol. 16, No. 2, Apr. 2015, XP011576990, total 14 pages.

Autosar, "Specification of Secure Onboard Communication", AUTOSAR CP Release 4.4.0, Oct. 31, 2018, total 151 pages.

ISO 14229-1, "Road vehicles—Unified diagnostic services (UDS)—Part 1: Specification and requirements," Second edition, Mar. 15, 2013, total 402 pages.

Andreea-Ina Radu et al., "LeiA: A Lightweight Authentication Protocol for CAN", European Symposium on Research in Computer Security (ESORICS) (2016), total 18 pages.

Samuel Woo et al., "A Practical Security Architecture for In-Vehicle CAN-FD", IEEE Transactions on Intelligent Transportation Systems (2016) , total 14 pages.

Dennis Kengo et al., "Approaches for Secure and Efficient In-Vehicle Key Management", doi: 10.4271/2016-01-0070, SAE International Journal of Passenger Cars—Electronic and Electrical Systems (2016), total 7 pages.

Zhihong Wu et al., "Research on In-Vehicle Key Management System under Upcoming Vehicle Network Architecture", Electronics 2019, 8, 1026; doi: 10.3390/electronics8091026, Sep. 12, 2019, total 17 pages.

JH. Song et al., "The AES-CMAC Algorithm", Network Working Group, Request for Comments: 4493, Category: Informational, Jun. 2006, total 20 pages.

Hendrik Schweppe et al., "Deliverable D3.3: Secure On-Board Protocols Specification", EVITA, Jul. 15, 2011, total 149 pages.

* cited by examiner

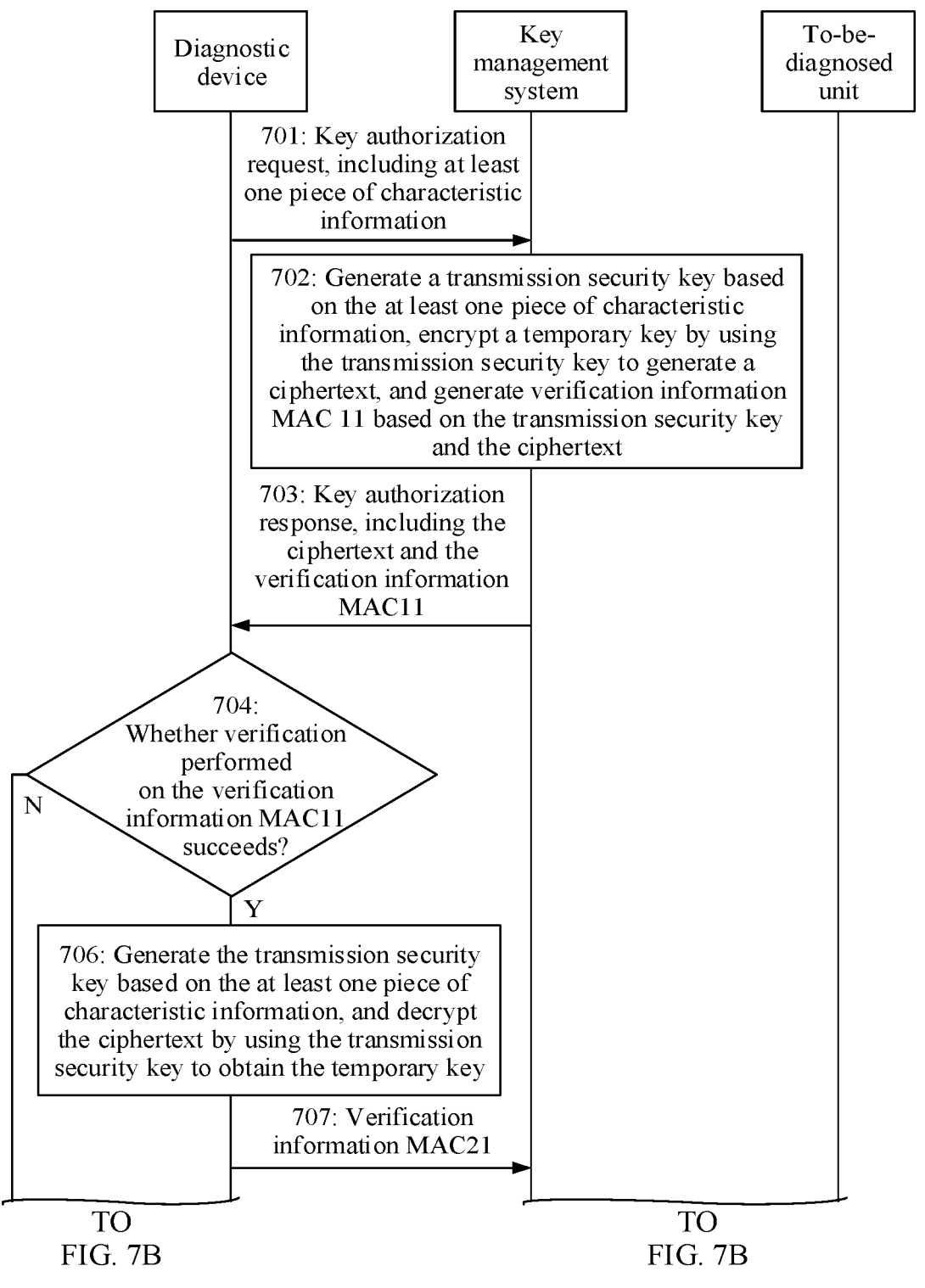

701: Key authorization request, including at least one piece of characteristic information 702: Generate a transmission security key based on the at least one piece of characteristic information, encrypt a temporary key by using the transmission security key to generate a ciphertext, and generate verification information MAC 11 based on the transmission security key and the ciphertext 703: Key authorization response, including the ciphertext and the verification information MAC11

704: Whether verification performed on the verification information MAC11 succeeds?

N

Y

706: Generate the transmission security key based on the at least one piece of characteristic information, and decrypt the ciphertext by using the transmission security key to obtain the temporary key 707: Verification information MAC21

Diagnostic device

Key management system

To-be-diagnosed unit

VEHICLE DIAGNOSTIC SYSTEM, METHOD, AND APPARATUS

CROSS-REFERENCE TO RELATED APPLICATIONS

This is a continuation of International Patent Application No. PCT/CN2020/134589 filed on Dec. 8, 2020, the disclosure of which is hereby incorporated by reference in its entirety.

TECHNICAL FIELD

This application relates to the field of Internet of vehicles technologies, and in particular, to a vehicle diagnostic system, method, and apparatus.

BACKGROUND

In the field of Internet of vehicles technologies, an authentication mechanism is set between electronic control units in a vehicle, and the authentication mechanism requires the electronic control units to interact with each other based on a key. Therefore, normally, a large quantity of keys is encapsulated in the vehicle. These keys not only include a key preset by a chip vendor before the vehicle is delivered, a key preset by a device supplier, and a key preset by an original equipment manufacturer, but also may include a vehicle owner key that is set by a vehicle owner in the vehicle after the vehicle is delivered. These keys are long-term keys. Before the vehicle is scrapped, the vehicle owner may use these long-term keys to complete vehicle operations such as vehicle control and driving and voice interaction.

Currently, all operations performed on the vehicle also need to be completed based on the long-term keys. These operations not only include a test phase before the vehicle is delivered and a use phase after the vehicle is delivered, but also include a diagnostic phase after the vehicle is faulty. This means that diagnostic personnel need to obtain the long-term keys in the vehicle before diagnosing the vehicle. However, the long-term keys should not be leaked out of the vehicle in theory. If these long-term keys are obtained by an unauthorized person, the unauthorized person can obtain privacy data (for example, driving data) of the vehicle owner by using these long-term keys, and may even control running of the vehicle by using these long-term keys, thereby affecting driving security of the vehicle owner.

In conclusion, currently, a vehicle diagnostic system is used, to avoid insecure effect caused by using the long-term key for a vehicle diagnostic.

SUMMARY

This application provides a vehicle diagnostic system, method, and apparatus, to avoid insecure effect caused by using a long-term key for a vehicle diagnostic.

According to a first aspect, this application provides a vehicle diagnostic system, including a key management system and a to-be-diagnosed unit that are located in a vehicle. When performing a diagnostic, the key management system may receive a key authorization request sent by a diagnostic device, generate a temporary key based on the key authorization request, and send a key authorization response to the diagnostic device. The key authorization response carries the temporary key. Then, the key management system may configure the temporary key for the to-be-diagnosed unit, so that the diagnostic device decrypts, by using the temporary key, a diagnostic request sent by the diagnostic device to obtain to-be-diagnosed information, completes the diagnostic based on the to-be-diagnosed information, and sends a diagnostic result to the diagnostic device. The temporary key is independent of a long-term key in the vehicle. In the design, the temporary key is configured to complete the vehicle diagnostic, so that the diagnostic device can be prevented from accessing the long-term key in the vehicle as much as possible. This not only helps protect privacy data of a vehicle owner, but also reduces a possibility that an unauthorized person uses the long-term key to control vehicle running, thereby improving driving security of the vehicle owner.

In a possible design, the vehicle diagnostic system may further include the diagnostic device. The diagnostic device may send the key authorization request to the key management system; receive the key authorization response sent by the key management system; encrypt the to-be-diagnosed information by using the temporary key carried in the key authorization response, to generate the diagnostic request; send the diagnostic request to the to-be-diagnosed unit; and then receive the diagnostic result sent by the to-be-diagnosed unit. In the design, a three-party interaction process between the diagnostic device, the key management system, and the to-be-diagnosed unit is used, so that the three parties can accurately learn which phase the diagnostic is currently in, so as to complete the current diagnostic in a collaborative manner. In addition, in this manner, the diagnostic device triggers the key management system to generate the temporary key, and the temporary key can be generated only when the diagnostic needs to be performed. This helps reduce processing resources. Further, in this design, the to-be-diagnosed information is transmitted between the diagnostic device and the to-be-diagnosed unit in a temporary key encryption manner. This can prevent the diagnostic device from obtaining the long-term key in the vehicle, maintain driving security of the vehicle owner, and can further avoid hijacking of the to-be-diagnosed information in the transmission process, thereby improving vehicle diagnostic security.

In a possible design, the temporary key may further correspond to validity duration, and the validity duration corresponding to the temporary key may be pre-configured, or may be indicated by the key authorization request, or may correspond to a time period between a diagnostic start and a diagnostic end. In this design, diagnostic duration may further be flexibly configured, thereby helping improve flexibility of a diagnostic operation.

In a possible design, after initiating the diagnostic operation on the to-be-diagnosed unit by using the temporary key, the diagnostic device may further send a security heartbeat message to the key management system based on preset period duration within the validity duration corresponding to the temporary key. Correspondingly, if the key management system receives, within the preset period duration, the security heartbeat message sent by the diagnostic device, the key management system may continue to make the temporary key in the to-be-diagnosed unit effective. If the key management system does not receive, within the preset period duration, the security heartbeat message sent by the diagnostic device, the key management system may make the temporary key in the to-be-diagnosed unit ineffective. This design not only supports the diagnostic device in setting the validity duration corresponding to the temporary key based on a diagnostic requirement of the diagnostic device, but also enables, through interaction of the security heartbeat message, the key management system to manage each temporary key more conveniently and flexibly.

In a possible design, before sending the security heartbeat message to the key management system based on the preset period duration, the diagnostic device may further generate first verification information by using at least one piece of characteristic information used when the temporary key is generated, and generate the security heartbeat message based on the first verification information. Correspondingly, after receiving, within the preset period duration, the security heartbeat message sent by the diagnostic device, the key management system may further generate second verification information based on the at least one piece of characteristic information used when the temporary key is generated. If it is determined that the second verification information matches the first verification information, the temporary key may continue to be effective. The at least one piece of characteristic information may include at least one of an initial key, a feature identifier, a first random value, or a second random value that is preset. The feature identifier indicates the to-be-diagnosed unit, the first random value is generated by the diagnostic device and sent to the key management system, and the second random value is generated by the key management system and sent to the diagnostic device. In this design, the at least one piece of characteristic information used for generating the temporary key is used to generate verification information carried in the security heartbeat message, so that the security heartbeat message is bound to the temporary key (or a diagnostic session corresponding to the temporary key). The security heartbeat message bound to the temporary key is used to maintain the diagnostic session corresponding to the temporary key, so that the key management system can accurately manage each temporary key.

In a possible design, the second verification information may meet the following formula:

$$MAC32=HMAC(macKey,Hash(ID\|Nonce1\|Nonce2)),$$

where MAC32 is the second verification information, HMAC is a hash-based message authentication code generation function, macKey is a symmetric key derived based on the preset initial key, ID is the feature identifier, Nonce1 is the first random value, and Nonce2 is the second random value.

In a possible design, after configuring the temporary key for the to-be-diagnosed unit, the key management system may further make the temporary key in the to-be-diagnosed unit ineffective after validity duration corresponding to the temporary key expires. In this design, the key management system may independently monitor validity duration of each temporary key, without participation of the diagnostic device, thereby reducing working pressure of the diagnostic device.

In a possible design, the temporary key may further correspond to an application scope, and the application scope corresponding to the temporary key indicates the to-be-diagnosed unit. The application scope corresponding to the temporary key may be pre-configured, or may be indicated by the key authorization request. In this design, the to-be-diagnosed unit applicable to the current diagnostic may further be flexibly configured, thereby helping further improve flexibility of the diagnostic operation.

In a possible design, the to-be-diagnosed unit may be all to-be-diagnosed units in the current diagnostic. In this way, the temporary key may be synchronously configured for all the to-be-diagnosed units in the current diagnostic, and there is no need to configure an independent temporary key for each to-be-diagnosed unit. This not only helps reduce a quantity of temporary keys that need to be maintained by the key management system and reduce processing resources, but also reduces complexity of the current diagnostic by using the same temporary key and improves diagnostic efficiency.

In a possible design, the key authorization request may include at least one piece of characteristic information, for example, at least one of the first random value, the feature identifier, or an authorization code. The first random value is generated by the diagnostic device, the feature identifier indicates the to-be-diagnosed unit, and the authorization code indicates the diagnostic device. In this case, before sending the key authorization response to the diagnostic device, the key management system may further encrypt the at least one piece of characteristic information by using a first symmetric key to generate a transmission security key, encrypt the temporary key by using the transmission security key to generate a ciphertext, and generate the key authorization response based on the ciphertext. Correspondingly, after receiving the key authorization response sent by the key management system, the diagnostic device may further encrypt the at least one piece of characteristic information by using the first symmetric key to generate the transmission security key, and decrypt the ciphertext by using the transmission security key to obtain the temporary key. In this design, the temporary key is sent to the diagnostic device in an encrypted ciphertext manner. Regardless of whether the diagnostic device is outside the vehicle or is directly encapsulated in the vehicle, this manner can maximally prevent the temporary key from being tampered with in the transmission process, thereby helping the diagnostic device receive the correct temporary key.

In a possible design, before sending the key authorization response, the key management system may further derive a second symmetric key based on the first symmetric key, encrypt the ciphertext and the at least one piece of characteristic information by using the second symmetric key to generate third verification information, and then generate the key authorization response based on the third verification information and the ciphertext. Correspondingly, after receiving the key authorization response, the diagnostic device may further first derive the second symmetric key based on the first symmetric key, then encrypt the ciphertext and the at least one piece of characteristic information in the key authorization response by using the second symmetric key to generate sixth verification information, and when determining that the sixth verification information is the same as the third verification information, decrypt the ciphertext to obtain the temporary key. In this design, verification information is further set to verify authenticity of ciphertext transmission. Therefore, even if the temporary key is tampered with in the transmission process, this manner can prevent, as much as possible, the diagnostic device from obtaining the tampered temporary key to perform a diagnostic, thereby effectively protecting vehicle diagnostic security.

In a possible design, after decrypting the ciphertext to obtain the temporary key, the diagnostic device may further generate fourth verification information based on one or more of the ciphertext, the third verification information, and the at least one piece of characteristic information, and send the fourth verification information to the key management system. Correspondingly, after receiving the fourth verification information, the key management system may further generate fifth verification information by using one or more of the ciphertext, the third verification information, and the at least one piece of characteristic information. If the fourth verification information matches the fifth verification information, the temporary key may be configured for the to-be-diagnosed unit in the vehicle. In this design, whether the temporary key received by the diagnostic device is correct is verified before the key management system configures the temporary key. This helps the key management system detect a tampering phenomenon in a process of delivering the temporary key. In this way, the key management system may configure the temporary key for the to-be-diagnosed unit only when the diagnostic device receives the correct temporary key. This helps ensure security of performing the diagnostic based on the temporary key.

In a possible design, the transmission security key may meet the following formula:

$$tK=HKDF(AK, ID\|Nonce1\|Nonce2\|string``TransportKey"),$$

where tK is the transmission security key, flash-Based Key Derivation Functions (HKDF) is a hash-based message authentication code-based key derivation function, authentication key (AK) is the first symmetric key, identifier (ID) is the feature identifier, Nonce1 is the first random value, Nonce2 is the second random value, the second random value is generated by the key management system, and "TransportKey" is a character string corresponding to the "transmission security key".

Further, the ciphertext may meet the following formula:

$$C=AES-GCM(tK,\{M\}),$$

where C is the ciphertext, AES-GCM is an Advanced Encryption Standard (AES) symmetric encryption algorithm that uses a counting mode and carries a Galois message authentication code (GMAC), and $\{M\}$ is the temporary key.

In a possible design, the second symmetric key may meet the following formula:

$$macKey=HKDF(AK, ID\|Nonce1\|Nonce2\|string``MAC"),$$

where macKey is the second symmetric key, HKDF is the hash-based message authentication code-based key derivation function, AK is the first symmetric key, ID is the feature identifier, Nonce1 is the first random value, Nonce2 is the second random value, the second random value is generated by the key management system, and MAC is the authorization code.

Further, the third verification information may meet the following formula:

$$MAC11=HKDF(macKey,Hash (ID\|Nonce1\|Nonce2\|C)),$$

where MAC11 is the third verification information, C is the ciphertext, and Hash is a hash function.

In a possible design, the fifth verification information may meet the following formula:

$$MAC22=HMAC(macKey,Hash (ID\|Nonce1\|Nonce2\|C\|MAC11)),$$

where MAC22 is the fifth verification information, HMAC is the hash-based message authentication code generation function, macKey is the second symmetric key, Hash is the hash function, ID is the feature identifier, Nonce1 is the first random value, Nonce2 is the second random value, the second random value is generated by the key management system, C is the ciphertext, and MAC11 is the third verification information.

According to a second aspect, this application provides a vehicle diagnostic method. The method is applicable to a key management system in a vehicle. The method includes that the key management system receives a key authorization request sent by a diagnostic device, generates a temporary key based on the key authorization request, and sends a key authorization response to the diagnostic device. The key authorization response carries the temporary key. Then, the key management system may configure the temporary key for a to-be-diagnosed unit in the vehicle, so that the diagnostic device and the to-be-diagnosed unit complete a diagnostic based on the temporary key. The temporary key is independent of a long-term key in the vehicle.

In a possible design, the temporary key may further correspond to validity duration, and the validity duration corresponding to the temporary key may be pre-configured, or may be indicated by the key authorization request, or may correspond to a time period between a diagnostic start and a diagnostic end.

In a possible design, after sending the key authorization response to the diagnostic device, the key management system may further wait for receiving a security heartbeat message sent by the diagnostic device. If the security heartbeat message sent by the diagnostic device is not received within preset period duration, the temporary key in the to-be-diagnosed unit may be ineffective. The security heartbeat message is periodically sent by the diagnostic device to the key management system within the validity duration corresponding to the temporary key.

In a possible design, the security heartbeat message may include first verification information, and the first verification information is generated based on at least one piece of characteristic information used when the temporary key is generated. The at least one piece of characteristic information includes at least one of an initial key, a feature identifier, a first random value, or a second random value that is preset. The feature identifier indicates the to-be-diagnosed unit, the first random value is generated by the diagnostic device and sent to the key management system, and the second random value is generated by the key management system and sent to the diagnostic device. In this case, when the key management system receives, within the preset period duration, the security heartbeat message sent by the diagnostic device, the key management system may further generate second verification information based on the at least one piece of characteristic information used when the temporary key is generated, and may continue to make the temporary key effective when determining that the second verification information matches the first verification information.

In a possible design, the second verification information may meet the following formula:

$$MAC32=HMAC(macKey,Hash (ID\|Nonce1\|Nonce2)),$$

where MAC32 is the second verification information, HMAC is a hash-based message authentication code generation function, macKey is a symmetric key derived based on the preset initial key, ID is the feature identifier, Nonce1 is the first random value, and Nonce2 is the second random value.

In a possible design, after configuring the temporary key for the to-be-diagnosed unit in the vehicle, the key management system may further make the temporary key in the to-be-diagnosed unit ineffective after validity duration corresponding to the temporary key expires.

In a possible design, the temporary key may further correspond to an application scope, and the application scope corresponding to the temporary key indicates the to-be-diagnosed unit. The application scope corresponding to the temporary key may be pre-configured, or may be indicated by the key authorization request.

In a possible design, that the key management system configures the temporary key for the to-be-diagnosed unit in the vehicle includes that the key management system configures the temporary key for each to-be-diagnosed unit used for the current diagnostic.

In a possible design, the key authorization request may include at least one piece of characteristic information, and the at least one piece of characteristic information includes at least one of the first random value, the feature identifier, or an authorization code. The first random value is generated by the diagnostic device, the feature identifier indicates the to-be-diagnosed unit, and the authorization code indicates the diagnostic device. In this case, before sending the key authorization response to the diagnostic device, the key management system may further first encrypt the at least one piece of characteristic information by using a first symmetric key to generate a transmission security key, then encrypt the temporary key by using the transmission security key to generate a ciphertext, and finally generate the key authorization response based on the ciphertext. The ciphertext is used by the diagnostic device to perform decryption by using the transmission security key to obtain the temporary key.

In a possible design, that the key management system generates the key authorization response based on the ciphertext includes: The key management system first encrypts the ciphertext and the at least one piece of characteristic information by using a second symmetric key to generate third verification information, and then generates the key authorization response based on the third verification information and the ciphertext. The second symmetric key is a symmetric key derived based on the first symmetric key, and the third verification information is used by the diagnostic device to perform verification before the ciphertext is decrypted.

In a possible design, after sending the key authorization response to the diagnostic device and before configuring the temporary key for the to-be-diagnosed unit in the vehicle, the key management system may further receive fourth verification information sent by the diagnostic device, generate fifth verification information by using one or more of the ciphertext, the third verification information, and the at least one piece of characteristic information, and determine that the fourth verification information matches the fifth verification information. The fourth verification information is generated based on one or more of the ciphertext, the third verification information, and the at least one piece of characteristic information.

In a possible design, the transmission security key may meet the following formula:

$$tK=HKDF(AK,\ ID\|Nonce1\|Nonce2\|string``TransportKey"),$$

where tK is the transmission security key, HKDF is a hash-based message authentication code-based key derivation function, AK is the first symmetric key, ID is the feature identifier, Nonce1 is the first random value, Nonce2 is the second random value, the second random value is generated by the key management system, and "TransportKey" is a character string corresponding to the "transmission security key".

Further, the ciphertext may meet the following formula:

$$C=AES\text{-}GCM(tK,\{M\}),$$

where C is the ciphertext, AES-GCM is an AES symmetric encryption algorithm that uses a counting mode and carries a Galois message authentication code, and $\{M\}$ is the temporary key.

In a possible design, the second symmetric key may meet the following formula:

$$macKey=HKDF(AK,\ ID\|Nonce1\|Nonce2\|string``MAC"),$$

where macKey is the second symmetric key, HKDF is the hash-based message authentication code-based key derivation function, AK is the first symmetric key, ID is the feature identifier, Nonce1 is the first random value, Nonce2 is the second random value, the second random value is generated by the key management system, and MAC is the authorization code.

Further, the third verification information may meet the following formula:

$$MAC11=HKDF(macKey,Hash\ (ID\|Nonce1\|Nonce2\|C)),$$

where MAC11 is the third verification information, C is the ciphertext, and Hash is a hash function.

In a possible design, the fifth verification information may meet the following formula:

$$MAC22=HMAC(macKey,Hash\ (ID\|Nonce1\|Nonce2\|C\|MAC11)),$$

where MAC22 is the fifth verification information, HMAC is the hash-based message authentication code generation function, macKey is the second symmetric key, Hash is the hash function, ID is the feature identifier, Nonce1 is the first random value, Nonce2 is the second random value, the second random value is generated by the key management system, C is the ciphertext, and MAC11 is the third verification information.

According to a third aspect, this application provides a vehicle diagnostic method. The method is applicable to a diagnostic device, and the method includes: The diagnostic device sends a key authorization request to a key management system in a vehicle, so that the key management system generates a temporary key based on the key authorization request and configures the temporary key for a to-be-diagnosed unit in the vehicle. The temporary key is independent of a long-term key in the vehicle. Then, the diagnostic device receives a key authorization response sent by the key management system, where the key authorization response includes the temporary key, and the diagnostic device initiates a diagnostic operation on the to-be-diagnosed unit by using the temporary key.

In a possible design, that the diagnostic device initiates a diagnostic operation on the to-be-diagnosed unit by using the temporary key includes: The diagnostic device first encrypts to-be-diagnosed information by using the temporary key to generate a diagnostic request, sends the diagnostic request to the to-be-diagnosed unit, and then receives a diagnostic result sent by the to-be-diagnosed unit. The diagnostic request is used by the to-be-diagnosed unit configured with the temporary key to obtain the diagnostic result based on the to-be-diagnosed information carried in the diagnostic request.

In a possible design, the temporary key may further correspond to validity duration, and the validity duration corresponding to the temporary key may be pre-configured, or may be indicated by the key authorization request, or may correspond to a time period between a diagnostic start and a diagnostic end.

In a possible design, after sending the diagnostic request to the to-be-diagnosed unit and before receiving the diagnostic result sent by the to-be-diagnosed unit, the diagnostic device may further send a security heartbeat message to the key management system based on preset period duration within the validity duration corresponding to the temporary key, so that the key management system continues to make the temporary key effective based on the security heartbeat message.

In a possible design, before sending the security heartbeat message to the key management system based on the preset period duration within the validity duration corresponding to the temporary key, the diagnostic device may further generate first verification information by using at least one piece of characteristic information used when the temporary key is generated, and generate the security heartbeat message based on the first verification information, so that the key management system verifies the security heartbeat message based on the first verification information before continuing to make the temporary key effective.

In a possible design, the at least one piece of characteristic information may include at least one of an initial key, a feature identifier, a first random value, or a second random value that is preset. The feature identifier indicates the to-be-diagnosed unit, the first random value is generated by the diagnostic device and sent to the key management system, and the second random value is generated by the key management system and sent to the diagnostic device. In this case, the first verification information may meet the following formula:

$$MAC31=HMAC(macKey,Hash$$
$$(ID\|Nonce1\|Nonce2)),$$

where MAC32 is the first verification information, HMAC is a hash-based message authentication code generation function, macKey is a symmetric key derived based on the preset initial key, ID is the feature identifier, Nonce1 is the first random value, and Nonce2 is the second random value.

In a possible design, the temporary key may further correspond to an application scope, and the application scope corresponding to the temporary key indicates the to-be-diagnosed unit. The application scope corresponding to the temporary key may be pre-configured, or may be indicated by the key authorization request.

In a possible design, the to-be-diagnosed unit may be all to-be-diagnosed units in a current diagnostic.

In a possible design, the key authorization response may include a ciphertext, the ciphertext is obtained by the key management system by encrypting the temporary key based on a transmission security key, and the transmission security key is obtained by the key management system by encrypting at least one piece of characteristic information based on a first symmetric key. The at least one piece of characteristic information is carried in the key authorization request and sent to the key management system. The at least one piece of characteristic information includes at least one of the first random value, the feature identifier, or an authorization code. The first random value is generated by the diagnostic device, the feature identifier indicates the to-be-diagnosed unit, and the authorization code indicates the diagnostic device. In this case, after receiving the key authorization response sent by the key management system, the diagnostic device may further encrypt the at least one piece of characteristic information by using the first symmetric key to generate the transmission security key, and decrypt the ciphertext by using the transmission security key to obtain the temporary key.

In a possible design, the key authorization response may further include third verification information, the third verification information is obtained by the key management system by encrypting the ciphertext and the at least one piece of characteristic information based on a second symmetric key, and the second symmetric key is a symmetric key derived based on the first symmetric key. In this case, before encrypting the at least one piece of characteristic information by using the first symmetric key to generate the transmission security key, the diagnostic device may further derive the second symmetric key based on the first symmetric key, encrypt the ciphertext and the at least one piece of characteristic information by using the second symmetric key to obtain sixth verification information, and determine that the sixth verification information matches the third verification information.

In a possible design, after decrypting the ciphertext by using the transmission security key to obtain the temporary key, the diagnostic device may further generate fourth verification information based on one or more of the ciphertext, the third verification information, and the at least one piece of characteristic information, and send the fourth verification information to the key management system, so that the key management system verifies the fourth verification information before configuring the temporary key.

In a possible design, the transmission security key may meet the following formula:

$$tK=HKDF(AK,$$
$$ID\|Nonce1\|Nonce2\|string"TransportKey"),$$

where tK is the transmission security key, HKDF is a hash-based message authentication code-based key derivation function, AK is the first symmetric key, ID is the feature identifier, Nonce1 is the first random value, Nonce2 is the second random value, the second random value is generated by the key management system, and "TransportKey" is a character string corresponding to the "transmission security key".

Further, the ciphertext may meet the following formula:

$$C=AES\text{-}GCM(tK,\{M\}),$$

where C is the ciphertext, AES-GCM is an AES symmetric encryption algorithm that uses a counting mode and carries a Galois message authentication code, and {M} is the temporary key.

In a possible design, the second symmetric key may meet the following formula:

$$macKey=HKDF(AK,$$
$$ID\|Nonce1\|Nonce2\|string"MAC"), where$$

macKey is the second symmetric key, HKDF is the hash-based message authentication code-based key derivation function, AK is the first symmetric key, ID is the feature identifier, Nonce1 is the first random value, Nonce2 is the second random value, the second random value is generated by the key management system, and MAC is the authorization code.

Further, the sixth verification information may meet the following formula:

$$MAC12=HKDF(macKey,Hash$$
$$(ID\|Nonce1\|Nonce2\|C)),$$

where MAC12 is the fourth verification information, C is the ciphertext, and Hash is a hash function.

In a possible design, the fourth verification information may meet the following formula:

$$MAC21=HMAC(macKey,Hash$$
$$(ID\|Nonce1\|Nonce2\|C\|MAC11)),$$

where MAC21 is the fourth verification information, HMAC is the hash-based message authentication code generation function, macKey is the second symmetric key, Hash is the hash function, ID is the feature identifier, Nonce1 is the first random value, Nonce2 is the second random value, the second random value is generated by the key management system, C is the ciphertext, and MAC11 is the third verification information.

According to a fourth aspect, this application provides a vehicle diagnostic method. The method is applicable to a to-be-diagnosed unit in a vehicle, and the method includes: The to-be-diagnosed unit obtains a temporary key, receives a diagnostic request sent by a diagnostic device, and decrypts the diagnostic request by using the temporary key to complete a diagnostic. The diagnostic request is generated by the temporary key encrypted information, and the temporary key is independent of a long-term key in the vehicle.

In a possible design, that the to-be-diagnosed unit in the vehicle obtains the temporary key includes: The to-be-diagnosed unit receives temporary key effective information sent by a key management system in the vehicle, and stores, in a random-access memory (RAM) based on the temporary key effective information, the temporary key carried in the temporary key effective information. In this way, because the RAM has a feature of data loss after power-off, if a diagnostic fault is found in the diagnostic process or the diagnostic is not expected to continue due to another reason, even if the validity duration of the temporary key corresponding to the current diagnostic does not expire, the to-be-diagnosed unit may lose the temporary key corresponding to the current diagnostic in a manner of powering off the vehicle, so as to make the temporary key ineffective.

In a possible design, after obtaining the temporary key, the to-be-diagnosed unit may further receive temporary key ineffective information sent by the key management system in the vehicle, and delete, based on the temporary key ineffective information, the temporary key stored in the RAM.

According to a fifth aspect, this application provides a vehicle diagnostic system, including a diagnostic device and a to-be-diagnosed unit. The to-be-diagnosed unit may be located in a vehicle, and the diagnostic device is connected to the to-be-diagnosed unit. When performing a diagnostic, the diagnostic device may send a key authorization request to the to-be-diagnosed unit. After receiving the key authorization request, the to-be-diagnosed unit may generate a temporary key and send a key authorization response to the diagnostic device. The key authorization response carries the temporary key. After receiving the key authorization response, the diagnostic device may initiate a diagnostic operation on the to-be-diagnosed unit by using the temporary key carried in the key authorization response, and the to-be-diagnosed unit may complete the diagnostic based on the temporary key. The temporary key is independent of a long-term key in the vehicle. In the design, the diagnostic operation between the to-be-diagnosed unit and the diagnostic device can be completed in a manner of generating the temporary key by the to-be-diagnosed unit, and participation of another component in the vehicle may not involve. In this way, normal operation of the another component in the vehicle can be not affected as much as possible, and complexity of a diagnostic process can be reduced in a two-party interaction manner.

In a possible design, the to-be-diagnosed unit may further generate, for another to-be-diagnosed unit in the vehicle, a temporary key used by the diagnostic device to diagnose the another to-be-diagnosed unit. In this way, in this manner, one or more to-be-diagnosed units may also manage a temporary key of another diagnostic unit. Therefore, the diagnostic device may obtain a temporary key of each to-be-diagnosed unit by communicating and interacting with the one or more to-be-diagnosed units, and may not need to interact with each to-be-diagnosed unit to obtain the temporary key.

In a possible design, after receiving the key authorization response, the diagnostic device may encrypt to-be-diagnosed information by using the temporary key carried in the key authorization response, to generate a diagnostic request, and send the diagnostic request to the to-be-diagnosed unit. Correspondingly, after receiving the diagnostic request, the to-be-diagnosed unit may decrypt the diagnostic request by using the temporary key to obtain the to-be-diagnosed information, perform the diagnostic operation based on the to-be-diagnosed information to obtain a diagnostic result, and send the diagnostic result to the diagnostic device.

In a possible design, the temporary key may further correspond to validity duration, and the validity duration corresponding to the temporary key may be pre-configured, or may be indicated by the key authorization request, or may correspond to a time period between a diagnostic start and a diagnostic end.

In a possible design, after the diagnostic device initiates the diagnostic operation on the to-be-diagnosed unit by using the temporary key, the diagnostic device may further send a security heartbeat message to the to-be-diagnosed unit based on preset period duration within validity duration corresponding to the temporary key. If the to-be-diagnosed unit receives, within the preset period duration, the security heartbeat message sent by the diagnostic device, the to-be-diagnosed unit may continue to make the temporary key in the to-be-diagnosed unit effective. If the to-be-diagnosed unit does not receive, within the preset period duration, the security heartbeat message sent by the diagnostic unit, the to-be-diagnosed unit may make the temporary key in the to-be-diagnosed unit ineffective.

In a possible design, before sending the security heartbeat message to the to-be-diagnosed unit based on the preset period duration, the diagnostic device may further generate first verification information by using at least one piece of characteristic information used when the temporary key is generated, and generate the security heartbeat message based on the first verification information. Correspondingly, after receiving, within the preset period duration, the security heartbeat message sent by the diagnostic device, the to-be-diagnosed unit may further generate second verification information based on the at least one piece of characteristic information used when the temporary key is generated. If it is determined that the second verification information matches the first verification information, the temporary key may continue to be effective. The at least one piece of characteristic information may include at least one of an initial key, a feature identifier, a first random value, or a second random value that is preset. The feature identifier indicates the to-be-diagnosed unit, the first random value is generated by the diagnostic device and sent to the to-be-diagnosed unit, and the second random value is generated by the to-be-diagnosed unit and sent to the diagnostic device.

In a possible design, the second verification information may meet the following formula:

$$MAC32 = HMAC(macKey, Hash(ID\|Nonce1\|Nonce2)),$$

where MAC32 is the second verification information, HMAC is a hash-based message authentication code generation function, macKey is a symmetric key derived based on the preset initial key, ID is the feature identifier, Nonce1 is the first random value, and Nonce2 is the second random value.

In a possible design, after generating the temporary key and making a configuration of the temporary key effective, the to-be-diagnosed unit may further make the temporary key ineffective after validity duration corresponding to the temporary key expires.

In a possible design, the temporary key may further correspond to an application scope, and the application scope corresponding to the temporary key indicates the to-be-diagnosed unit. The application scope corresponding to the temporary key may be pre-configured, or may be indicated by the key authorization request.

In a possible design, the to-be-diagnosed unit may be all to-be-diagnosed units in the current diagnostic.

In a possible design, the key authorization request may include at least one piece of characteristic information, for example, at least one of the first random value, the feature identifier, or an authorization code. The first random value is generated by the diagnostic device, the feature identifier indicates the to-be-diagnosed unit, and the authorization code indicates the diagnostic device. In this case, before sending the key authorization response to the diagnostic device, the to-be-diagnosed unit may further encrypt the at least one piece of characteristic information by using a first symmetric key to generate a transmission security key, encrypt the temporary key by using the transmission security key to generate a ciphertext, and generate the key authorization response based on the ciphertext. Correspondingly, after receiving the key authorization response sent by the to-be-diagnosed unit, the diagnostic device may further encrypt the at least one piece of characteristic information by using the first symmetric key to generate the transmission security key, and decrypt the ciphertext by using the transmission security key to obtain the temporary key.

In a possible design, before sending the key authorization response, the to-be-diagnosed unit may further derive a second symmetric key based on the first symmetric key, encrypt the ciphertext and the at least one piece of characteristic information by using the second symmetric key to generate third verification information, and then generate the key authorization response based on the third verification information and the ciphertext. Correspondingly, after receiving the key authorization response, the diagnostic device may further first derive the second symmetric key based on the first symmetric key, then encrypt the ciphertext and the at least one piece of characteristic information in the key authorization response by using the second symmetric key to generate sixth verification information, and when determining that the sixth verification information is the same as the third verification information, decrypt the ciphertext to obtain the temporary key.

In a possible design, after decrypting the ciphertext to obtain the temporary key, the diagnostic device may further generate fourth verification information based on one or more of the ciphertext, the third verification information, and the at least one piece of characteristic information, and send the fourth verification information to the to-be-diagnosed unit. Correspondingly, after receiving the fourth verification information, the to-be-diagnosed unit may further generate fifth verification information by using one or more of the ciphertext, the third verification information, and the at least one piece of characteristic information. If the fourth verification information matches the fifth verification information, the temporary key may be configured for the to-be-diagnosed unit in the vehicle.

In a possible design, the transmission security key may meet the following formula:

$$tK=HKDF(AK,\ ID\|Nonce1\|Nonce2\|string\text{``TransportKey''}),$$

where tK is the transmission security key, HKDF is a hash-based message authentication code-based key derivation function, AK is the first symmetric key, ID is the feature identifier, Nonce1 is the first random value, Nonce2 is the second random value, the second random value is generated by the to-be-diagnosed unit, and "TransportKey" is a character string corresponding to the "transmission security key".

Further, the ciphertext may meet the following formula:

$$C=AES\text{-}GCM(tK,\{M\}),$$

where C is the ciphertext, AES-GCM is an AES symmetric encryption algorithm that uses a counting mode and carries a Galois message authentication code (GMAC), and $\{M\}$ is the temporary key.

In a possible design, the second symmetric key may meet the following formula:

$$macKey=HKDF(AK,\ ID\|Nonce1\|Nonce2\|string\text{``MAC''}),$$

where macKey is the second symmetric key, HKDF is the hash-based message authentication code-based key derivation function, AK is the first symmetric key, ID is the feature identifier, Nonce1 is the first random value, Nonce2 is the second random value, the second random value is generated by the to-be-diagnosed unit, and MAC is the authorization code.

Further, the third verification information may meet the following formula:

$$MAC11=HKDF(macKey,Hash\ (ID\|Nonce1\|Nonce2\|C)),$$

where MAC11 is the third verification information, C is the ciphertext, and Hash is a hash function.

In a possible design, the fifth verification information may meet the following formula:

$$MAC22=HMAC(macKey,Hash\ (ID\|Nonce1\|Nonce2\|C\|MAC11)),$$

where MAC22 is the fifth verification information, HMAC is the hash-based message authentication code generation function, macKey is the second symmetric key, Hash is the hash function, ID is the feature identifier, Nonce1 is the first random value, Nonce2 is the second random value, the second random value is generated by the to-be-diagnosed unit, C is the ciphertext, and MAC11 is the third verification information.

According to a sixth aspect, this application provides a vehicle diagnostic method. The method is applicable to a to-be-diagnosed unit in a vehicle, and the method includes: The to-be-diagnosed unit receives a key authorization request sent by a diagnostic device, generates a temporary key based on the key authorization request, and sends a key authorization response to the diagnostic device. The key authorization response carries the temporary key. Then, the to-be-diagnosed unit may make a configuration of the temporary key effective, and complete a diagnostic based on the temporary key. The temporary key is independent of a long-term key in the vehicle.

In a possible design, the to-be-diagnosed unit may further generate, for another to-be-diagnosed unit in the vehicle, a temporary key used by the diagnostic device to diagnose the another to-be-diagnosed unit.

In a possible design, that the to-be-diagnosed unit completes the diagnostic based on the temporary key includes: The to-be-diagnosed unit receives a diagnostic request sent by the diagnostic device, decrypts the diagnostic request by using the temporary key to obtain to-be-diagnosed information, performs a diagnostic operation based on the to-be-diagnosed information to obtain a diagnostic result, and sends the diagnostic result to the diagnostic device.

In a possible design, the temporary key may further correspond to validity duration, and the validity duration corresponding to the temporary key may be pre-configured, or may be indicated by the key authorization request, or may correspond to a time period between a diagnostic start and a diagnostic end.

In a possible design, after sending the key authorization response to the diagnostic device, the to-be-diagnosed unit may further wait for receiving a security heartbeat message sent by the diagnostic device. If the security heartbeat message sent by the diagnostic device is not received within preset period duration, the temporary key may be ineffective. The security heartbeat message is periodically sent by the diagnostic device to the to-be-diagnosed unit within the validity duration corresponding to the temporary key.

In a possible design, the security heartbeat message may include first verification information, and the first verification information is generated based on at least one piece of characteristic information used when the temporary key is generated. The at least one piece of characteristic information includes at least one of an initial key, a feature identifier, a first random value, or a second random value that is preset. The feature identifier indicates the to-be-diagnosed unit, the first random value is generated by the diagnostic device and sent to the to-be-diagnosed unit, and the second random value is generated by the to-be-diagnosed unit and sent to the diagnostic device. In this case, when the to-be-diagnosed unit receives, within the preset period duration, the security heartbeat message sent by the diagnostic device, the to-be-diagnosed unit may generate second verification information based on the at least one piece of characteristic information used when the temporary key is generated, and may continue to make the temporary key effective when determining that the second verification information matches the first verification information.

In a possible design, the second verification information may meet the following formula:

$$MAC32=HMAC(macKey,Hash(ID\|Nonce1\|Nonce2)),$$

where MAC32 is the second verification information, HMAC is a hash-based message authentication code generation function, macKey is a symmetric key derived based on the preset initial key, ID is the feature identifier, Nonce1 is the first random value, and Nonce2 is the second random value.

In a possible design, after making the configuration of the temporary key effective, the to-be-diagnosed unit may further make the temporary key ineffective after validity duration corresponding to the temporary key expires.

In a possible design, the temporary key may further correspond to an application scope, and the application scope corresponding to the temporary key indicates the to-be-diagnosed unit. The application scope corresponding to the temporary key may be pre-configured, or may be indicated by the key authorization request.

In a possible design, that the to-be-diagnosed unit makes the configuration of the temporary key effective includes: The to-be-diagnosed unit configures the temporary key for each to-be-diagnosed unit used for the current diagnostic.

In a possible design, the key authorization request may include at least one piece of characteristic information, and the at least one piece of characteristic information includes at least one of the first random value, the feature identifier, or an authorization code. The first random value is generated by the diagnostic device, the feature identifier indicates the to-be-diagnosed unit, and the authorization code indicates the diagnostic device. In this case, before sending the key authorization response to the diagnostic device, the to-be-diagnosed unit may further first encrypt the at least one piece of characteristic information by using a first symmetric key to generate a transmission security key, then encrypt the temporary key by using the transmission security key to generate a ciphertext, and finally generate the key authorization response based on the ciphertext. The ciphertext is used by the diagnostic device to perform decryption by using the transmission security key to obtain the temporary key.

In a possible design, that the to-be-diagnosed unit generates the key authorization response based on the ciphertext includes: The to-be-diagnosed unit first encrypts the ciphertext and the at least one piece of characteristic information by using a second symmetric key to generate third verification information, and then generates the key authorization response based on the third verification information and the ciphertext. The second symmetric key is a symmetric key derived based on the first symmetric key, and the third verification information is used by the diagnostic device to perform verification before the ciphertext is decrypted.

In a possible design, after sending the key authorization response to the diagnostic device and before making the configuration of the temporary key effective, the to-be-diagnosed unit may further receive fourth verification information sent by the diagnostic device, generate fifth verification information by using one or more of the ciphertext, the third verification information, and the at least one piece of characteristic information, and determine that the fourth verification information matches the fifth verification information. The fourth verification information is generated based on one or more of the ciphertext, the third verification information, and the at least one piece of characteristic information.

In a possible design, the transmission security key may meet the following formula:

$$tK=HKDF(AK, ID\|Nonce1\|Nonce2\|string"TransportKey"),$$

where tK is the transmission security key, HKDF is a hash-based message authentication code-based key derivation function, AK is the first symmetric key, ID is the feature identifier, Nonce1 is the first random value, Nonce2 is the second random value, the second random value is generated by the to-be-diagnosed unit, and "TransportKey" is a character string corresponding to the "transmission security key".

Further, the ciphertext may meet the following formula:

$$C=AES\text{-}GCM(tK,\{M\}),$$

where C is the ciphertext, AES-GCM is an AES symmetric encryption algorithm that uses a counting mode and carries a Galois message authentication code, and {M} is the temporary key.

In a possible design, the second symmetric key may meet the following formula:

$$macKey=HKDF(AK,$$
$$ID\|Nonce1\|Nonce2\|string\text{"}MAC\text{"}),$$

where macKey is the second symmetric key, HKDF is the hash-based message authentication code-based key derivation function, AK is the first symmetric key, ID is the feature identifier, Nonce1 is the first random value, Nonce2 is the second random value, the second random value is generated by the to-be-diagnosed unit, and MAC is the authorization code.

Further, the third verification information may meet the following formula:

$$MAC11=HKDF(macKey,Hash$$
$$(ID\|Nonce1\|Nonce2\|C)),$$

where MAC11 is the third verification information, C is the ciphertext, and Hash is a hash function.

In a possible design, the fifth verification information may meet the following formula:

$$MAC22=HMAC(macKey,Hash$$
$$(ID\|Nonce1\|Nonce2\|C\|MAC11)),$$

where MAC22 is the fifth verification information, HMAC is the hash-based message authentication code generation function, macKey is the second symmetric key, Hash is the hash function, ID is the feature identifier, Nonce1 is the first random value, Nonce2 is the second random value, the second random value is generated by the to-be-diagnosed unit, C is the ciphertext, and MAC11 is the third verification information.

In a possible design, that the to-be-diagnosed unit makes the configuration of the temporary key effective includes: The to-be-diagnosed unit stores the temporary key in a RAM of the to-be-diagnosed unit. Correspondingly, that the to-be-diagnosed unit makes the temporary key ineffective includes: The to-be-diagnosed unit deletes the temporary key stored in the RAM.

According to a seventh aspect, this application provides a vehicle diagnostic method. The method is applicable to a diagnostic device, and the method includes: The diagnostic device sends a key authorization request to a to-be-diagnosed unit in a vehicle, so that the to-be-diagnosed unit generates a temporary key based on the key authorization request and makes a configuration of the temporary key effective. The temporary key is independent of a long-term key in the vehicle. Then, the diagnostic device receives a key authorization response sent by the to-be-diagnosed unit, where the key authorization response includes the temporary key, and the diagnostic device initiates a diagnostic operation on the to-be-diagnosed unit by using the temporary key.

In a possible design, that the diagnostic device initiates a diagnostic operation on the to-be-diagnosed unit by using the temporary key includes: The diagnostic device first encrypts to-be-diagnosed information by using the temporary key to generate a diagnostic request, sends the diagnostic request to the to-be-diagnosed unit, and then receives a diagnostic result sent by the to-be-diagnosed unit. The diagnostic request is used by the to-be-diagnosed unit to perform a diagnostic and obtain the diagnostic result based on the to-be-diagnosed information obtained by parsing the diagnostic request by using the temporary key.

In a possible design, the temporary key may further correspond to validity duration, and the validity duration corresponding to the temporary key may be pre-configured, or may be indicated by the key authorization request, or may correspond to a time period between a diagnostic start and a diagnostic end.

In a possible design, after sending the diagnostic request to the to-be-diagnosed unit and before receiving the diagnostic result sent by the to-be-diagnosed unit, the diagnostic device may further send a security heartbeat message to the to-be-diagnosed unit based on preset period duration within the validity duration corresponding to the temporary key, so that the to-be-diagnosed unit continues to make the temporary key effective based on the security heartbeat message.

In a possible design, before sending the security heartbeat message to the to-be-diagnosed unit based on the preset period duration within the validity duration corresponding to the temporary key, the diagnostic device may further generate first verification information by using at least one piece of characteristic information used when the temporary key is generated, and generate the security heartbeat message based on the first verification information, so that the to-be-diagnosed unit verifies the security heartbeat message based on the first verification information before making the temporary key effective.

In a possible design, the at least one piece of characteristic information may include at least one of an initial key, a feature identifier, a first random value, or a second random value that is preset. The feature identifier indicates the to-be-diagnosed unit, the first random value is generated by the diagnostic device and sent to the to-be-diagnosed unit, and the second random value is generated by the to-be-diagnosed unit and sent to the diagnostic device. In this case, the first verification information may meet the following formula:

$$MAC31=HMAC(macKey,Hash$$
$$(ID\|Nonce1\|Nonce2)),$$

where MAC32 is the first verification information, HMAC is a hash-based message authentication code generation function, macKey is a symmetric key derived based on the preset initial key, ID is the feature identifier, Nonce1 is the first random value, and Nonce2 is the second random value.

In a possible design, the temporary key may further correspond to an application scope, and the application scope corresponding to the temporary key indicates the to-be-diagnosed unit. The application scope corresponding to the temporary key may be pre-configured, or may be indicated by the key authorization request.

In a possible design, the key authorization response may include a ciphertext, the ciphertext is obtained by the to-be-diagnosed unit by encrypting the temporary key based on a transmission security key, and the transmission security key is obtained by the to-be-diagnosed unit by encrypting at least one piece of characteristic information based on a first symmetric key. The at least one piece of characteristic information is carried in the key authorization request and sent to the to-be-diagnosed unit. The at least one piece of characteristic information includes at least one of the first random value, the feature identifier, or an authorization code. The first random value is generated by the diagnostic device, the feature identifier indicates the to-be-diagnosed unit, and the authorization code indicates the diagnostic device. In this case, after receiving the key authorization response sent by the to-be-diagnosed unit, the diagnostic device may further encrypt the at least one piece of characteristic information by using the first symmetric key to generate the transmission security key, and decrypt the ciphertext by using the transmission security key to obtain the temporary key.

In a possible design, the key authorization response may further include third verification information, the third verification information is obtained by the to-be-diagnosed unit by encrypting the ciphertext and the at least one piece of characteristic information based on a second symmetric key, and the second symmetric key is a symmetric key derived based on the first symmetric key. In this case, before encrypting the at least one piece of characteristic information by using the first symmetric key to generate the transmission security key, the diagnostic device may further derive the second symmetric key based on the first symmetric key, encrypt the ciphertext and the at least one piece of characteristic information by using the second symmetric key to obtain sixth verification information, and determine that the sixth verification information matches the third verification information.

In a possible design, after decrypting the ciphertext by using the transmission security key to obtain the temporary key, the diagnostic device may further generate fourth verification information based on one or more of the ciphertext, the third verification information, and the at least one piece of characteristic information, and send the fourth verification information to the to-be-diagnosed unit, so that the to-be-diagnosed unit verifies the fourth verification information before making the configuration of the temporary key effective.

In a possible design, the transmission security key may meet the following formula:

$$tK=HKDF(AK,$$
$$ID\|Nonce1\|Nonce2\|string"TransportKey"),$$

where tK is the transmission security key, HKDF is a hash-based message authentication code-based key derivation function, AK is the first symmetric key, ID is the feature identifier, Nonce1 is the first random value, Nonce2 is the second random value, the second random value is generated by the to-be-diagnosed unit, and "TransportKey" is a character string corresponding to the "transmission security key".

Further, the ciphertext may meet the following formula:

$$C=AES-GCM(tK,\{M\}),$$

where C is the ciphertext, AES-GCM is an AES symmetric encryption algorithm that uses a counting mode and carries a Galois message authentication code, and {M} is the temporary key.

In a possible design, the second symmetric key may meet the following formula:

$$macKey=HKDF(AK,$$
$$ID\|Nonce1\|Nonce2\|string"MAC"),$$

where macKey is the second symmetric key, HKDF is the hash-based message authentication code-based key derivation function, AK is the first symmetric key, ID is the feature identifier, Nonce1 is the first random value, Nonce2 is the second random value, the second random value is generated by the to-be-diagnosed unit, and MAC is the authorization code.

Further, the sixth verification information may meet the following formula:

$$MAC12=HKDF(macKey,Hash$$
$$(ID\|Nonce1\|Nonce2\|C)),$$

where MAC12 is the fourth verification information, C is the ciphertext, and Hash is a hash function.

In a possible design, the fourth verification information may meet the following formula:

$$MAC21=HMAC(macKey,Hash$$
$$(ID\|Nonce1\|Nonce2\|C\|MAC11)),$$

where MAC21 is the fourth verification information, HMAC is the hash-based message authentication code generation function, macKey is the second symmetric key, Hash is the hash function, ID is the feature identifier, Nonce1 is the first random value, Nonce2 is the second random value, the second random value is generated by the to-be-diagnosed unit, C is the ciphertext, and MAC11 is the third verification information.

According to an eighth aspect, this application provides a vehicle diagnostic apparatus. The apparatus is a key management system in a vehicle. The apparatus includes: a transceiver unit configured to receive a key authorization request sent by a diagnostic device, and send a key authorization response to the diagnostic device, where the key authorization response includes a temporary key; a generation unit configured to generate the temporary key based on the key authorization request, where the temporary key is independent of a long-term key in the vehicle; and a configuration unit configured to configure the temporary key for a to-be-diagnosed unit in the vehicle, so that the diagnostic device and the to-be-diagnosed unit complete a diagnostic based on the temporary key.

In a possible design, the temporary key may further correspond to validity duration, and the validity duration corresponding to the temporary key may be pre-configured, or may be indicated by the key authorization request, or may correspond to a time period between a diagnostic start and a diagnostic end.

In a possible design, after the transceiver unit sends the key authorization response to the diagnostic device, the transceiver unit may further wait for receiving a security heartbeat message sent by the diagnostic device. If the security heartbeat message sent by the diagnostic device is not received within preset period duration, the configuration unit may make the temporary key in the to-be-diagnosed unit ineffective. The security heartbeat message is periodically sent by the diagnostic device to the key management system within the validity duration corresponding to the temporary key.

In a possible design, the security heartbeat message may include first verification information, and the first verification information is generated based on at least one piece of characteristic information used when the temporary key is generated. The at least one piece of characteristic information includes at least one of an initial key, a feature identifier, a first random value, or a second random value that is preset. The feature identifier indicates the to-be-diagnosed unit, the first random value is generated by the diagnostic device and sent to the key management system, and the second random value is generated by the key management system and sent to the diagnostic device. In this case, when the transceiver unit receives, within the preset period duration, the security heartbeat message sent by the diagnostic device, the generation unit may further generate second verification information based on the at least one piece of characteristic information used when the temporary key is generated, and the configuration unit may continue to make the temporary key effective when determining that the second verification information matches the first verification information.

In a possible design, the second verification information may meet the following formula:

$$MAC32 = HMAC(macKey, Hash(ID \| Nonce1 \| Nonce2)),$$

where MAC32 is the second verification information, HMAC is a hash-based message authentication code generation function, macKey is a symmetric key derived based on the preset initial key, ID is the feature identifier, Nonce1 is the first random value, and Nonce2 is the second random value.

In a possible design, after the configuration unit configures the temporary key for the to-be-diagnosed unit in the vehicle, the configuration unit may further make the temporary key in the to-be-diagnosed unit ineffective after validity duration corresponding to the temporary key expires.

In a possible design, the temporary key may further correspond to an application scope, and the application scope corresponding to the temporary key indicates the to-be-diagnosed unit. The application scope corresponding to the temporary key may be pre-configured, or may be indicated by the key authorization request.

In a possible design, the configuration unit is specifically configured to configure the temporary key for each to-be-diagnosed unit used for the current diagnostic.

In a possible design, the key authorization request may include at least one piece of characteristic information, and the at least one piece of characteristic information includes at least one of the first random value, the feature identifier, or an authorization code. The first random value is generated by the diagnostic device, the feature identifier indicates the to-be-diagnosed unit, and the authorization code indicates the diagnostic device. In this case, before the transceiver unit sends the key authorization response to the diagnostic device, the generation unit may further first encrypt the at least one piece of characteristic information by using a first symmetric key to generate a transmission security key, then encrypt the temporary key by using the transmission security key to generate a ciphertext, and finally generate the key authorization response based on the ciphertext. The ciphertext is used by the diagnostic device to perform decryption by using the transmission security key to obtain the temporary key.

In a possible design, the generation unit is specifically configured to: first encrypt the ciphertext and the at least one piece of characteristic information by using a second symmetric key to generate third verification information, and then generate the key authorization response based on the third verification information and the ciphertext. The second symmetric key is a symmetric key derived based on the first symmetric key, and the third verification information is used by the diagnostic device to perform verification before the ciphertext is decrypted.

In a possible design, after the transceiver unit sends the key authorization response to the diagnostic device, the transceiver unit may further receive fourth verification information sent by the diagnostic device; and the generation unit may further generate fifth verification information by using one or more of the ciphertext, the third verification information, and the at least one piece of characteristic information. If determining that the fourth verification information matches the fifth verification information, the configuration unit may configure the temporary key for the to-be-diagnosed unit in the vehicle. If determining that the fourth verification information does not match the fifth verification information, the configuration unit may not configure the temporary key for the to-be-diagnosed unit in the vehicle. The fourth verification information is generated based on one or more of the ciphertext, the third verification information, and the at least one piece of characteristic information.

In a possible design, the transmission security key may meet the following formula:

$$tK = HKDF(AK, ID \| Nonce1 \| Nonce2 \| string\text{"TransportKey"}),$$

where tK is the transmission security key, HKDF is a hash-based message authentication code-based key derivation function, AK is the first symmetric key, ID is the feature identifier, Nonce1 is the first random value, Nonce2 is the second random value, the second random value is generated by the key management system, and "TransportKey" is a character string corresponding to the "transmission security key".

Further, the ciphertext may meet the following formula:

$$C = AES\text{-}GCM(tK, \{M\}),$$

where C is the ciphertext, AES-GCM is an AES symmetric encryption algorithm that uses a counting mode and carries a Galois message authentication code, and $\{M\}$ is the temporary key.

In a possible design, the second symmetric key may meet the following formula:

$$macKey = HKDF(AK, ID \| Nonce1 \| Nonce2 \| string\text{"MAC"}),$$

where macKey is the second symmetric key, HKDF is the hash-based message authentication code-based key derivation function, AK is the first symmetric key, ID is the feature identifier, Nonce1 is the first random value, Nonce2 is the second random value, the second random value is generated by the key management system, and MAC is the authorization code.

Further, the third verification information may meet the following formula:

$$MAC11 = HKDF(macKey, Hash(ID \| Nonce1 \| Nonce2 \| C)),$$

where MAC11 is the third verification information, C is the ciphertext, and Hash is a hash function.

In a possible design, the fifth verification information may meet the following formula:

$$MAC22 = HMAC(macKey, Hash(ID \| Nonce1 \| Nonce2 \| C \| MAC11)),$$

where MAC22 is the fifth verification information, HMAC is the hash-based message authentication code generation function, macKey is the second symmetric key, Hash is the hash function, ID is the feature identifier, Nonce1 is the first random value, Nonce2 is the second random value, the second random value is generated by the key management system, C is the ciphertext, and MAC11 is the third verification information.

According to a ninth aspect, this application provides a vehicle diagnostic apparatus. The apparatus is a diagnostic device. The apparatus includes: a transceiver unit configured to send a key authorization request to a key management system in a vehicle, and receive a key authorization response sent by the key management system, where the key authorization response includes a temporary key, the temporary key is independent of a long-term key in the vehicle, and the key authorization request is used by the key management system to generate the temporary key and configure the temporary key for a to-be-diagnosed unit in the vehicle; and a diagnostic unit configured to initiate a diagnostic operation by using the temporary key.

In a possible design, the diagnostic unit is specifically configured to encrypt to-be-diagnosed information by using the temporary key to generate a diagnostic request. The transceiver unit is further configured to: send the diagnostic request to the to-be-diagnosed unit, and receive a diagnostic result sent by the to-be-diagnosed unit. The diagnostic request is used by the to-be-diagnosed unit configured with the temporary key to obtain the diagnostic result based on the to-be-diagnosed information carried in the diagnostic request.

In a possible design, the temporary key may further correspond to validity duration, and the validity duration corresponding to the temporary key may be pre-configured, or may be indicated by the key authorization request, or may correspond to a time period between a diagnostic start and a diagnostic end.

In a possible design, after the transceiver unit sends the diagnostic request to the to-be-diagnosed unit, and before the transceiver unit receives the diagnostic result sent by the to-be-diagnosed unit, the transceiver unit may further send a security heartbeat message to the key management system based on preset period duration within the validity duration corresponding to the temporary key, so that the key management system continues to make the temporary key effective based on the security heartbeat message.

In a possible design, before the transceiver unit sends the security heartbeat message to the key management system, the diagnostic unit may further generate first verification information by using at least one piece of characteristic information used when the temporary key is generated, and generate the security heartbeat message based on the first verification information, so that the key management system verifies the security heartbeat message based on the first verification information before continuing to make the temporary key effective.

In a possible design, the at least one piece of characteristic information may include at least one of an initial key, a feature identifier, a first random value, or a second random value that is preset. The feature identifier indicates the to-be-diagnosed unit, the first random value is generated by the diagnostic device and sent to the key management system, and the second random value is generated by the key management system and sent to the diagnostic device. In this case, the first verification information may meet the following formula:

$$MAC31=HMAC(macKey,Hash(ID\|Nonce1\|Nonce2)),$$

where MAC32 is the first verification information, HMAC is a hash-based message authentication code generation function, macKey is a symmetric key derived based on the preset initial key, ID is the feature identifier, Nonce1 is the first random value, and Nonce2 is the second random value.

In a possible design, the temporary key may further correspond to an application scope, and the application scope corresponding to the temporary key indicates the to-be-diagnosed unit. The application scope corresponding to the temporary key may be pre-configured, or may be indicated by the key authorization request.

In a possible design, the to-be-diagnosed unit may be all to-be-diagnosed units in the current diagnostic.

In a possible design, the key authorization response may include a ciphertext, the ciphertext is obtained by the key management system by encrypting the temporary key based on a transmission security key, and the transmission security key is obtained by the key management system by encrypting at least one piece of characteristic information based on a first symmetric key. The at least one piece of characteristic information is carried in the key authorization request and sent to the key management system. The at least one piece of characteristic information includes at least one of the first random value, the feature identifier, or an authorization code. The first random value is generated by the diagnostic device, the feature identifier indicates the to-be-diagnosed unit, and the authorization code indicates the diagnostic device. In this case, after the transceiver unit receives the key authorization response sent by the key management system, the diagnostic unit may further encrypt the at least one piece of characteristic information by using the first symmetric key to generate the transmission security key, and decrypt the ciphertext by using the transmission security key to obtain the temporary key.

In a possible design, the key authorization response may further include third verification information, the third verification information is obtained by the key management system by encrypting the ciphertext and the at least one piece of characteristic information based on a second symmetric key, and the second symmetric key is a symmetric key derived based on the first symmetric key. In this case, after the transceiver unit receives the key authorization response, the diagnostic unit may further first derive the second symmetric key based on the first symmetric key, and encrypt the ciphertext and the at least one piece of characteristic information by using the second symmetric key to obtain sixth verification information. If determining that the sixth verification information matches the third verification information, the diagnostic unit may encrypt the at least one piece of characteristic information by using the first symmetric key to generate the transmission security key. If determining that the sixth verification information does not match the third verification information, the diagnostic unit may not generate the transmission security key.

In a possible design, after the diagnostic unit decrypts the ciphertext by using the transmission security key to obtain the temporary key, the diagnostic unit may further generate fourth verification information based on one or more of the ciphertext, the third verification information, and the at least one piece of characteristic information. The transceiver unit may further send the fourth verification information to the key management system, so that the key management system verifies the fourth verification information before configuring the temporary key.

In a possible design, the transmission security key may meet the following formula:

$$tK=HKDF(AK,ID\|Nonce1\|Nonce2\|string"TransportKey"),$$

where tK is the transmission security key, HKDF is a hash-based message authentication code-based key derivation function, AK is the first symmetric key, ID is the feature identifier, Nonce1 is the first random value, Nonce2 is the second random value, the second random value is generated by the key management system, and "TransportKey" is a character string corresponding to the "transmission security key".

Further, the ciphertext may meet the following formula:

$$C=AES\text{-}GCM(tK,\{M\}),$$

where C is the ciphertext, AES-GCM is an AES symmetric encryption algorithm that uses a counting mode and carries a Galois message authentication code, and {M} is the temporary key.

In a possible design, the second symmetric key may meet the following formula:

$$macKey = HKDF(AK, ID\|Nonce1\|Nonce2\|string"MAC"),$$

where macKey is the second symmetric key, HKDF is the hash-based message authentication code-based key derivation function, AK is the first symmetric key, ID is the feature identifier, Nonce1 is the first random value, Nonce2 is the second random value, the second random value is generated by the key management system, and MAC is the authorization code.

Further, the sixth verification information may meet the following formula:

$$MAC12 = HKDF(macKey, Hash(ID\|Nonce1\|Nonce2\|C)),$$

where MAC12 is the fourth verification information, C is the ciphertext, and Hash is a hash function.

In a possible design, the fourth verification information may meet the following formula:

$$MAC21 = HMAC(macKey, Hash(ID\|Nonce1\|Nonce2\|C\|MAC11)),$$

where MAC21 is the fourth verification information, HMAC is the hash-based message authentication code generation function, macKey is the second symmetric key, Hash is the hash function, ID is the feature identifier, Nonce1 is the first random value, Nonce2 is the second random value, the second random value is generated by the key management system, C is the ciphertext, and MAC11 is the third verification information.

According to a tenth aspect, this application provides a vehicle diagnostic apparatus. The apparatus is a to-be-diagnosed unit in a vehicle. The apparatus includes: an obtaining unit configured to obtain a temporary key, where the temporary key is independent of a long-term key in the vehicle; a transceiver unit configured to receive a diagnostic request sent by a diagnostic device, where the diagnostic request is generated by the temporary key encrypted information; and a diagnostic unit configured to decrypt the diagnostic request by using the temporary key to complete a diagnostic.

In a possible design, the transceiver unit is further configured to receive temporary key effective information sent by a key management system in the vehicle, the obtaining unit is specifically configured to obtain the temporary key from the temporary key effective information, and the diagnostic unit is further configured to store the temporary key in a random access memory (RAM).

In a possible design, after the obtaining unit obtains the temporary key, the transceiver unit may further receive temporary key ineffective information sent by the key management system in the vehicle, and the diagnostic unit may further delete, based on the temporary key ineffective information, the temporary key stored in the RAM.

According to an eleventh aspect, this application provides a vehicle, including the vehicle diagnostic system according to any design of the first aspect.

According to a twelfth aspect, this application provides a vehicle diagnostic apparatus. The apparatus is a to-be-diagnosed unit in a vehicle. The apparatus includes: a transceiver unit configured to receive a key authorization request sent by a diagnostic device, and send a key authorization response to the diagnostic device, where the key authorization response includes a temporary key, and the temporary key is independent of a long-term key in the vehicle; a generation unit configured to generate the temporary key based on the key authorization request; and a diagnostic unit configured to complete a diagnostic based on the temporary key.

In a possible design, the generation unit may further generate, for another to-be-diagnosed unit in the vehicle, a temporary key used by the diagnostic device to diagnose the another to-be-diagnosed unit.

In a possible design, the transceiver unit is further configured to receive a diagnostic request sent by the diagnostic device. The diagnostic unit is specifically configured to: decrypt the diagnostic request by using the temporary key to obtain to-be-diagnosed information, and perform a diagnostic operation based on the to-be-diagnosed information to obtain a diagnostic result. The transceiver unit is further configured to send the diagnostic result to the diagnostic device.

In a possible design, the temporary key may further correspond to validity duration, and the validity duration corresponding to the temporary key may be pre-configured, or may be indicated by the key authorization request, or may correspond to a time period between a diagnostic start and a diagnostic end.

In a possible design, after the transceiver unit sends the key authorization response to the diagnostic device, the transceiver unit may further wait for receiving a security heartbeat message sent by the diagnostic device. If the security heartbeat message sent by the diagnostic device is not received within preset period duration, the diagnostic unit may make the temporary key ineffective. The security heartbeat message is periodically sent by the diagnostic device to the to-be-diagnosed unit within the validity duration corresponding to the temporary key.

In a possible design, the security heartbeat message may include first verification information, and the first verification information is generated based on at least one piece of characteristic information used when the temporary key is generated. The at least one piece of characteristic information includes at least one of an initial key, a feature identifier, a first random value, or a second random value that is preset. The feature identifier indicates the to-be-diagnosed unit, the first random value is generated by the diagnostic device and sent to the to-be-diagnosed unit, and the second random value is generated by the to-be-diagnosed unit and sent to the diagnostic device. In this case, when the transceiver unit receives, within the preset period duration, the security heartbeat message sent by the diagnostic device, the generation unit may further generate second verification information based on the at least one piece of characteristic information used when the temporary key is generated, and the diagnostic unit may continue to make the temporary key effective when determining that the second verification information matches the first verification information.

In a possible design, the second verification information may meet the following formula:

$$MAC32 = HMAC(macKey, Hash(ID\|Nonce1\|Nonce2)),$$

where MAC32 is the second verification information, HMAC is a hash-based message authentication code generation function, macKey is a symmetric key derived based on the preset initial key, ID is the feature identifier, Nonce1 is the first random value, and Nonce2 is the second random value.

In a possible design, after the generation unit generates the temporary key based on the key authorization request, the diagnostic unit may further make a configuration of the temporary key effective, and make the temporary key ineffective after validity duration corresponding to the temporary key expires.

In a possible design, the temporary key may further correspond to an application scope, and the application scope corresponding to the temporary key indicates the to-be-diagnosed unit. The application scope corresponding to the temporary key may be pre-configured, or may be indicated by the key authorization request.

In a possible design, after the generation unit generates the temporary key based on the key authorization request, the diagnostic unit may further configure the temporary key for each to-be-diagnosed unit used for the current diagnostic.

In a possible design, the key authorization request may include at least one piece of characteristic information, and the at least one piece of characteristic information includes at least one of the first random value, the feature identifier, or an authorization code. The first random value is generated by the diagnostic device, the feature identifier indicates the to-be-diagnosed unit, and the authorization code indicates the diagnostic device. In this case, before the transceiver unit sends the key authorization response to the diagnostic device, the generation unit may further first encrypt the at least one piece of characteristic information by using a first symmetric key to generate a transmission security key, then encrypt the temporary key by using the transmission security key to generate a ciphertext, and finally generate the key authorization response based on the ciphertext. The ciphertext is used by the diagnostic device to perform decryption by using the transmission security key to obtain the temporary key.

In a possible design, the generation unit is specifically configured to: first encrypt the ciphertext and the at least one piece of characteristic information by using a second symmetric key to generate third verification information, and then generate the key authorization response based on the third verification information and the ciphertext. The second symmetric key is a symmetric key derived based on the first symmetric key, and the third verification information is used by the diagnostic device to perform verification before the ciphertext is decrypted.

In a possible design, after the transceiver unit sends the key authorization response to the diagnostic device, the transceiver unit may further receive fourth verification information sent by the diagnostic device, the generation unit may further generate fifth verification information by using one or more of the ciphertext, the third verification information, and the at least one piece of characteristic information, and if determining that the fourth verification information matches the fifth verification information, the diagnostic unit may make the configuration of the temporary key effective. The fourth verification information is generated based on one or more of the ciphertext, the third verification information, and the at least one piece of characteristic information.

In a possible design, the transmission security key may meet the following formula:

$$tK=HKDF(AK, ID\|Nonce1\|Nonce2\|string``TransportKey"),$$

where tK is the transmission security key, HKDF is a hash-based message authentication code-based key derivation function, AK is the first symmetric key, ID is the feature identifier, Nonce1 is the first random value, Nonce2 is the second random value, the second random value is generated by the to-be-diagnosed unit, and "TransportKey" is a character string corresponding to the "transmission security key".

Further, the ciphertext may meet the following formula:

$$C=AES-GCM(tK,\{M\}),$$

where C is the ciphertext, AES-GCM is an AES symmetric encryption algorithm that uses a counting mode and carries a Galois message authentication code, and {M} is the temporary key.

In a possible design, the second symmetric key may meet the following formula:

$$macKey=HKDF(AK, ID\|Nonce1\|Nonce2\|string``MAC"),$$

where macKey is the second symmetric key, HKDF is the hash-based message authentication code-based key derivation function, AK is the first symmetric key, ID is the feature identifier, Nonce1 is the first random value, Nonce2 is the second random value, the second random value is generated by the to-be-diagnosed unit, and MAC is the authorization code.

Further, the third verification information may meet the following formula:

$$MAC11=HKDF(macKey,Hash (ID\|Nonce1\|Nonce2\|C)),$$

where MAC11 is the third verification information, C is the ciphertext, and Hash is a hash function.

In a possible design, the fifth verification information may meet the following formula:

$$MAC22=HMAC(macKey,Hash (ID\|Nonce1\|Nonce2\|C\|MAC11)),$$

where MAC22 is the fifth verification information, HMAC is the hash-based message authentication code generation function, macKey is the second symmetric key, Hash is the hash function, ID is the feature identifier, Nonce1 is the first random value, Nonce2 is the second random value, the second random value is generated by the to-be-diagnosed unit, C is the ciphertext, and MAC11 is the third verification information.

In a possible design, after the generation unit generates the temporary key based on the temporary key authorization request, the diagnostic unit may further store the temporary key in a RAM of the to-be-diagnosed unit, and delete the temporary key stored in the RAM when making the temporary key ineffective.

According to a thirteenth aspect, this application provides a vehicle diagnostic apparatus. The apparatus is a diagnostic device. The apparatus includes: a transceiver unit configured to send a key authorization request to a to-be-diagnosed unit in a vehicle, and receive a key authorization response sent by the to-be-diagnosed unit, where the key authorization request is used by the to-be-diagnosed unit to generate a temporary key, the temporary key is independent of a long-term key in the vehicle, and the key authorization response includes the temporary key; and a diagnostic unit configured to initiate a diagnostic operation on the to-be-diagnosed unit by using the temporary key.

In a possible design, the diagnostic unit is specifically configured to encrypt to-be-diagnosed information by using the temporary key to generate a diagnostic request. The transceiver unit is further configured to send the diagnostic request to the to-be-diagnosed unit, and receive a diagnostic result sent by the to-be-diagnosed unit. The diagnostic request is used by the to-be-diagnosed unit to perform a diagnostic and obtain the diagnostic result based on the to-be-diagnosed information obtained by parsing the diagnostic request by using the temporary key.

In a possible design, the temporary key may further correspond to validity duration, and the validity duration corresponding to the temporary key may be pre-configured, or may be indicated by the key authorization request, or may correspond to a time period between a diagnostic start and a diagnostic end.

In a possible design, after the transceiver unit sends the diagnostic request to the to-be-diagnosed unit and before the transceiver unit receives the diagnostic result sent by the to-be-diagnosed unit, the transceiver unit may further send a security heartbeat message to the to-be-diagnosed unit based on preset period duration within the validity duration corresponding to the temporary key, so that the to-be-diagnosed unit continues to make the temporary key effective based on the security heartbeat message.

In a possible design, before the transceiver unit sends the security heartbeat message to the to-be-diagnosed unit, the diagnostic unit may further generate first verification information by using at least one piece of characteristic information used when the temporary key is generated, and generate the security heartbeat message based on the first verification information, so that the to-be-diagnosed unit verifies the security heartbeat message based on the first verification information before continuing to make the temporary key effective.

In a possible design, the at least one piece of characteristic information may include at least one of an initial key, a feature identifier, a first random value, or a second random value that is preset. The feature identifier indicates the to-be-diagnosed unit, the first random value is generated by the diagnostic device and sent to the to-be-diagnosed unit, and the second random value is generated by the to-be-diagnosed unit and sent to the diagnostic device. In this case, the first verification information may meet the following formula:

$$MAC31 = HMAC(macKey, Hash(ID\|Nonce1\|Nonce2)),$$

where MAC32 is the first verification information, HMAC is a hash-based message authentication code generation function, macKey is a symmetric key derived based on the preset initial key, ID is the feature identifier, Nonce1 is the first random value, and Nonce2 is the second random value.

In a possible design, the temporary key may further correspond to an application scope, and the application scope corresponding to the temporary key indicates the to-be-diagnosed unit. The application scope corresponding to the temporary key may be pre-configured, or may be indicated by the key authorization request.

In a possible design, the key authorization response may include a ciphertext, the ciphertext is obtained by the to-be-diagnosed unit by encrypting the temporary key based on a transmission security key, and the transmission security key is obtained by the to-be-diagnosed unit by encrypting at least one piece of characteristic information based on a first symmetric key. The at least one piece of characteristic information is carried in the key authorization request and sent to the to-be-diagnosed unit. The at least one piece of characteristic information includes at least one of the first random value, the feature identifier, or an authorization code. The first random value is generated by the diagnostic device, the feature identifier indicates the to-be-diagnosed unit, and the authorization code indicates the diagnostic device. In this case, after the transceiver unit receives the key authorization response sent by the to-be-diagnosed unit, the diagnostic unit may further encrypt the at least one piece of characteristic information by using the first symmetric key to generate the transmission security key, and decrypt the ciphertext by using the transmission security key to obtain the temporary key.

In a possible design, the key authorization response may further include third verification information, the third verification information is obtained by the to-be-diagnosed unit by encrypting the ciphertext and the at least one piece of characteristic information based on a second symmetric key, and the second symmetric key is a symmetric key derived based on the first symmetric key. In this case, the diagnostic unit may further first derive the second symmetric key based on the first symmetric key, and encrypt the ciphertext and the at least one piece of characteristic information by using the second symmetric key to obtain sixth verification information. If determining that the sixth verification information matches the third verification information, the diagnostic unit may encrypt the at least one piece of characteristic information by using the first symmetric key to generate the transmission security key. If determining that the sixth verification information does not match the third verification information, the diagnostic unit may not generate the transmission security key.

In a possible design, after the diagnostic unit decrypts the ciphertext by using the transmission security key to obtain the temporary key, the diagnostic unit may further generate fourth verification information based on one or more of the ciphertext, the third verification information, and the at least one piece of characteristic information, and the transceiver unit may further send the fourth verification information to the to-be-diagnosed unit, so that the to-be-diagnosed unit verifies the fourth verification information before making the configuration of the temporary key effective.

In a possible design, the transmission security key may meet the following formula:

$$tK = HKDF(AK, ID\|Nonce1\|Nonce2\|string"TransportKey"),$$

where tK is the transmission security key, HKDF is a hash-based message authentication code-based key derivation function, AK is the first symmetric key, ID is the feature identifier, Nonce1 is the first random value, Nonce2 is the second random value, the second random value is generated by the to-be-diagnosed unit, and "TransportKey" is a character string corresponding to the "transmission security key".

Further, the ciphertext may meet the following formula:

$$C = AES\text{-}GCM(tK, \{M\}),$$

where C is the ciphertext, AES-GCM is an AES symmetric encryption algorithm that uses a counting mode and carries a Galois message authentication code, and {M} is the temporary key.

In a possible design, the second symmetric key may meet the following formula:

$$macKey = HKDF(AK, ID\|Nonce1\|Nonce2\|string"MAC"),$$

where macKey is the second symmetric key, HKDF is the hash-based message authentication code-based key derivation function, AK is the first symmetric key, ID is the feature identifier, Nonce1 is the first random value, Nonce2 is the second random value, the second random value is generated by the to-be-diagnosed unit, and MAC is the authorization code.

Further, the sixth verification information may meet the following formula:

$$MAC12=HKDF(macKey,Hash(ID\|Nonce1\|Nonce2\|C)),$$

where MAC12 is the fourth verification information, C is the ciphertext, and Hash is a hash function.

In a possible design, the fourth verification information may meet the following formula:

$$MAC21=HMAC(macKey,Hash(ID\|Nonce1\|Nonce2\|C\|MAC11)),$$

where MAC21 is the fourth verification information, HMAC is the hash-based message authentication code generation function, macKey is the second symmetric key, Hash is the hash function, ID is the feature identifier, Nonce1 is the first random value, Nonce2 is the second random value, the second random value is generated by the to-be-diagnosed unit, C is the ciphertext, and MAC11 is the third verification information.

According to a fourteenth aspect, this application provides a vehicle. The vehicle includes the to-be-diagnosed unit according to any design of the twelfth aspect, or includes the to-be-diagnosed unit according to any design of the twelfth aspect and the diagnostic device according to any design of the thirteenth aspect.

According to a fifteenth aspect, this application provides a vehicle diagnostic apparatus, including a processor and a communication interface. The communication interface is configured to receive a signal from another communication apparatus other than the vehicle diagnostic apparatus and transmit the signal to the processor, or send a signal from the processor to the another communication apparatus other than the vehicle diagnostic apparatus. The processor is configured to implement, by using a logic circuit or executing code instructions, the method according to any design of the second aspect, or the method according to any design of the third aspect, or the method according to any design of the fourth aspect, or the method according to any design of the sixth aspect, or the method according to any design of the seventh aspect.

According to a sixteenth aspect, this application provides a vehicle diagnostic apparatus. The apparatus may include a processor. The processor is connected to a memory, and the memory is configured to store a computer program. The processor is configured to execute the computer program stored in the memory, so that the apparatus is enabled to perform the method according to any design of the second aspect, or perform the method according to any design of the third aspect, or perform the method according to any design of the fourth aspect, or perform the method according to any design of the sixth aspect, or perform the method according to any design of the seventh aspect.

According to a seventeenth aspect, this application provides a computer-readable storage medium. The computer-readable storage medium stores a computer program. When the computer program is run, the method according to any design of the second aspect is implemented, or the method according to any design of the third aspect is implemented, or the method according to any design of the fourth aspect is implemented, or the method according to any design of the sixth aspect is implemented, or the method according to any design of the seventh aspect is implemented.

According to an eighteenth aspect, this application provides a computer program product. The computer program product includes a computer program or instructions. When the computer program or the instructions is/are executed by a communication apparatus, the method according to any design of the second aspect is implemented, or the method according to any design of the third aspect is implemented, or the method according to any design of the fourth aspect is implemented, or the method according to any design of the sixth aspect is implemented, or the method according to any design of the seventh aspect is implemented.

According to a nineteenth aspect, this application provides a chip. The chip may include a processor and an interface. The processor is configured to read instructions through the interface, to perform the method according to any design of the second aspect, or perform the method according to any design of the third aspect, or perform the method according to any design of the fourth aspect, or perform the method according to any design of the sixth aspect, or perform the method according to any design of the seventh aspect.

For specific beneficial effect of the second aspect to the nineteenth aspect, refer to technical effect that can be achieved by corresponding designs in the first aspect. Details are not described herein again.

BRIEF DESCRIPTION OF DRAWINGS

FIG. 7A and FIG. 7B are an example of a schematic flowchart corresponding to a vehicle diagnostic method according to Embodiment 2 of this application;

DESCRIPTION OF EMBODIMENTS

It should be noted that the diagnostic solution in embodiments of this application may be applied to the Internet of vehicles, for example, vehicle-to-everything (V2X), Long-Term Evolution vehicle (LTE-V), vehicle-to-vehicle (V2V). For example, the diagnostic solution may be applied to a vehicle having a key authentication function, or another apparatus having a key authentication function in a vehicle. The another apparatus includes but is not limited to another sensor such as a vehicle-mounted terminal, a vehicle-mounted controller, a vehicle-mounted module, a vehicle-mounted module, a vehicle-mounted component, a vehicle-mounted chip, a vehicle-mounted unit, a vehicle-mounted radar, or a vehicle-mounted camera. The vehicle may implement the diagnostic method provided in this application by using the vehicle-mounted terminal, the vehicle-mounted controller, the vehicle-mounted module, the vehicle-mounted module, the vehicle-mounted component, the vehicle-mounted unit, the vehicle-mounted radar, or the vehicle-mounted camera. Certainly, the diagnostic solution in embodiments of this application may be further applied to another intelligent terminal having a key authentication function other than the vehicle, or disposed in another intelligent terminal having a key authentication function other than the vehicle, or disposed in a component of the intelligent terminal. The intelligent terminal may be an intelligent transportation device, a smart home device, a robot, or the like, for example, including but not limited to an intelligent terminal or another sensor such as a controller, a chip, a radar, or a camera in the intelligent terminal, another component, or the like.

The following describes the technical solutions in embodiments of this application with reference to the accompanying drawings in embodiments of this application. It is clear that the described embodiments are merely a part rather than all of embodiments of this application.

Figure 1:
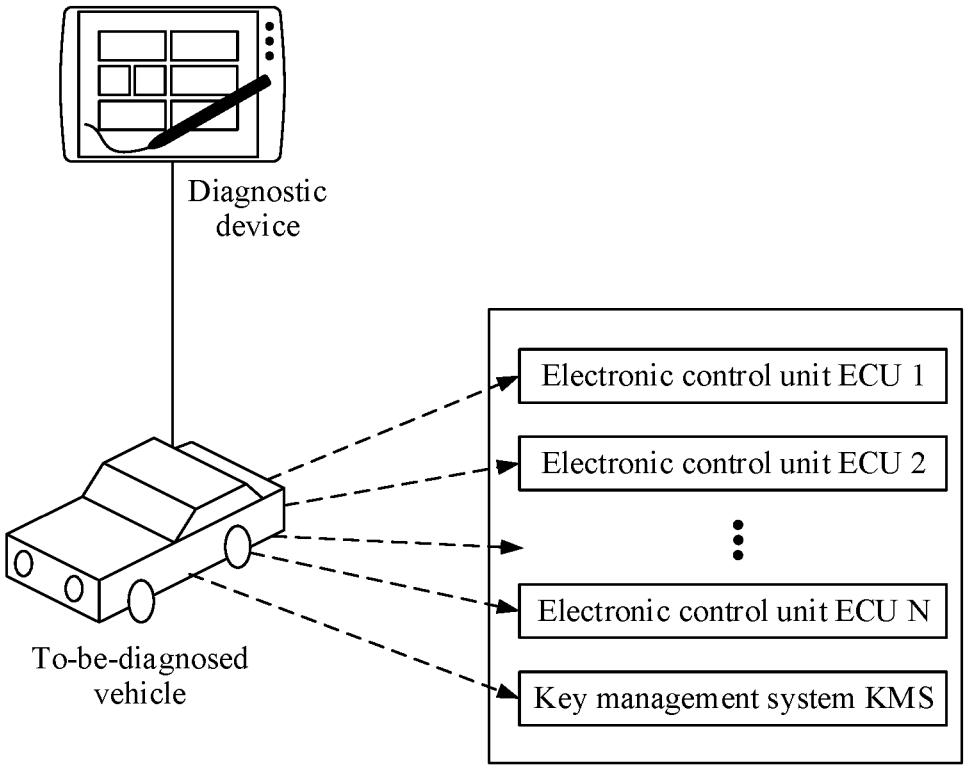
FIG. 1 is a schematic diagram of a possible system architecture to which an embodiment of this application is applicable.

FIG. 1 is a schematic diagram of a possible system architecture to which an embodiment of this application is applicable. The system architecture shown in FIG. 1 includes a to-be-diagnosed vehicle and a diagnostic device. The to-be-diagnosed vehicle may be any vehicle having a key authentication function. The diagnostic device may refer to a diagnostic instrument, or may refer to a diagnostic server, or may refer to a diagnostic server cluster. It should be understood that neither a quantity of to-be-diagnosed vehicles nor a quantity of diagnostic devices in the system architecture is limited in this embodiment of this application. For example, one diagnostic device may exchange information with only one to-be-diagnosed vehicle, or may exchange information with a plurality of to-be-diagnosed vehicles. Moreover, in addition to the to-be-diagnosed vehicle and the diagnostic device, the system architecture to which this embodiment of this application is applicable may further include another device, such as a supplier device, a manufacturer device, a production line device, and a sales device. This is not limited in this embodiment of this application either. In addition, the diagnostic device in this embodiment of this application may integrate all functions into one independent physical device, or may distribute the functions on a plurality of independent physical devices. This is not limited in this embodiment of this application either.

In this embodiment of this application, a vehicle diagnostic may be implemented in a wired manner, or may be implemented in a wireless manner. For example, when the vehicle diagnostic is implemented in the wired manner, the diagnostic device usually has a diagnostic line, and a diagnostic interface is preset on the to-be-diagnosed vehicle. Diagnostic personnel may directly insert one end of the diagnostic line of the diagnostic device into the diagnostic interface of the to-be-diagnosed vehicle, and then enter a diagnostic command on the diagnostic device, so that the diagnostic command is sent to the to-be-diagnosed vehicle through the diagnostic line. The diagnostic interface may be a unified diagnostic services (UDS) interface, or may be an on board diagnostics (OBD) interface, or may be another interface that can implement a command transmission function. This is not limited. When the vehicle diagnostic is implemented in the wireless manner, the diagnostic device and the to-be-diagnosed vehicle may have a near field communication function such as BLUETOOTH or a wireless local area network (WLAN). The diagnostic personnel may first connect the diagnostic device and the to-be-diagnosed vehicle by using the near field communication function of the diagnostic device and the to-be-diagnosed vehicle, and then enter a diagnostic command on the diagnostic device, so that the diagnostic command is transmitted to the to-be-diagnosed vehicle in a wireless manner. For example, a liquid crystal display may be further disposed on the diagnostic device. After a diagnostic result is obtained, the diagnostic device may further synchronously display the diagnostic result on the liquid crystal display, to remind the diagnostic personnel to view the diagnostic result in time and quickly find a fault location and a fault cause.

Based on the system architecture shown in FIG. 1, the following first describes some terms in this application.

(1) Electronic Control Unit (ECU)

In embodiments of this application, a plurality of ECUs may be configured inside the to-be-diagnosed vehicle, for example, an ECU 1, an ECU 2, . . . , and an ECU N shown in FIG. 1, where N is a positive integer. Each ECU may have a specific function of the ECU, and further supports simple sensor data processing and complex logical calculation. Currently, common ECUs include but are not limited to: a vehicle-mounted sensor, a vehicle-mounted camera, a multi domain controller (MDC), an automated-driving control unit (ADCU), a telematics box (T-Box), a smart cockpit domain controller (CDC), a vehicle-mounted gateway, a vehicle control unit (VCU), a battery management system (BMS), a thermal management system (TMS), a power distribution unit (PDU), and the like.

In embodiments of this application, the ECUs in the to-be-diagnosed vehicle may exchange messages based on communication technologies that are set when the to-be-diagnosed vehicle is delivered. These communication technologies may be, for example, a local Internet (LIN) technology, a Flexray network technology, or a Controller Area Network (CAN) technology, or may be another communication technology that implements a message exchange. When the messages are exchanged based on the CAN technology, each ECU may be connected to a same CAN bus, and any ECU may freely read and send a CAN message frame on the CAN bus. Each CAN message frame on the CAN bus usually has only a message identifier, but does not carry a source address or a destination address. Each ECU connected to the CAN bus may select a message frame to be received based on a message identifier. Although the message exchange manner based on the CAN technology has strong real-time performance and reliability, the CAN technology has no built-in security function. In this case, once an attacker deciphers the CAN bus, each CAN message frame injected by the attacker may be read by the ECU in the to-be-diagnosed vehicle and considered as a valid CAN message frame. In this way, the attacker can fully control a function of the to-be-diagnosed vehicle, for example, braking or acceleration. This is very insecure for a user to use the vehicle.

To resolve the problem, each ECU in the to-be-diagnosed vehicle needs to be further configured with a corresponding long-term key. When an ECU obtains a CAN message frame from the CAN bus based on a message identifier, the ECU may further parse the CAN message frame by using a pre-configured long-term key. If the parsing fails, it indicates that there is a high probability that the CAN message frame is an invalid control command injected by an unauthorized person on the CAN bus. Therefore, the ECU may not perform a corresponding control operation, to prevent the unauthorized person from controlling the vehicle. If the parsing succeeds, it indicates that the CAN message frame is a valid control command injected by an authorized person (for example, a vehicle owner) on the CAN bus. Therefore, the ECU may perform a corresponding control operation. In this way, an authentication operation of the CAN message frame is completed by presetting the long-term key in each ECU, to help authenticate the control command before control is actually performed, thereby improving driving safety of the vehicle owner.

(2) Key Management System (KMS)

In embodiments of this application, a KMS may be further configured inside the to-be-diagnosed vehicle, for example, a KMS shown in FIG. 1. The KMS is mainly responsible for functions such as key generation, key management, and key clearing in the to-be-diagnosed vehicle. These keys include the long-term key described above. Different from those in the conventional information and technology (ICT), most ECUs in the Internet of vehicles comply with the EVITA standard and the secure hardware extension (SHE) standard. For example, in consideration of performance and costs of key setting in the EVITA standard and the SHE standard, the long-term key in the KMS may be set to a symmetric key.

Figure 2:
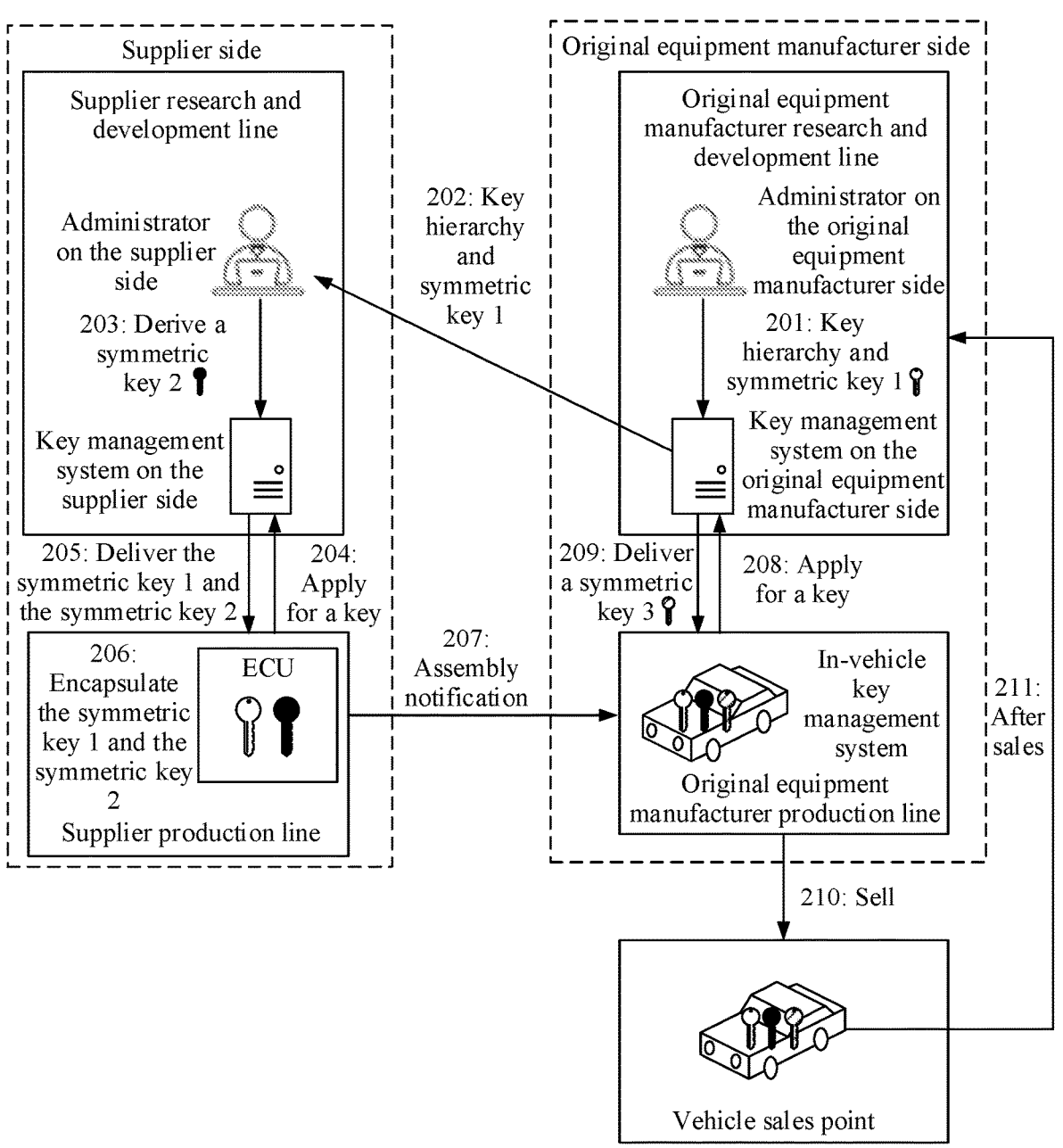
FIG. 2 is an example of a life cycle diagram of an in-vehicle long term key according to an embodiment of this application.

FIG. 2 is an example of a life cycle diagram of an in-vehicle long-term key according to an embodiment of this application. As shown in FIG. 2, an entire life cycle of the in-vehicle long-term key relates to communication interaction between an original equipment manufacturer (OEM) side, a supplier side, and a vehicle sales point side. The OEM side may specifically include an OEM research and development line and an OEM production line. The supplier side may specifically include a chip supplier and a component supplier. For ease of understanding, chips provided by the chip supplier and an ECU or a vehicle component assembled by the component supplier by using these chips are collectively referred to as ECUs herein. The supplier side may specifically include a supplier research and development line and a supplier production line. As shown in FIG. 2, the entire life cycle of the in-vehicle long-term key may include the following phases.

Phase 201: The OEM research and development line designs a key hierarchy based on a service requirement and a management requirement, and generates a symmetric key 1 for the service requirement. The symmetric key 1 may include one or more symmetric keys, and the one or more symmetric keys are used as initial keys designed in the key hierarchy, and are used to derive another symmetric key.

Phase 202: The OEM research and development line sends the key hierarchy and the symmetric key 1 to the supplier research and development line. The sending operation needs to be performed in a secure and confidential environment. For example, a dedicated person may be arranged to secretly deliver the key hierarchy and the symmetric key 1. Alternatively, the key hierarchy and the symmetric key 1 may be transmitted in an encrypted peer to peer (P2P) manner, or may be sent in another secure communication manner. This is not limited.

Phase 203: The supplier research and development line derives a supplier-provided symmetric key 2 based on the symmetric key 1 and the key hierarchy. The symmetric key 2 may include a root key of a chip used for assembling an ECU, a root key of an ECU used for assembling a vehicle component or a vehicle, and a root key of the vehicle component obtained by assembling the ECU. The symmetric key 2 may also be configured to be updatable. In other words, the symmetric key 2 may be changed based on different production environments.

Phase 204: When assembling the ECU or the vehicle component, the supplier production line applies to the supplier research and development line for a key.

Phase 205: The supplier research and development line returns the symmetric key 1 and the symmetric key 2 to the supplier production line.

Phase 206: The supplier production line invokes a hardware security module (HSM) or the SHE standard, and encapsulates the symmetric key 1 and the symmetric key 2 into respective corresponding ECUs or vehicle components.

Phase 207: The supplier production line notifies the OEM production line to assemble the entire vehicle.

Phase 208: The OEM production line assembles the entire vehicle based on the ECUs or vehicle components that are encapsulated with the symmetric key 1 and the symmetric key 2, and applies to the OEM research and development line for a key in the assembly process.

Phase 209: The OEM research and development line returns a symmetric key 3 to the OEM production line. The symmetric key 3 may include a root key, a working key, and the like that are preset on the OEM side. The symmetric key 3 is applicable to a vehicle after-sales phase, for example, used to replace an ECU or a vehicle component, or update a software configuration.

Phase 210: The OEM production line encapsulates the symmetric key 3 in the vehicle, and then provides the vehicle to a vehicle sales point for sale. In this case, the symmetric key 1, the symmetric key 2, and the symmetric key 3 are encapsulated in the vehicle.

Phase 211: After the vehicle is sold, if an ECU or a vehicle component in the vehicle is damaged, or a software configuration of the vehicle needs to be updated, a vehicle owner may further place the vehicle at the vehicle sales point, and the vehicle sales point applies to the OEM side for after-sales based on the symmetric key 3. In addition, after the vehicle is sold, the vehicle owner may further preset some vehicle owner keys in the vehicle based on a prompt. In this case, the symmetric key 1, the symmetric key 2, the symmetric key 3, and the vehicle owner keys are encapsulated in the vehicle.

It should be understood that, in the phases, all operations on the OEM research and development line side may be completed by an administrator that is set on the OEM side and a key management system on the OEM side, and all operations on the supplier research and development line side may be completed by an administrator that is set on the supplier side and a key management system on the supplier research and development line side. This is not specifically described in this application.

It can be learned based on the content shown in FIG. 2 that, in the entire life cycle of the in-vehicle long-term key, long-term keys that need to be managed by the KMS in the vehicle include but are not limited to: the symmetric key 1 preset by the OEM research and development line based on the service requirement, the symmetric key 2 derived by the supplier research and development line based on the symmetric key 1, the symmetric key 3 preset on the OEM side, the vehicle owner keys, and the like. These long-term keys may be applied to different scenarios. For example, Table 1 shows examples of application scenarios of the long-term keys managed by the KMS.

the vehicle diagnostic of this type, based on different manners of processing a fault self-detection and diagnostic result, the ECUs in the vehicle may be further classified into the following two types: a primary ECU node, where this type of ECU can determine, based on the fault self-detection and diagnostic result, whether a fault occurs in the ECU, and can store corresponding fault information when determining that a fault occurs in the ECU; and a secondary ECU node,

TABLE 1

| In-vehicle application | Inside the ECU | Secure boot and flashing, configuration file integrity protection, and software and hardware IP protection |
| | Outside the ECU | Identity authentication and secure communication, such as SecOC, MACsec, and TLS |
| Out-of-vehicle application | Diagnostic and assembly | Access control |
| | Communication | Communication between the ECU and an external device through a wireless interface, a wired interface, an API interface, or the like; V2X; and human-machine interaction, such as fingerprint recognition and facial recognition |
| | Remote service | Software over-the-air (SOTA) upgrade, remote control and command, a mobile online service, a subscription and another charging service, and an immobilizer |

As shown in Table 1, the long-term keys managed by the KMS in the vehicle are not only applied to interactive authentication between the ECUs in the vehicle, but also applied to interactive authentication between the ECU in the vehicle and a device outside the vehicle. Therefore, the long-term keys play a crucial role in the vehicle. Once the long-term keys are leaked out of the vehicle, an unauthorized person outside the vehicle may perform some illegal operations on the vehicle by using the long-term keys. This is not conducive to improving vehicle use experience of the user.

(3) Vehicle Diagnostic

In a development process of the entire vehicle, the vehicle diagnostic is mainly applicable to the following four phases: a development phase, an experiment phase (such as B/C/D sample experiment or DVP experiment), a component production phase, a vehicle assembly, end of line (EOL), and after-sales phase. Before the fourth phase (namely, before the vehicle is delivered), the research and development personnel may further preset a diagnostic module in the vehicle, and predefine some diagnostic services in the diagnostic module. The diagnostic module is connected to each ECU in the vehicle through a standard UDS diagnostic interface. When a fault occurs, the diagnostic module may automatically invoke a predefined diagnostic service, to send a diagnostic request in the vehicle, so as to diagnose the fault and rectify the fault. For example, in a vehicle diagnostic based on the CAN technology, the predefined diagnostic service mainly includes two parts: a processing capability diagnostic and an internal diagnostic. The processing function diagnostic may include a diagnostic of a capability of obtaining fault code, a diagnostic of an input/output control capability, a diagnostic of a secure access function, a diagnostic of a data obtaining function, a diagnostic of a program control function, a diagnostic of a refresh function, and the like. The internal diagnostic may include an initialization diagnostic of the ECU, a fault self-detection and diagnostic when the ECU is closed, a continuous fault self-detection and diagnostic when the ECU is closed, and the like. The vehicle diagnostic based on the CAN technology can not only provide a capability of quickly accessing a diagnostic result, but also control each ECU to perform a respective function without disconnecting the CAN bus. In where this type of ECU can determine, based on the fault self-detection and diagnostic result, whether a fault occurs in the ECU, and can send corresponding fault information to the primary ECU node when determining that a fault occurs in the ECU, so that the primary ECU node stores the fault information. In this manner, the diagnostic module is preset in the vehicle, so that when a fault occurs, the vehicle owner may directly send a diagnostic request from the vehicle to rectify the fault, and the vehicle does not need to be sent back to the vehicle sales point for an after-sales diagnostic.

However, the predefined diagnostic service in the vehicle cannot cover all fault scenarios. If the predefined diagnostic service cannot be used to diagnose a fault, the vehicle owner needs to send the vehicle back to the vehicle sales point for an after-sales diagnostic. However, in the after-sales diagnostic, the diagnostic personnel usually need to initiate a diagnostic request from outside of the vehicle to inside of the vehicle. In this case, the diagnostic personnel need to obtain the long-term key corresponding to each ECU in the vehicle in advance. Otherwise, the diagnostic request sent by the diagnostic personnel cannot be authenticated by these ECUs, causing a diagnostic failure. However, the long-term keys in the vehicle should not be leaked out of the vehicle in theory. Because if the diagnostic personnel obtain the long-term keys, the diagnostic personnel can also obtain, based on the long-term keys, user privacy data protected by the long-term keys, and may even control running of the vehicle by using the long-term keys. This is unfavorable to driving experience of the user. Although the long-term keys may alternatively be replaced after the diagnostic using the long-term keys is completed, the replacement operation is complex and cannot resolve a problem of user privacy data leakage.

In view of this, this application provides a vehicle diagnostic method, to perform, in a scenario in which an out-of-vehicle diagnostic is used, the diagnostic by using a temporary key, without accessing, modifying, or leaking existing sensitive data (for example, the long-term keys preset in the vehicle and the user privacy data protected by the long-term keys) in the vehicle. Certainly, in another scenario, if no long-term key is preset in the vehicle, but a key-based security characteristic diagnostic still needs to be performed on the ECU in the vehicle, the vehicle diagnostic method in this application may still be used.

The following describes the vehicle diagnostic method in this application by using specific embodiments. It should be noted that the terms "system" and "network" may be used interchangeably in embodiments of this application. "At least one" means one or more, and "a plurality of" means two or more. "And/or" describes an association relationship between associated objects, and indicates that three relationships may exist. For example, A and/or B may indicate the following three cases: A exists alone, both A and B exist, and B exists alone, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

In addition, unless otherwise stated, ordinal numbers such as "first" and "second" mentioned in embodiments of this application are intended to distinguish a plurality of objects, rather than limit priorities or importance degrees of the plurality of objects. For example, first verification information, second verification information, and third verification information are merely used to distinguish between different verification information, but do not indicate different priorities, importance degrees, or the like of the three pieces of verification information.

Embodiment 1

Figure 3:
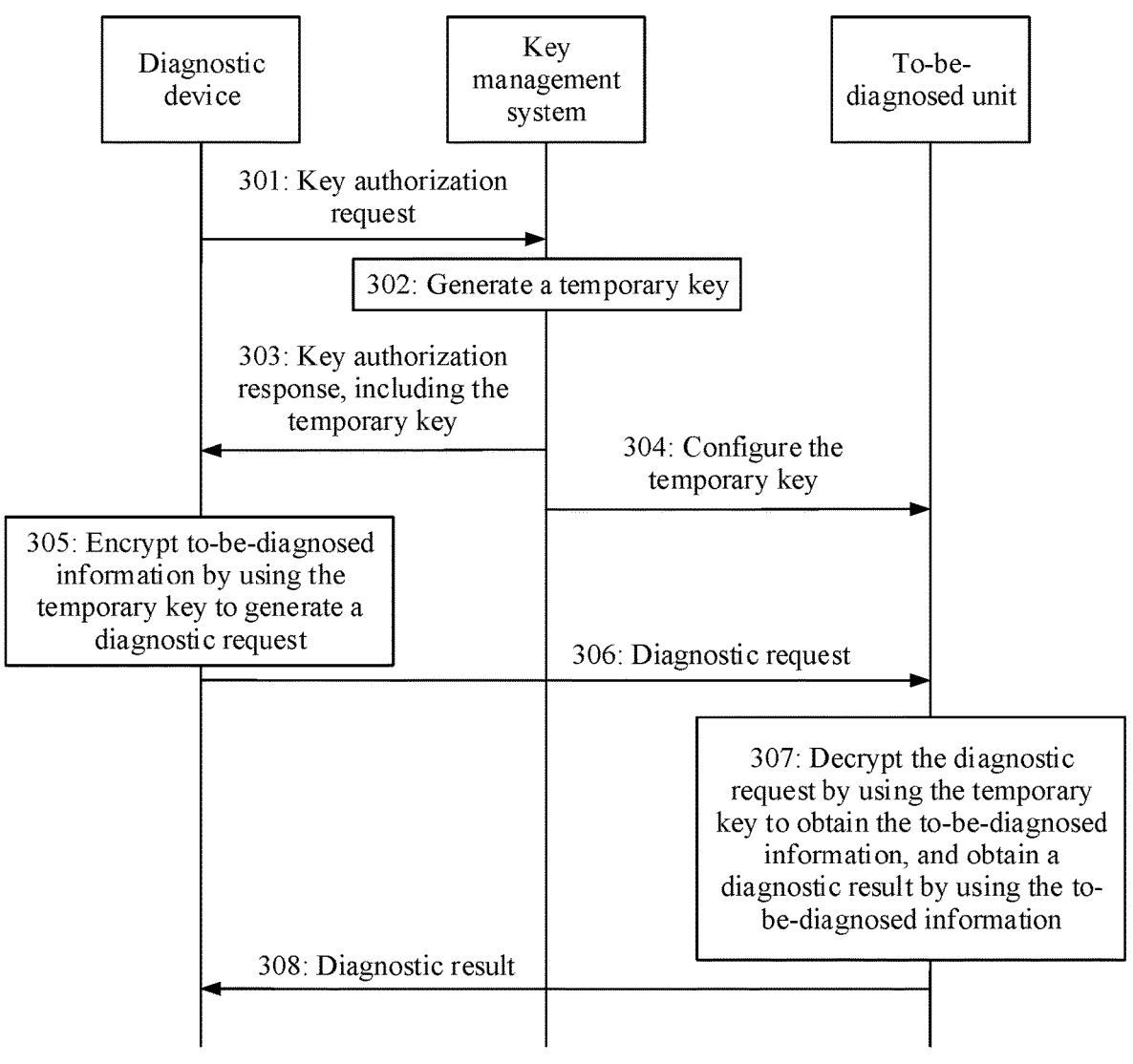
FIG. 3 is an example of a schematic flowchart corresponding to a vehicle diagnostic method according to Embodiment 1 of this application.

FIG. 3 is an example of a schematic flowchart corresponding to a vehicle diagnostic method according to Embodiment 1 of this application. The method is applicable to a key management system and a to-be-diagnosed unit in a to-be-diagnosed vehicle and a diagnostic device, for example, the diagnostic device, the key management system, and the one or more ECUs shown in FIG. 1. As shown in FIG. 3, the method includes the following steps.

Step 301: The diagnostic device sends a key authorization request to the key management system.

In step 301, the diagnostic device may be a device outside the to-be-diagnosed vehicle, for example, may be another device independent of an OEM device and a supplier device, or may be a part of the OEM device or a part of the supplier device. In this case, given that there is a risk of key leakage in an out-of-vehicle diagnostic, the diagnostic device may not initiate the diagnostic by using a long-term key in the to-be-diagnosed vehicle, but may first send the key authorization request to the key management system in the to-be-diagnosed vehicle before initiating the diagnostic, to apply for a temporary key corresponding to the current diagnostic. In this way, if the diagnostic device subsequently receives the temporary key, the diagnostic device and the to-be-diagnosed vehicle may complete a current out-of-vehicle diagnostic operation based on the temporary key, to prevent the long-term key in the to-be-diagnosed vehicle from being leaked out of the vehicle.

Step 302: The key management system generates the temporary key corresponding to the current diagnostic based on the key authorization request, where the temporary key is independent of the long-term key in the to-be-diagnosed vehicle.

In step 302, the temporary key corresponding to the current diagnostic may be a globally unique temporary key.

In other words, the temporary key is unique in all current diagnostics. In this way, even if the diagnostic device currently performs a different diagnostic on the to-be-diagnosed vehicle, the to-be-diagnosed unit in the to-be-diagnosed vehicle can obtain, through parsing, only to-be-diagnosed information of the diagnostic corresponding to the to-be-diagnosed unit, and the to-be-diagnosed information is not confused with to-be-diagnosed information of a diagnostic corresponding to another to-be-diagnosed unit. This helps ensure accuracy of each diagnostic in the scenario in which the diagnostic is performed by using the temporary key.

Step 303: The key management system sends a key authorization response to the diagnostic device, where the key authorization response includes the temporary key.

It should be understood that step 301 to step 303 in which the diagnostic device applies to the key management system for the temporary key are merely an optional implementation. In another optional implementation, another device may alternatively apply to the key management system for the temporary key and send the temporary key to the diagnostic device. In this manner, the operation of applying for the temporary key and the diagnostic operation are separately performed in different devices. This not only helps reduce working pressure of the diagnostic device, but also decouples the operation of applying for the temporary key and the diagnostic operation. Even if the diagnostic device performs another diagnostic, the another device can apply for the temporary key of the current diagnostic in advance. In this way, after completing the another diagnostic, the diagnostic device directly uses the temporary key of the current diagnostic to seamlessly perform the current diagnostic, and does not need to re-obtain the temporary key corresponding to the current diagnostic, thereby improving diagnostic efficiency.

Step 304: The key management system configures the temporary key for the to-be-diagnosed unit in the to-be-diagnosed vehicle.

In step 304, the to-be-diagnosed unit may include only one ECU, or may include a plurality of ECUs. When the to-be-diagnosed unit includes a plurality of ECUs, the plurality of ECUs may comprehensively complete one diagnostic task, and each of the plurality of ECUs corresponds to a diagnostic subtask of the ECU. The diagnostic subtask of each ECU may be independent of a diagnostic subtask of another ECU. In this case, the plurality of ECUs may first separately execute respective diagnostic subtasks to obtain a plurality of diagnostic results, and then the plurality of diagnostic results are combined to obtain a final diagnostic result. Alternatively, the plurality of ECUs may further have priorities. A diagnostic subtask of a high-priority ECU depends on a diagnostic result of a low-priority ECU. In this case, the low-priority ECU may first execute a corresponding diagnostic subtask to obtain the diagnostic result, and then the high-priority ECU invokes the diagnostic result of the low-priority ECU to continue to execute the diagnostic subtask corresponding to the high-priority ECU. After diagnostics of all the ECUs are completed, a final diagnostic result is obtained based on diagnostic results of the plurality of ECUs. There are many possible implementations, which are not listed one by one herein.

In an optional implementation, the temporary key may further correspond to an application scope and validity duration. The application scope of the temporary key refers to to-be-diagnosed units to which the temporary key corresponds, and the validity duration of the temporary key refers to how long the temporary key is valid. In this implementation, the application scope and the validity duration of the temporary key may have a plurality of possible cases, and the following are examples.

In a possible case, each temporary key corresponds to a same application scope and same validity duration. The application scope and the validity duration may be written by research and development personnel into the key management system of the to-be-diagnosed vehicle by using a one-time one-key context before the to-be-diagnosed vehicle is delivered. If the application scope preset in the one-time one-key context is all the ECUs in the to-be-diagnosed vehicle, and the validity duration preset in the one-time one-key context is one day, each time the key management system receives a key authorization request, the key management system may first randomly generate a globally unique temporary key, and then configure the temporary key for all the ECUs in the to-be-diagnosed vehicle. When the validity duration of the temporary key is maintained by the key management system, the key management system may further start a timer (where timing duration is 24 hours) after the configuration succeeds. When the timer times out, it is determined that the validity duration of the temporary key ends. In this case, the key management system may make the temporary key in each ECU ineffective. When the validity duration of the temporary key is maintained by the diagnostic device, the validity duration preset in the one-time one-key context may be further synchronized to the diagnostic device in advance. In this way, each time the diagnostic device receives the temporary key sent by the key management system, the diagnostic device may start a timer to time the same validity duration (for example, 24 hours). When the timer times out, the diagnostic device may indicate the key management system to make the temporary key ineffective.

In another possible case, the key authorization request indicates the application scope and the validity duration that correspond to the temporary key. The application scope and the validity duration may be set by research and development personnel or diagnostic personnel on an OEM side based on a current diagnostic requirement, or may be set based on configuration information customized by a vehicle owner. This is not specifically limited. It is assumed that the key authorization request indicates that the application scope corresponding to the current diagnostic is a vehicle-mounted camera, and the validity duration is one day. In this case, after receiving the key authorization request, the key management system may first randomly generate a globally unique temporary key, and then configure the temporary key for the vehicle-mounted camera in the to-be-diagnosed vehicle. The key management system may further start a timer (where timing duration is 24 hours) after the configuration succeeds, and make the temporary key in the vehicle-mounted camera ineffective after the timer times out.

In another possible case, the key authorization request indicates only the application scope corresponding to the temporary key, but does not indicate the validity duration. In this case, after receiving the key authorization request, the key management system may first randomly generate a globally unique temporary key, and then configure the temporary key for the application scope indicated in the key authorization request. Then, the key management system may return the temporary key to the diagnostic device. Correspondingly, after receiving the temporary key for the key authorization request, the diagnostic device may start a timer to time the validity duration corresponding to the temporary key. When the timer times out, the diagnostic device may indicate the key management system to make the temporary key ineffective.

In an example of the implementation, the application scope corresponding to each temporary key may be set to each to-be-diagnosed unit used for the current diagnostic. In this way, the diagnostic device may directly use the same temporary key to interact with each diagnostic unit corresponding to the current diagnostic, and does not need to switch the temporary key for each diagnostic unit, thereby improving diagnostic efficiency.

In this embodiment of this application, the diagnostic device may make the temporary key ineffective in a plurality of manners. For example, in a possible manner, after determining that the validity duration of the temporary key ends, the diagnostic device may directly send, to the key management system, indication information for releasing the temporary key, to indicate the key management system to directly make the temporary key in the ECU ineffective. For another example, in another possible manner, the diagnostic device may alternatively periodically send a security heartbeat message bound to the temporary key to the key management system within the validity duration of the temporary key, and no longer send the security heartbeat message after the validity duration of the temporary key ends. In this way, when the key management system does not receive the security heartbeat message bound to the temporary key after a piece of period duration, the key management system may determine that the temporary key is ineffective. In this case, the key management system may make the temporary key in the ECU ineffective. In this application, the validity duration is set for the temporary key, so that the key management system can manage each temporary key more conveniently and flexibly.

In an optional implementation, "the key management system configures the temporary key in the ECU" may mean that the key management system sends the temporary key to the ECU, so that the ECU stores the temporary key in a RAM of the ECU. Correspondingly, "the key management system makes the temporary key in the ECU ineffective" may mean that the key management system enables the ECU to delete the temporary key stored in the RAM of the ECU. In this implementation, because the RAM has a feature of data loss after power-off, if a diagnostic fault is found in the diagnostic process or the diagnostic is not expected to continue due to another reason, even if the validity duration of the temporary key corresponding to the current diagnostic does not expire, the diagnostic personnel may enable the ECU to lose the temporary key corresponding to the current diagnostic in a manner of powering off the to-be-diagnosed vehicle, so as to make the temporary key ineffective.

Step 305: The diagnostic device encrypts to-be-diagnosed information by using the temporary key to generate a diagnostic request.

Step 306: The diagnostic device sends the diagnostic request to the to-be-diagnosed unit.

In step 306, when each ECU in the to-be-diagnosed vehicle is connected to a CAN bus, the diagnostic device may directly send the diagnostic request to the CAN bus, and add a message authentication code (also referred to as a message identifier) to the diagnostic request.

Step 307: The to-be-diagnosed unit decrypts the diagnostic request by using the temporary key to obtain the to-be-diagnosed information, and performs the diagnostic operation based on the to-be-diagnosed information to obtain a diagnostic result.

In step 307, any ECU in the to-be-diagnosed vehicle may obtain the diagnostic request from the CAN bus. Then, the ECU may verify the message authentication code in the diagnostic request to determine whether the diagnostic request is a message to be obtained by the ECU. If a temporary key stored in a RAM of the ECU is the same as the temporary key used for encrypting the diagnostic request, the ECU can parse the diagnostic request to obtain the to-be-diagnosed information, and then perform a diagnostic based on the to-be-diagnosed information to obtain a diagnostic result. If no temporary key is stored in the RAM of the ECU, or the stored temporary key is different from the temporary key used for encrypting the diagnostic request, the ECU cannot obtain the to-be-diagnosed information through parsing, and therefore cannot perform a diagnostic to obtain a diagnostic result. This manner helps enable only the to-be-diagnosed unit configured with the temporary key to perform the diagnostic corresponding to the temporary key, thereby effectively controlling the diagnostic operation of each to-be-diagnosed unit.

Figure 4:
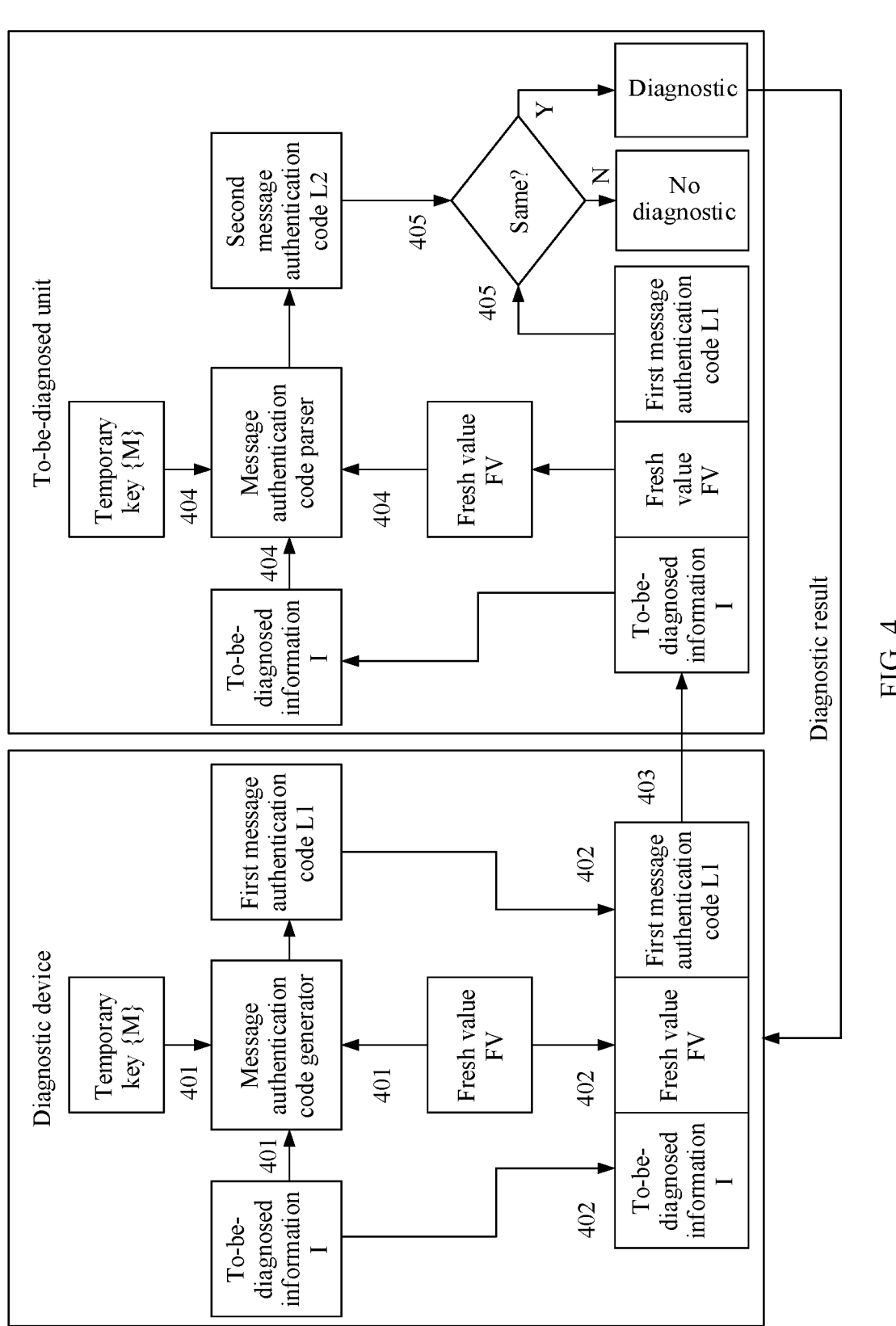
FIG. 4 is an example of a schematic flowchart corresponding to a SecOC protocol-based diagnostic method according to this application.

In the field of Internet of vehicles technologies, receiving and sending operations between two nodes need to depend on various different communication protocols. The two nodes may be an out-of-vehicle diagnostic device and an in-vehicle ECU, or may be any two in-vehicle ECUs. The following uses the SecOC protocol as an example to describe a specific implementation process of exchanging the diagnostic request between the diagnostic device and the to-be-diagnosed unit. The SecOC protocol is an optional software module located at a basic software of AUTOSAR (BSW) layer. The SecOC protocol may provide a message integrity authentication mechanism for an ECU message at a protocol data unit (PDU) level, and can ensure freshness of the ECU message, to avoid an ECU control problem caused by replay of a history message by an unauthorized person. FIG. 4 is an example of a schematic flowchart corresponding to a SecOC protocol-based diagnostic method according to this application. As shown in FIG. 4, the method includes the following steps.

Step 401: The diagnostic device generates a first message authentication code based on the to-be-diagnosed information, a fresh value (FV), and the temporary key.

In step 401, the diagnostic device may use a counter to determine fresh values for sending a message and receiving a message. Each time the diagnostic device sends a message, the fresh value stored in the diagnostic device may be incremented by 1. In this way, because the message authentication code sent by the diagnostic device is generated based on a current fresh value, even if the unauthorized person sends, to the to-be-diagnosed unit, a historical message (carrying a historical fresh value) previously generated by the diagnostic device, the to-be-diagnosed unit may determine whether the received message is a fresh message based on the fresh value carried in the first message authentication code. When the received message is not a fresh message but a historical message, the to-be-diagnosed unit may not execute a corresponding control command. In this manner, the unauthorized person can be better prevented from controlling the to-be-diagnosed vehicle by using the historical message, thereby helping improve an anti-attack capability of the to-be-diagnosed vehicle.

In an optional implementation, a message authentication code generator may further be disposed in the diagnostic device, and the message authentication code generator is configured to process input information according to a preset generation algorithm to obtain and output the message authentication code. When the preset generation algorithm is CMAC-AES128 (complying with RFC 4493), if the diagnostic device inputs the to-be-diagnosed information I, the fresh value FV, and the temporary key {M} together into the message authentication code generator, the message authentication code generator may obtain the first message authentication code L1 through calculation based on the following formula (1.1) and output the first message authentication code L1:

$$L1 = \text{CMAC-AES128}(I\|\text{FV},\{M\}) \tag{1.1}$$

It can be learned based on the formula (1.1) that when the temporary key {M} is a symmetric key with a length of AES128 bits, a length of the first message authentication code L1 may also be 128 bits.

Step 402: The diagnostic device generates the diagnostic request based on the to-be-diagnosed information, the fresh value, and the first message authentication code, and sends the diagnostic request to the to-be-diagnosed unit.

In step 402, given that a data field of a CAN message frame has only 8 bytes, if a total length of the to-be-diagnosed information, the fresh value, and the first message authentication code is not greater than 8 bytes, the diagnostic device may directly splice the to-be-diagnosed information, the fresh value, and the first message authentication code to generate the diagnostic request. If a total length of the to-be-diagnosed information, the fresh value, and the first message authentication code is greater than 8 bytes, the three pieces of information cannot be actually directly assembled in the CAN message frame. In this case, to successfully transmit the to-be-diagnosed information, the diagnostic device may further truncate the fresh value and the first message authentication code before splicing, and then assemble a truncated fresh value, a truncated first message authentication code, and the to-be-diagnosed information to obtain the diagnostic request. Given that transmission security of the to-be-diagnosed information decreases linearly as the length of the first message authentication code decreases, and a message authentication code having a length of 64 bits or more generally has a sufficient anti-attack capability, when truncating the message authentication code, the diagnostic device may further set the length of the first message authentication code to be not less than 64 bits.

Figure 5:
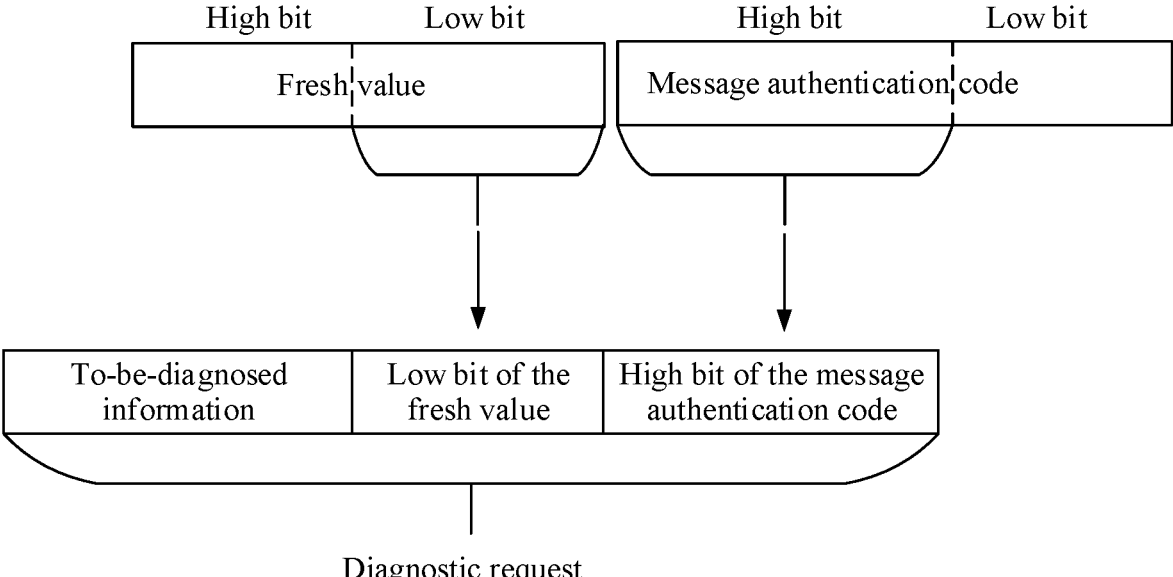
FIG. 5 is an example of a manner of assembling a diagnostic request according to an embodiment of this application.

FIG. 5 is an example of a manner of assembling the diagnostic request according to an embodiment of this application. As shown in FIG. 5, in this manner, the fresh value is first divided into a low bit of the fresh value and a high bit of the fresh value, and the first message authentication code is divided into a low bit of the first message authentication code and a high bit of the first message authentication code. Then, the low bit of the fresh value and the high bit of the first message authentication code are selected, and the to-be-diagnosed information, the low bit of the fresh value, and the high bit of the message authentication code are sequentially spliced, to obtain the diagnostic request.

Step 403: The to-be-diagnosed unit parses the diagnostic request to obtain the to-be-diagnosed information, the fresh value, and the message authentication code.

For example, if the diagnostic device obtains the diagnostic request through splicing according to the manner shown in FIG. 5, the to-be-diagnosed unit obtains the low bit of the fresh value and the high bit of the first message authentication code. In this case, the to-be-diagnosed unit further needs to restore a complete fresh value based on the low bit of the fresh value carried in the diagnostic request and a fresh value locally stored by the to-be-diagnosed unit, where the locally stored fresh value is determined based on a low bit of a fresh value carried in a historical message most recently received by the to-be-diagnosed unit. In an optional restoring manner, if the low bit of the fresh value carried in the diagnostic request is smaller than the low bit of the locally stored fresh value, it indicates that a value range overflow occurs in a process of incrementing the low bit of the fresh value (for example, if a low bit of a binary fresh value is incremented by 1 from 1, the low bit of the fresh value changes from 1 to 0, but a high bit of the fresh value correspondingly is incremented by 1). Therefore, the to-be-diagnosed unit may first add 1 to a high bit of the locally stored fresh value, and then splice the high bit of the locally stored fresh value and the low bit of the fresh value carried in the diagnostic request together, to obtain the complete fresh value. If the low bit of the fresh value carried in the diagnostic request is not smaller than the low bit of the locally stored fresh value, it indicates that the low bit of the fresh value is gradually incremented without overflow. Therefore, the to-be-diagnosed unit may directly splice a high bit of the locally stored fresh value and the low bit of the fresh value carried in the diagnostic request together, to obtain the complete fresh value.

Step 404: The to-be-diagnosed unit generates a second message authentication code based on the to-be-diagnosed information, the fresh value, and the temporary key.

In an optional implementation, before generating the second message authentication code, the to-be-diagnosed unit may further first compare the restored fresh value with the stored fresh value. If the restored fresh value is equal to the locally stored fresh value, or the restored fresh value is smaller than the locally stored fresh value, it indicates that the diagnostic request may be an attack message retransmitted by the unauthorized person by using a historical diagnostic request. In this case, the to-be-diagnosed unit may not execute a corresponding control command, or may return warning information to the diagnostic device. This helps the diagnostic personnel check illegal intrusions in time and maintain vehicle security. If the restored fresh value is greater than the locally stored fresh value, it indicates that the diagnostic request is not a retransmitted message. In this case, the to-be-diagnosed unit may obtain the temporary key pre-configured by the key management system from the local RAM, and perform a subsequent authentication operation based on the temporary key.

In this embodiment of this application, a message authentication code parser may be further disposed in the to-be-diagnosed unit, and the message authentication code parser is configured to process input information according to a preset generation algorithm that is the same as that of the message authentication code generator in the diagnostic device, to obtain and output the message authentication code. When the preset generation algorithm is CMAC-AES128 (complying with RFC 4493), if the to-be-diagnosed unit inputs the to-be-diagnosed information I, the restored fresh value FV, and the temporary key {M} stored in the local RAM together into the message authentication code parser, the message authentication code parser may obtain the second message authentication code L2 through calculation based on the formula (1.1) and output the second message authentication code L2.

Step 405: The to-be-diagnosed unit determines whether the second message authentication code generated by the to-be-diagnosed unit is the same as the first message authentication code carried in the diagnostic request. If the codes are the same, it indicates that the temporary key stored in the local RAM of the to-be-diagnosed unit is the same as the temporary key corresponding to the to-be-diagnosed information, and the to-be-diagnosed unit is a unit to be diagnosed. In this case, the to-be-diagnosed unit may perform the diagnostic based on the to-be-diagnosed information to obtain the diagnostic result. If the codes are different, it indicates that the temporary key stored in the local RAM of the to-be-diagnosed unit is different from the temporary key corresponding to the to-be-diagnosed information, and the to-be-diagnosed unit is not a unit to be diagnosed. In this case, the to-be-diagnosed unit may not perform the diagnostic operation.

In this implementation, the diagnostic request is authenticated by using the message authentication code generated by using the fresh value and the temporary key, so that the to-be-diagnosed information can be prevented from being tampered with in an out-of-vehicle transmission process, a behavior of attacking the vehicle by the unauthorized person by using the historical message can be accurately detected, and the diagnostic operation can be performed when authentication information is accurately transmitted, thereby helping accurately ensure vehicle security in an out-of-vehicle diagnostic phase.

In this embodiment of this application, although the fresh value is monotonically incremented in a life cycle of the entire vehicle based on a quantity of times of message sending, the diagnostic device and the to-be-diagnosed unit independently maintain respective fresh values. In this case, the fresh values between the diagnostic device and the to-be-diagnosed unit may not be synchronized due to some unpredictable exceptions. For example, in a case, although the diagnostic device sends a diagnostic request to the CAN bus, the CAN bus loses the diagnostic request due to a fault. In this case, the to-be-diagnosed unit cannot obtain the diagnostic request, and therefore the fresh value in the to-be-diagnosed unit is smaller than the fresh value in the diagnostic device. To avoid this phenomenon, in this application, a fault tolerance mechanism may be further set between the diagnostic device and the to-be-diagnosed unit, to maintain accurate fresh value data. For example, in an optional fault tolerance mechanism, the diagnosing device and the to-be-diagnosed unit may periodically synchronize the respective fresh values. Once it is found that a fresh value of a device is smaller than a fresh value of the other device, the device with the smaller fresh value may modify the fresh value of the device. In this way, the diagnosing device and the to-be-diagnosed unit can always maintain the same fresh values.

It should be noted that, the foregoing content is merely an example of a manner of authenticating the diagnostic request between the diagnostic device and the to-be-diagnosed unit, and it is not limited to authenticate the diagnostic request only in this manner in this application. Currently, all solutions that can be used for the diagnostic request in the vehicle may fall within the protection scope of this application. Details are not described in this application again.

Step 308: The to-be-diagnosed unit sends the diagnostic result to the diagnostic device.

In this embodiment of this application, the validity duration of the temporary key may be fixed duration, or may be current diagnostic duration. When the validity duration of the temporary key is the current diagnostic duration: if the validity duration of the temporary key is maintained by the to-be-diagnosed unit, after sending the diagnostic result to the diagnostic device, the to-be-diagnosed unit may determine that the current diagnostic ends, and therefore the to-be-diagnosed unit may directly delete the temporary key stored in the RAM of the to-be-diagnosed unit; if the validity duration of the temporary key is maintained by the diagnostic device, after receiving the diagnostic result sent by the to-be-diagnosed unit, the diagnostic device may determine that the diagnostic ends, and therefore the diagnostic device may no longer send the security heartbeat message to the key management system, or the diagnostic device may send, to the key management system, the indication information for releasing the temporary key; or if the validity duration of the temporary key is maintained by the key management system, after receiving the diagnostic result sent by the to-be-diagnosed unit, the diagnostic device may further send indication information for obtaining the diagnostic result to the key management system, so that the key management system determines, based on the indication information, that the diagnostic ends, and makes the temporary key in the to-be-diagnosed unit ineffective.

In Embodiment 1, the temporary key can be configured for the out-of-vehicle diagnostic operation. The to-be-diagnosed unit is diagnosed directly from outside the vehicle in a secure, compliant, and clean manner by using the temporary key, to avoid accessing sensitive data (for example, the long-term key that is set in the vehicle or other protected data) in the vehicle as much as possible. This not only helps protect privacy data of the vehicle owner, but also reduces a possibility that the unauthorized person controls running of the vehicle by using the long-term key, thereby improving driving security of the vehicle owner.

It should be noted that an implementation sequence of step 301 to step 304 in Embodiment 1 is not limited in this application. The following are examples.

Figure 6A:
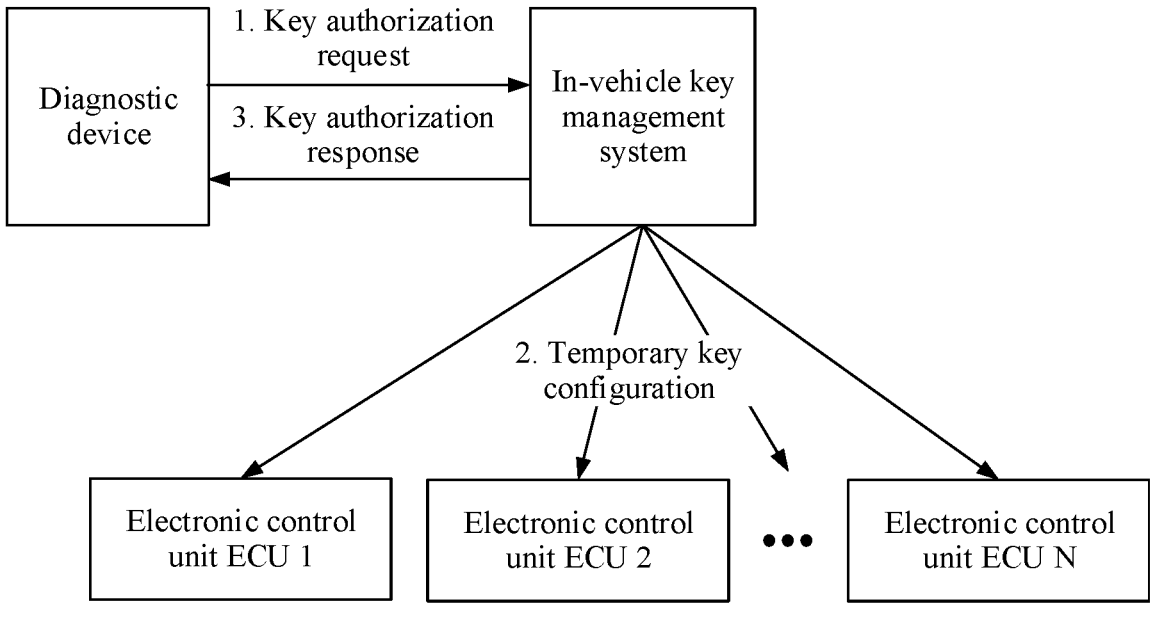
FIG. 6A is an example of a schematic diagram of a method for configuring a temporary key.

FIG. 6A is an example of a schematic diagram of a method for configuring the temporary key. As shown in FIG. 6A, in this example, after generating the temporary key based on the key authorization request sent by the diagnostic device, the key management system may first configure the temporary key for each to-be-diagnosed ECU. When the configuration succeeds, the key management system may send the key authorization response to the diagnostic device. Definitely, if the configuration fails, the key management system may not return the temporary key to the diagnostic device, but may perform a configuration again. If the configuration fails for a preset quantity of times or within a preset time period, the key management system may further return configuration error response information to the diagnostic device. In this manner, the temporary key is returned to the diagnostic device only when the configuration succeeds, so that the diagnostic device initiates the diagnostic request only when the temporary key is stored in each to-be-diagnosed ECU. Therefore, this manner can effectively reduce internal resources of the diagnostic device.

Figures 6B, 6C:
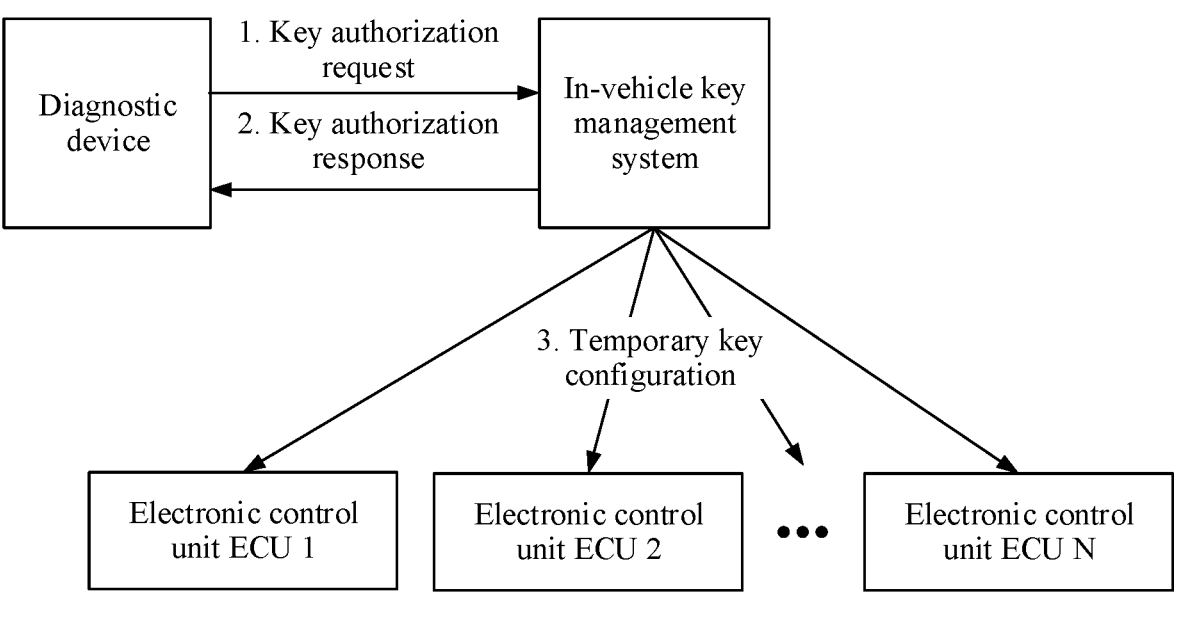
FIG. 6B is an example of a schematic diagram of another method for configuring a temporary key.
FIG. 6C is an example of a schematic diagram of another method for configuring a temporary key.

FIG. 6B is an example of a schematic diagram of another method for configuring the temporary key. As shown in FIG. 6B, in this example, after generating the temporary key based on the key authorization request sent by the diagnostic device, the key management system may first send the key authorization response to the diagnostic device, and then configure the temporary key for each to-be-diagnosed ECU. In this case, the operation of generating the diagnostic request by the diagnostic device and the operation of configuring the temporary key by the key management system may be performed concurrently. In this way, compared with the solution in which the diagnostic device receives the key authorization response after the temporary key is configured successfully, this solution has higher diagnostic efficiency.

FIG. 6C is an example of a schematic diagram of another method for configuring the temporary key. As shown in FIG. 6C, in this example, after generating the temporary key based on the key authorization request sent by the diagnostic device, the key management system may first send the key authorization response to the diagnostic device, and then wait for a response from the diagnostic device. If the diagnostic device sends a response and the response indicates that the diagnostic device receives a correct temporary key, the key management system may configure the temporary key for each to-be-diagnosed ECU. In this case, the key management system configures the temporary key only after determining that the diagnostic device receives the correct temporary key. When the diagnostic device does not receive the temporary key (that is, the key management system does not receive the response), or the diagnostic device receives an incorrect temporary key, the key management system may not configure the temporary key, because even if the temporary key is configured, the diagnostic still cannot be continued because the configured temporary key is different from the temporary key used by the diagnostic device to encrypt the to-be-diagnosed information. Therefore, this manner can effectively reduce internal resources of the key management system.

In this embodiment of this application, if the temporary key is directly sent in a plaintext manner, the temporary key may be hijacked in the transmission process, thereby causing insecure impact on the vehicle diagnostic. To resolve this problem, this application further provides a manner of completing the vehicle diagnostic by encrypting and transmitting the temporary key. Based on Embodiment 1 and the configuration manner shown in FIG. 6C, the following further describes a vehicle diagnostic method in this application by using Embodiment 2.

Embodiment 2

Figure 7B:
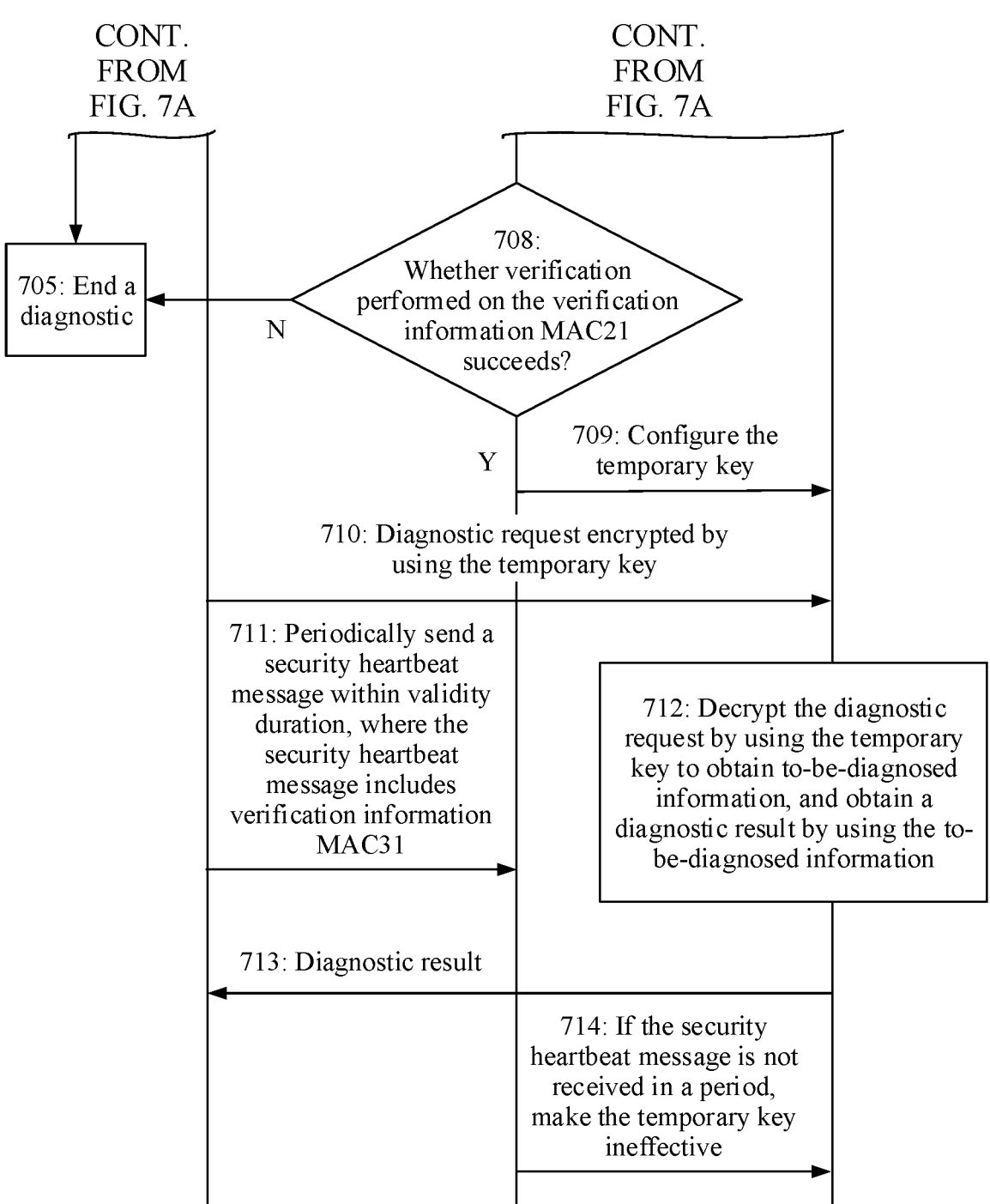

FIG. 7A and FIG. 7B are an example of a schematic flowchart corresponding to a vehicle diagnostic method according to Embodiment 2 of this application. The method is applicable to a key management system and a to-be-diagnosed unit in a to-be-diagnosed vehicle and a diagnostic device, for example, the diagnostic device, the key management system, and the one or more ECUs shown in FIG. 1. As shown in FIG. 7A and FIG. 7B, the method includes the following steps.

Step 701: The diagnostic device sends a key authorization request to the key management system, where the key authorization request includes at least one piece of characteristic information.

In step 701, the at least one piece of characteristic information may refer to characteristic information that is in characteristic information related to a current diagnostic and that is transparent to the diagnostic device but not transparent to the key management system, for example, information that is in all information may be used in a process of authenticating a temporary key by the diagnostic device and the key management system and that is known by the diagnostic device but not known by the key management system. In this way, both the diagnostic device and the key management system can store complete information, so that the diagnostic device and the key management system can authenticate the temporary key by using a same algorithm based on the complete information. For example, the at least one piece of characteristic information may include diagnostic object information and diagnostic device information. The diagnostic object information indicates the to-be-diagnosed unit. For example, the diagnostic object information may include a feature identifier (ID) of a diagnostic service used for the current diagnostic, and may further include a vehicle identification number (VIN) of the to-be-diagnosed vehicle, an identifier of the to-be-diagnosed unit, or the like. When the diagnostic object information includes a feature ID of a service, the current diagnostic is applicable to all ECUs that have the service. For example, if the diagnostic object information is SecOC, it indicates that the current diagnostic is applicable to each ECU that uses the SecOC message authentication mechanism, and the temporary key corresponding to the current key authorization request needs to be configured for each ECU that uses the SecOC message authentication mechanism. The diagnostic device information indicates the diagnostic device. For example, the diagnostic device information may include a message authentication code (MAC) (also referred to as an authorization code) corresponding to the diagnostic device, and may further include a device number of the diagnostic device and the like.

In an optional implementation, the at least one piece of characteristic information may further include a first random value Nonce1 generated by the diagnostic device. The first random value Nonce1 may be a random value of any length, and the random value is subsequently used only once. Preferably, to ensure security of transmission of the temporary key without increasing encryption and sending burden, the first random value Nonce1 may be selected as a random value of 6 bits.

For ease of understanding, the following uses an example in which the key authorization request includes the first random value Nonce1, the feature ID, and the authorization code MAC for description.

Step 702: The key management system first generates the temporary key corresponding to the current diagnostic, generates a transmission security key based on the at least one piece of characteristic information, encrypts the temporary key corresponding to the current diagnostic by using the transmission security key to generate a ciphertext, and then generates verification information MAC11 (namely, third verification information) by using the transmission security key and the ciphertext.

In an optional implementation, after the key management system receives the key authorization request, the key management system may further generate a second random value Nonce2, and then generate the transmission security key and the ciphertext by using some existing symmetric keys, the second random value Nonce2, and the first random value Nonce1, the feature ID, and the authorization code MAC in the key authorization request. The second random value Nonce2 may also be a random value that is of any length and that is subsequently used only once, for example, a random value of 6 bits. The existing symmetric keys are pre-synchronized to the key management system and the diagnostic device, for example, may refer to at least one long-term key maintained in the key management system (for example, as shown in FIG. 2, when the diagnostic device belongs to the OEM research and development line, the existing symmetric keys may refer to a root key and a working key preset by the OEM research and development line), or may refer to initial symmetric keys derived based on the long-term keys, or may refer to symmetric keys preset by a person skilled in the art and specially used to encrypt the temporary key. In this implementation, information known to both the diagnostic device and the key management system can be used to enhance security of the transmission of the temporary key, thereby helping reduce a possibility that the temporary key is intercepted when the temporary key is encrypted and sent to the diagnostic device.

In a possible example of the implementation, to reduce a quantity of symmetric keys synchronized by the key management system and the diagnostic device as much as possible, the key management system and the diagnostic device may generate the transmission security key by using only one existing symmetric key MK. In this example, the key management system may first encrypt the feature ID and the authorization code MAC by using the symmetric key MK based on the following formula (2.1), to derive a first symmetric key AK:

$$AK=HKDF(MK,ID\|string``MAC") \qquad (2.1),$$

where HKDF is a hash-based message authentication code (HMAC)-based key derivation function (HKDF).

Then, the key management system may further encrypt the feature ID, the first random value Nonce1, the second random value Nonce2, and a character string"TransportKey" by using the first symmetric key AK based on the following formula (2.2), to derive the transmission security key tK:

$$tK=HKDF(AK, ID\|Nonce1\|Nonce2\|string``TransportKey") \qquad (2.2)$$

Then, the key management system may further encrypt the temporary key {M} corresponding to the current diagnostic by using the transmission security key tK based on the following formula (2.3), to generate the ciphertext C:

$$C=AES\text{-}GCM(tK,\{M\}) \qquad (2.3),$$

where AES-GCM is an AES symmetric encryption algorithm that uses a counting mode and carries a Galois message authentication code (GMAC).

In an optional implementation, if the ciphertext is only transmitted to the diagnostic device without other verification, the temporary key may be a tampered temporary key even if the diagnostic device can parse the ciphertext to obtain the temporary key. In this case, to ensure that the diagnostic device obtains only an untampered temporary key, the key management system may further generate the verification information MAC11 by using the ciphertext and the characteristic information for generating the ciphertext before transmitting the ciphertext, and send the verification information MAC11 together with the ciphertext to the diagnostic device. In this way, as long as verification performed on the verification information MAC11 succeeds, it indicates that the ciphertext and the characteristic information for generating the ciphertext are not tampered with in the transmission process. Therefore, the temporary key obtained by the diagnostic device by parsing the ciphertext based on the characteristic information for generating the ciphertext is not tampered with. The characteristic information for generating the ciphertext may include the transmission security key tK, or may include the first symmetric key AK, the feature ID, the first random value Nonce1, and the second random value Nonce2 that are used for generating the transmission security key tK, or may include only the second random value Nonce2, because only the second random value Nonce2 is information generated by the key management system and needs to be sent to the diagnostic device (otherwise, the diagnostic device cannot perform parsing). The first symmetric key AK, the feature ID, and the first random value Nonce1 are all information preset in the diagnostic device or information that can be obtained by the diagnostic device through calculation, and the information is not changed even if transmission is tampered with.

In a possible example of the implementation, the key management system may first encrypt the feature ID, the first random value Nonce1, the second random value Nonce2, and the authorization code MAC by using the first symmetric key AK based on the following formula (2.4), to derive a second symmetric key macKey:

$$macKey=HKDF(AK,\ ID\|Nonce1\|Nonce2\|string"MAC") \qquad (2.4)$$

Then, the key management system may further encrypt the feature ID, the first random value Nonce1, the second random value Nonce2, and the ciphertext C by using the second symmetric key macKey based on the following formula (2.5), to generate the verification information MAC11:

$$MAC11=HKDF(macKey,Hash\ (ID\|Nonce1\|Nonce2\|C)) \qquad (2.5)$$

Step 703: The key management system sends a key authorization response to the diagnostic device, where the key authorization response carries the ciphertext and the verification information MAC11.

In step 703, if the key management system further uses some information unknown to the diagnostic device to generate the ciphertext or the verification information MAC11, the key authorization response further needs to include the information unknown to the diagnostic device. In this way, the diagnostic device side can obtain complete information, to successfully parse the ciphertext to obtain the temporary key, or successfully verify the verification information MAC11. Because the key management system further uses the second random value Nonce2 unknown to the diagnostic device in the process of generating the ciphertext C or the verification information MAC11 in step 702, the key authorization response may further include the second random value Nonce2.

It can be learned from step 702 and step 703 that, when sending the temporary key to the diagnostic device, the key management system does not directly send the temporary key in a plaintext form, but encrypts and sends the temporary key in an encrypted ciphertext form. This manner can better prevent the temporary key from being stolen in the transmission process, thereby helping ensure security of the to-be-diagnosed vehicle in the diagnostic process.

Step 704: The diagnostic device verifies the verification information MAC11.

If the verification fails, step 705 is performed.

If the verification succeeds, step 706 is performed.

In step 704, the diagnostic device may first generate verification information MAC12 (namely, sixth verification information), in the same manner as the key management system generates the verification information MAC11, by using some information carried in the key authorization response and unknown to the diagnostic device, the ciphertext, and some information locally preset in or obtained through calculation by the diagnostic device. For example, in the generation manner in step 702, the diagnostic device may obtain the second random value Nonce2 and the ciphertext C from the key authorization response, and locally obtain the symmetric key MK, the feature ID, the authorization code MAC, and the first random value Nonce1. First, the first symmetric key AK is generated by using the symmetric key MK, the feature ID, and the authorization code MAC based on the formula (2.1). Then, the second symmetric key macKey is generated by using the first symmetric key AK, the feature ID, the first random value Nonce1, the second random value Nonce2, and the authorization code MAC based on the formula (2.1). Then, the verification information MAC12 is generated by using the second symmetric key macKey, the feature ID, the first random value Nonce1, the second random value Nonce2, and the ciphertext C based on the formula (2.5).

Then, the diagnostic device may determine whether the verification information MAC12 generated by the diagnostic device is the same as the verification information MAC11 carried in the key authorization response. Theoretically, if the key authorization response is not tampered with, the verification information MAC12 generated by the diagnostic device needs to be the same as the verification information MAC11 carried in the key authorization response. If the key authorization response is tampered with, there is a high probability that the verification information MAC12 generated by the diagnostic device is different from the verification information MAC11 carried in the key authorization response.

Step 705: The diagnostic device ends the current diagnostic.

In step 704 and step 705, if the verification information MAC12 generated by the diagnostic device is different from the verification information MAC11 carried in the key authorization response, it indicates that the key authorization response is tampered with in the transmission process. In this case, even if the diagnostic device obtains a temporary key by parsing the ciphertext, the temporary key is not the temporary key generated by the key management system, and the diagnostic device cannot continue to perform the diagnostic operation based on the temporary key. Therefore, the diagnostic device may directly end the diagnostic. Certainly, in another example, the diagnostic device may further prompt the diagnostic personnel with a response message indicating a key authorization error, so that the diagnostic personnel can rectify a fault in time.

Step 706: The diagnostic device generates the transmission security key based on the at least one piece of characteristic information, and decrypts the ciphertext by using the transmission security key to obtain the temporary key.

In step 704 and step 706, if the verification information MAC12 generated by the diagnostic device is the same as the verification information MAC11 carried in the key authorization response, it indicates that there is a high probability that the key authorization response is not tampered with in the transmission process. Theoretically, the temporary key carried in the key authorization response is the temporary key delivered by the key management system to the diagnostic device. In this case, the diagnostic device may parse the ciphertext to obtain the temporary key. In a specific implementation, the diagnostic device may first generate the transmission security key, in the same manner as the key management system generates the transmission security key, by using some information carried in the key authorization response and unknown to the diagnostic device and some information locally preset in or obtained through calculation by the diagnostic device, and then decrypt the ciphertext by using the transmission security key to obtain the temporary key. For example, in the generation manner in step 702, because the first symmetric key AK has been generated when the verification information MAC11 is verified in step 704, the diagnostic device may directly generate the transmission security key tK by using the first symmetric key AK, the feature ID, the first random value Nonce1, the second random value Nonce2, and the character string"TransportKey" based on the formula (2.2), and then the diagnostic device may decrypt the ciphertext C by using the transmission security key tK based on the formula (2.6), to obtain the temporary key {M}:

$${M}=AES\text{-}GCM(tK,C) \qquad (2.6)$$

In this embodiment of this application, the two operations of encrypting the temporary key and verifying the verification information M11 are actually equivalent to a dual verification mechanism that is set before the diagnostic device is allowed to obtain the temporary key. In this manner, not only the temporary key can be prevented from being tampered with in the transmission process, but also the diagnostic device can be prevented from obtaining the tampered temporary key when the temporary key is tampered with, thereby helping maximally ensure security of the temporary key in the transmission process.

Step 707: The diagnostic device generates verification information MAC21 (namely, fourth verification information) by using at least one piece of characteristic information used when the temporary key is generated, and sends the verification information MAC21 to the key management system.

In step 707, after the key management system sends the temporary key to the diagnostic device in the ciphertext form, if the diagnostic device does not return a response to the key management system, the key management system actually does not know whether the diagnostic device obtains the correct temporary key through parsing. In this case, if the diagnostic device does not obtain the temporary key through parsing or obtains an incorrect temporary key through parsing, the diagnostic between the diagnostic device and the to-be-diagnosed unit cannot be completed even if the key management system configures the temporary key for the to-be-diagnosed unit (if the diagnostic device does not obtain the temporary key through parsing, the diagnostic device does not initiate a diagnostic request; or if the diagnostic device obtains the incorrect temporary key through parsing, the to-be-diagnosed unit cannot parse a diagnostic request sent by the diagnostic device by using the correct temporary key). To resolve this problem, after obtaining the temporary key through parsing, the diagnostic device may further generate the verification information MAC21 by using the at least one piece of characteristic information used when the temporary key is generated, and send the verification information MAC21 to the key management system, so that the key management system verifies, based on the verification information MAC21, whether the diagnostic device obtains the correct temporary key through parsing. The key management system configures the temporary key for the to-be-diagnosed unit only when determining that the diagnostic device obtains the correct temporary key through parsing. This manner can effectively prevent the key management system from performing a useless temporary key configuration operation, and reduces resources in the key management system.

In this embodiment of this application, the at least one piece of characteristic information used when the temporary key is generated may include one or more of the following content: the symmetric key MK, the feature ID, the authorization code MAC, the first symmetric key AK, the transmission security key tK, the second symmetric key macKey, the ciphertext C, and the verification information MAC11. For example, in an optional implementation, the diagnostic device may encrypt the feature ID, the first random value Nonce1, the second random value Nonce2, the ciphertext C, and the verification information MAC11 by using the second symmetric key macKey based on the following formula (2.7), to generate the verification information MAC21:

$$MAC21 = HMAC(macKey, Hash(ID\|Nonce1\|Nonce2\|C\|MAC11)) \quad (2.7)$$

Step 708: The key management system verifies the verification information MAC21.

If the verification fails, step 705 is performed.
If the verification succeeds, step 709 is performed.

In step 708, the key management system may generate verification information MAC22 (namely, fifth verification information), in the same manner as the diagnostic device generates the verification information MAC21, by using the at least one piece of characteristic information used when the temporary key is generated. For example, in the generation manner in step 707, the key management system may generate the verification information MAC22 by using the second symmetric key macKey, the encrypted feature ID, the first random value Nonce1, the second random value Nonce2, the ciphertext C, and the verification information MAC11 based on the formula (2.7). Then, the key management system may determine whether the verification information MAC22 generated by the key management system is the same as the verification information MAC21 generated by the diagnostic device. Theoretically, if the diagnostic device obtains the correct temporary key through parsing, the verification information MAC21 generated by the diagnostic device needs to be the same as the verification information MAC22 generated by the key management system. If the diagnostic device obtains the incorrect temporary key through parsing, there is a high probability that the verification information MAC21 generated by the diagnostic device is different from the verification information MAC22 generated by the key management system. If the diagnostic device does not obtain the temporary key through parsing, the diagnostic device does not send the verification information MAC21.

In this embodiment of this application, after sending the key authorization response to the diagnostic device, the key management system may immediately switch to a waiting state. As long as the verification information MAC21 sent by the diagnostic device is not received, the key management system cannot configure the temporary key for the to-be-diagnosed unit. When receiving the verification information MAC21 sent by the diagnostic device, the key management system may first generate the corresponding verification information MAC22 in the foregoing manner. If the verification information MAC21 is different from the verification information MAC22, it indicates that the temporary key received by the diagnostic device is not the temporary key delivered by the key management system. In this case, the key management system determines that the temporary key is incorrectly delivered (for example, the temporary key is tampered with when being transmitted outside or inside the vehicle). Therefore, the key management system may not configure the temporary key for the to-be-diagnosed unit. For example, when the verification information MAC21 is not received within preset duration, or the key management system determines that the temporary key received by the diagnostic device is not the temporary key delivered by the key management system, the key management system may further prompt (or through the diagnostic device) the diagnostic personnel that a key authorization error occurs, to end the current diagnostic.

Step 709: The key management system configures the temporary key for the to-be-diagnosed unit corresponding to the current diagnostic.

In step 709, when the verification information MAC22 generated by the key management system is the same as the verification information MAC21 generated by the diagnostic device, it indicates that the temporary key received by the diagnostic device is the temporary key delivered by the key management system. In this case, the key management system may configure the temporary key for the to-be-diagnosed unit, so that the diagnostic device cooperates with the to-be-diagnosed unit to complete the diagnostic operation based on the temporary key.

Step 710: The diagnostic device encrypts the to-be-diagnosed information by using the temporary key, to generate the diagnostic request, and send the diagnostic request to the to-be-diagnosed unit.

Step 711: The diagnostic device periodically sends a security heartbeat message to the key management system within validity duration of the temporary key, where the security heartbeat message includes verification information MAC31 (namely, first verification information), and the verification information MAC31 is generated based on the at least one piece of characteristic information used when the temporary key is generated.

In an optional implementation, the diagnostic device may encrypt the feature ID, the first random value Nonce1, and the second random value Nonce2 by using the second symmetric key macKey based on the following formula (2.8), to generate the verification information MAC31:

$$MAC31=HMAC(macKey,Hash(ID\|Nonce1\|Nonce2)) \qquad (2.8)$$

For example, in this embodiment of this application, the temporary key may be configured as one-time one-key. In other words, each temporary key is effective in one diagnostic period corresponding to the temporary key. In this case, because the at least one piece of characteristic information used when the temporary key is generated does not change, the verification information MAC31 generated based on the at least one piece of characteristic information does not change either. In this way, after the diagnostic device sends the diagnostic request, the diagnostic device may calculate the verification information MAC31 only when the security heartbeat message is sent for the first time, and when the security heartbeat message is sent again subsequently, the diagnostic device may directly obtain the verification information MAC31 obtained through the first calculation, and encapsulate the verification information MAC31 in the security heartbeat message, without recalculating the verification information MAC31.

In this embodiment of this application, for each temporary key managed by the key management system, the key management system may pre-generate, based on at least one piece of characteristic information used when the temporary key is generated, verification information MAC32 (namely, second verification information) corresponding to the temporary key in the same manner as generating the verification information MAC31. In this way, each time after receiving a security heartbeat message sent by the diagnostic device, the key management system may match verification information MAC31 carried in the security heartbeat message with the verification information MAC32 corresponding to each temporary key managed by the key management system. If verification information MAC32 corresponding to a temporary key is the same as the verification information MAC31, it indicates that the temporary key is within validity duration, and therefore the key management system may continue to make the temporary key effective. In this manner, the at least one piece of characteristic information used for generating the temporary key is used to generate the verification information MAC31 carried in the security heartbeat message, so that the security heartbeat message is bound to the temporary key (or a diagnostic session corresponding to the temporary key). In this case, as long as the key management system can further receive the security heartbeat message bound to the temporary key, it can be determined that the temporary key is still within the validity duration, and the key management system can continue to make the temporary key effective. In this manner, the security heartbeat message bound to the temporary key is used to maintain the diagnostic session corresponding to the temporary key, so that the key management system can accurately manage each temporary key.

Step 712: The to-be-diagnosed unit decrypts the diagnostic request by using the temporary key to obtain the to-be-diagnosed information, and performs the diagnostic by using the to-be-diagnosed information to obtain a diagnostic result.

Step 713: The to-be-diagnosed unit sends the diagnostic result to the diagnostic device.

Step 714: If the key management system does not receive the security heartbeat message within a piece of period duration, the key management system makes the temporary key in the to-be-diagnosed unit ineffective.

In step 714, when determining that validity duration of a temporary key ends, the diagnostic device may no longer send a security heartbeat message bound to the temporary key. Correspondingly, if the key management system does not receive, within a piece of period duration, the security heartbeat message that matches verification information MAC32 corresponding to the temporary key, it may be determined that the validity duration of the temporary key ends. In this case, the key management system may send ineffectiveness indication information to the to-be-diagnosed unit, so that the to-be-diagnosed unit deletes the temporary key stored in a RAM of the to-be-diagnosed unit.

In Embodiment 2, the temporary key is sent to the diagnostic device in an encrypted ciphertext manner. In this way, regardless of whether the diagnostic device is outside the vehicle or is directly encapsulated in the vehicle, this manner can maximally prevent the temporary key from being tampered with in the transmission process, thereby helping the diagnostic device receive the correct temporary key. Further, in Embodiment 2, the verification information M11 is further set to verify authenticity of ciphertext transmission. Therefore, even if the temporary key is tampered with in the transmission process, this manner can prevent the diagnostic device from obtaining the tampered temporary key to perform the diagnostic as much as possible, thereby effectively protecting security of the vehicle diagnostic.

It should be understood that the formulas in Embodiment 2 may be encapsulated in an underlying communication bearer protocol of the diagnostic device and the to-be-diagnosed vehicle. The underlying communication bearer protocol may be an in-vehicle bus communication protocol, for example, a CAN protocol or a CANFD protocol, or may be an automotive Ethernet communication protocol. This is not specifically limited.

In Embodiment 1 and Embodiment 2, actually, the key management system, the diagnostic device, and the to-be-diagnosed unit complete, in a three-party interaction manner, an entire process of performing the vehicle diagnostic based on the temporary key. In another optional implementation, the operations of the key management system in Embodiment 1 and Embodiment 2 may alternatively be performed on the to-be-diagnosed unit side. In this case, the diagnostic device and the to-be-diagnosed unit may complete, in a two-party interaction manner, the entire process of performing the vehicle diagnostic based on the temporary key. The following describes in detail a specific implementation process of such two-party interaction based on Embodiment 3.

Embodiment 3

Figure 8:
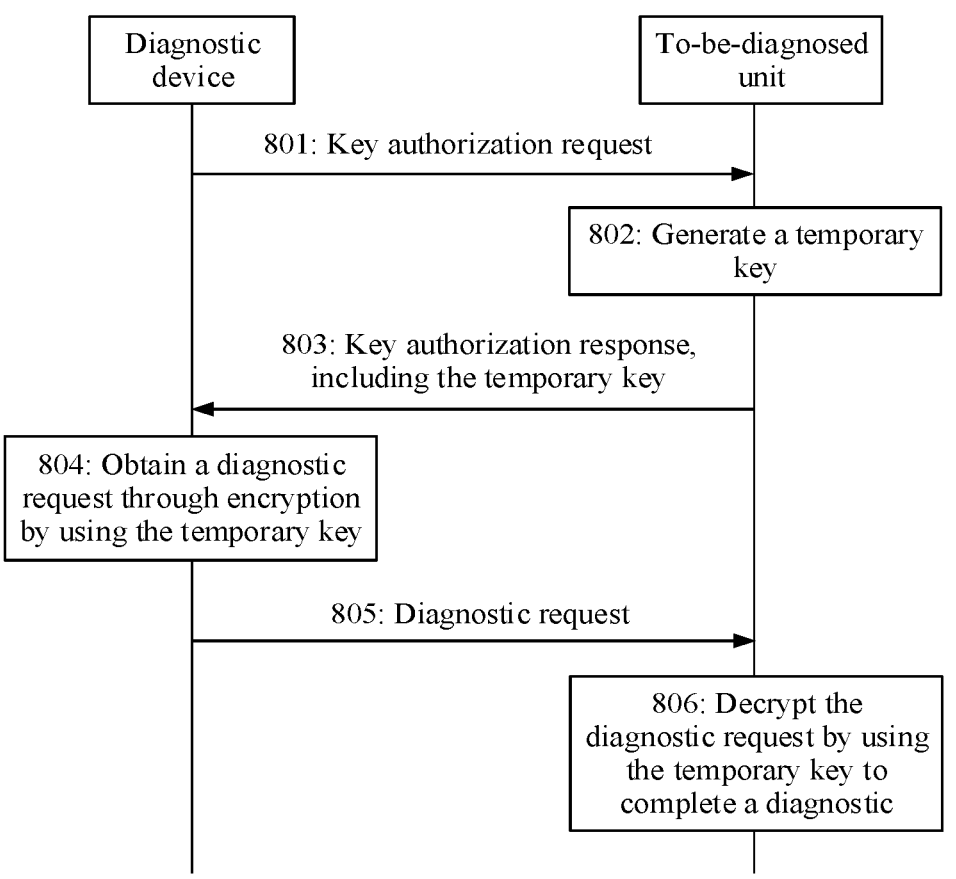
FIG. 8 is an example of a schematic flowchart corresponding to a vehicle diagnostic method according to Embodiment 3 of this application.

FIG. 8 is an example of a schematic flowchart corresponding to a vehicle diagnostic method according to Embodiment 3 of this application. The method is applicable to a diagnostic device and a to-be-diagnosed unit in a to-be-diagnosed vehicle, for example, the diagnostic device and the one or more ECUs shown in FIG. 1. As shown in FIG. 8, the method includes the following steps.

Step 801: The diagnostic device sends a key authorization request to the to-be-diagnosed unit.

In step 801, the to-be-diagnosed unit may have a plurality of possible cases. The following are examples.

In a possible case, the to-be-diagnosed unit may refer to a specific ECU in the to-be-diagnosed vehicle, and the specific ECU is specifically configured to generate a temporary key for each ECU (which may include the specific ECU) in the to-be-diagnosed vehicle. In this case, each time before performing a diagnostic operation, the diagnostic device may first send the key authorization request to the specific ECU. After the specific ECU generates a corresponding temporary key for each ECU in each diagnostic, each diagnostic is completed in combination with the temporary key corresponding to each ECU in each diagnostic.

In another possible case, the to-be-diagnosed unit may refer to one or more ECUs in a current diagnostic. When there is only one ECU in the current diagnostic, the diagnostic device may directly send the key authorization request to the ECU, and the ECU generates a temporary key corresponding to the ECU to complete the diagnostic. When there are a plurality of ECUs in the current diagnostic, the diagnostic device may send the key authorization request to one or more ECUs in the plurality of ECUs. For example, the diagnostic device may separately send the key authorization request to each of the plurality of ECUs, and the plurality of ECUs separately generate respective corresponding temporary keys to complete the diagnostic. For another example, the diagnostic device may alternatively send the key authorization request to only one of the plurality of ECUs, and the ECU generates temporary keys respectively corresponding to the plurality of ECUs to complete the diagnostic. For another example, the diagnostic device may alternatively send the key authorization request to some (at least two) of the plurality of ECUs, and the at least two ECUs share the work of generating temporary keys of the plurality of ECUs, to reduce working pressure of the ECUs.

In another possible case, the to-be-diagnosed unit may be one or more management ECUs in the to-be-diagnosed vehicle. There may be a plurality of management ECUs in the to-be-diagnosed vehicle, each management ECU is configured to manage one or more ECUs in the to-be-diagnosed vehicle, and any two management ECUs manage different ECUs. In this case, each time before performing a diagnostic operation, the diagnostic device may first determine which management ECUs manage the ECUs in the current diagnostic, and then send the key authorization request to the management ECUs. First, the management ECUs generate corresponding temporary keys for ECUs that are in the current diagnostic and that are in ECUs managed by the management ECUs. Then, the diagnostic device completes the current diagnostic based on the temporary keys corresponding to the ECUs in the current diagnostic.

Step 802: The to-be-diagnosed unit generates the temporary key based on the key authorization request, where the temporary key is independent of a long-term key in the to-be-diagnosed vehicle.

In step 802, when there are a plurality of ECUs in the current diagnostic, temporary keys corresponding to the plurality of ECUs may be the same or may be different. For example, to simplify a diagnostic process, a same temporary key may be set for the plurality of ECUs. In this case, if only one ECU (for example, the specific ECU in the foregoing content or one of the ECUs or the management ECU in the current diagnostic in the foregoing content) generates the temporary key of each ECU, the ECU may directly set a temporary key and synchronize the temporary key to each ECU. If at least two ECUs (for example, the at least two ECUs or the at least two management ECUs in the current diagnostic in the foregoing content) generate the temporary key of each ECU, the at least two ECUs each may first set a temporary key of one or more corresponding ECUs, then the at least two ECUs vote to determine a final temporary key, and finally the at least two ECUs each configure the final temporary key for the one or more corresponding ECUs. Alternatively, a polling manner may be used. An ECU in a current turn may directly generate a temporary key, and synchronize the temporary key to another ECU in the at least two ECUs, and the another ECU configure the temporary key for one or more corresponding ECUs. There are many possible implementations, which are not listed one by one herein.

Step 803: The to-be-diagnosed unit sends a key authorization response to the diagnostic device, where the key authorization response includes the temporary key.

For example, after determining a corresponding temporary key, any ECU in the current diagnostic may further store the temporary key locally on the ECU, to make the temporary key effective. It should be noted that, the operation of making the temporary key effective by the ECU may be performed before the to-be-diagnosed unit sends the key authorization response, or may be performed after the to-be-diagnosed unit sends the key authorization response, or may be performed synchronously with the operation of sending the key authorization response by the to-be-diagnosed unit. This is not specifically limited.

Step 804: The diagnostic device obtains a diagnostic request through encryption by using the temporary key carried in the key authorization response.

Step 805: The diagnostic device sends the diagnostic request to a to-be-diagnosed unit.

It should be noted that the to-be-diagnosed unit in step 805 may be the same as or may be different from the to-be-diagnosed unit in step 801 to step 803. For example, if the diagnostic device cooperates with one of the ECUs in the current diagnostic to generate the temporary key of each ECU in the current diagnostic, the to-be-diagnosed unit in step 801 to step 803 may refer to one of the ECUs in the current diagnostic, and the to-be-diagnosed unit in step 805 refers to each ECU in the current diagnostic. If the diagnostic device cooperates with each ECU in the current diagnostic to generate the temporary key of each ECU in the current diagnostic, the to-be-diagnosed unit in step 801 to step 803 and the to-be-diagnosed unit in step 805 refer to each ECU in the current diagnostic.

Step 806: The to-be-diagnosed unit decrypts the diagnostic request by using the temporary key to complete the diagnostic.

It should be noted that, for a specific implementation process of step 803 to step 806, refer to the related technical solutions described in Embodiment 1 and Embodiment 2. For example, a series of operations such as encrypting the temporary key and verifying the ciphertext in Embodiment 1 and Embodiment 2 are also applicable to Embodiment 3 of this application, and details are not described herein again.

In Embodiment 3, the diagnostic device directly cooperates with the to-be-diagnosed unit to complete the diagnostic operation that is based on the temporary key. In this way, the to-be-diagnosed unit can independently set a more appropriate temporary key based on a diagnostic requirement of the to-be-diagnosed unit, and the temporary key can be further transmitted without passing through a third-party device, namely, the key management system. In this way, this manner can improve diagnostic efficiency and reduce communication resources, and can also reduce impact of an insecure factor that the temporary key is tampered with by the third-party device during transmission of the temporary key, thereby improving security of completing the diagnostic based on the temporary key. In addition, because the key management system may no longer participate in the diagnostic that is based on the temporary key, this method can further reduce working pressure of the key management system.

It should be noted that, names of the foregoing information are merely examples. With evolution of communication technologies, the name of any foregoing information may be changed. However, regardless of how the names of the information change, provided that meanings of the information are the same as those of the information in this application, the information falls within the protection scope of this application.

The foregoing mainly describes the solutions provided in this application from a perspective of interaction between the network elements. It may be understood that, to implement the functions, each network element includes a corresponding hardware structure and/or software module for executing each function. A person of ordinary skill in the art should easily be aware that, in combination with the example units and algorithm steps described in embodiments disclosed in this specification, the present application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of the present application.

Figure 9:
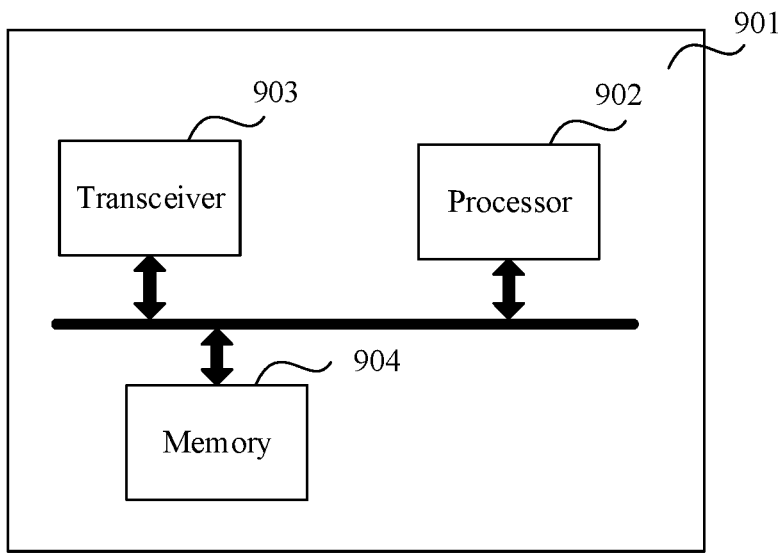
FIG. 9 is a schematic diagram of a structure of a vehicle diagnostic apparatus according to an embodiment of this application.

According to the methods, FIG. 9 is a schematic diagram of a structure of a vehicle diagnostic apparatus according to an embodiment of this application. As shown in FIG. 9, the apparatus may be a key management system, a diagnostic device, or a to-be-diagnosed unit, or may be a chip or a circuit. For example, the apparatus may be a chip or a circuit that may be disposed in a key management system. For another example, the apparatus may be a chip or a circuit that may be disposed in a diagnostic device. For another example, the apparatus may be a chip or a circuit that may be disposed in a to-be-diagnosed unit.

Further, the vehicle diagnostic apparatus 901 may further include a bus system. A processor 902, a memory 904, and a transceiver 903 may be connected by using the bus system.

It should be understood that the processor 902 may be a chip. For example, the processor 902 may be a field-programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

In an implementation process, the steps of the foregoing methods may be implemented by using an integrated logic circuit of hardware in the processor 902 or instructions in a form of software. Steps of the methods disclosed with reference to embodiments of this application may be directly executed and accomplished by using a hardware processor, or may be executed and accomplished by using a combination of hardware and software modules in the processor 902. The software module may be located in a mature storage medium in the art, such as a random access memory, a flash memory, a read-only memory, a programmable read-only memory, an electrically erasable programmable memory, or a register. The storage medium is located in the memory 904. The processor 902 reads information in the memory 904, and completes the steps of the methods in combination with hardware of the processor 902.

It should be noted that, the processor 902 in this embodiment of this application may be an integrated circuit chip, and has a signal processing capability. In an implementation process, the steps in the foregoing method embodiments may be implemented by using an integrated logic circuit of hardware in the processor or instructions in a form of software. The processor may be a general-purpose processor, a DSP, an ASIC, an FPGA or another programmable logic device, a discrete gate or a transistor logic device, or a discrete hardware component. The methods, steps, and logical block diagrams that are disclosed in embodiments of this application may be implemented or performed. The general-purpose processor may be a microprocessor, or the processor may be any conventional processor or the like. Steps of the methods disclosed with reference to embodiments of this application may be directly executed and accomplished by a hardware decoding processor, or may be executed and accomplished by using a combination of hardware and software modules in a decoding processor. The software module may be located in a mature storage medium in the art, such as a RAM, a flash memory, a read-only memory, a programmable read-only memory, an electrically erasable programmable memory, or a register. The storage medium is located in the memory. The processor reads information in the memory and completes the steps in the methods in combination with hardware of the processor.

It may be understood that the memory 904 in this embodiment of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a RAM, and used as an external cache. Through example but not limitative description, many forms of RAMs may be used, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the systems and methods described in this specification include but are not limited to these memories and any memory of another suitable type.

When the vehicle diagnostic apparatus 901 corresponds to the key management system in the methods, the vehicle diagnostic apparatus may include the processor 902, the transceiver 903, and the memory 904. The memory 904 is configured to store instructions. The processor 902 is configured to execute the instructions stored in the memory 904, to implement the related solution of the key management system in one or more corresponding methods shown in FIG. 1 to FIG. 8.

When the vehicle diagnostic apparatus 901 is the key management system, the vehicle diagnostic apparatus 901 may be configured to perform the method performed by the key management system in either of Embodiment 1 and Embodiment 2.

When the vehicle diagnostic apparatus 901 is the key management system, and Embodiment 1 or Embodiment 2 is performed: the transceiver 903 may receive a key authorization request sent by a diagnostic device; the processor 902 may generate a temporary key based on the key authorization request, and configure the temporary key for a to-be-diagnosed unit in a vehicle; and the transceiver 903 may further send a key authorization response to the diagnostic device, and add the temporary key to the key authorization response, so that the diagnostic device and the to-be-diagnosed unit complete a diagnostic based on the temporary key, where the temporary key is independent of a long-term key in the vehicle.

In an optional implementation, the temporary key may correspond to validity duration, and the validity duration corresponding to the temporary key may be pre-configured, or may be indicated by the key authorization request, or may correspond to a time period between a diagnostic start and a diagnostic end.

In an optional implementation, after sending the key authorization response to the diagnostic device, the transceiver 903 may further wait for receiving a security heartbeat message sent by the diagnostic device. If the transceiver 903 does not receive, within preset period duration, the security heartbeat message sent by the diagnostic device, the processor 902 may make the temporary key in the to-be-diagnosed unit ineffective. The security heartbeat message is periodically sent by the diagnostic device to the key management system within the validity duration corresponding to the temporary key.

In an optional implementation, the security heartbeat message may include first verification information, and the first verification information is generated based on at least one piece of characteristic information used when the temporary key is generated. The at least one piece of characteristic information includes at least one of an initial key, a feature identifier, a first random value, or a second random value that is preset. The feature identifier may indicate the to-be-diagnosed unit, the first random value may be generated by the diagnostic device and sent to the key management system, and the second random value may be generated by the key management system and sent to the diagnostic device. In this case, if the transceiver 903 receives, within the preset period duration, the security heartbeat message sent by the diagnostic device, the processor 902 may further generate second verification information based on the at least one piece of characteristic information used when the temporary key is generated, and continue to make the temporary key effective when determining that the second verification information matches the first verification information.

In an optional implementation, the second verification information may meet the following formula:

$$MAC32 = HMAC(macKey, Hash(ID\|Nonce1\|Nonce2)),\ where$$

MAC32 is the second verification information, HMAC is a hash-based message authentication code generation function, macKey is a symmetric key derived based on the preset initial key, ID is the feature identifier, Nonce1 is the first random value, and Nonce2 is the second random value.

In an optional implementation, after configuring the temporary key for the to-be-diagnosed unit in the vehicle, the processor 902 may further make the temporary key in the to-be-diagnosed unit ineffective after validity duration corresponding to the temporary key expires.

In an optional implementation, the temporary key may further correspond to an application scope, and the application scope corresponding to the temporary key indicates the to-be-diagnosed unit to which the current diagnostic is applicable. The application scope corresponding to the temporary key may be pre-configured, or may be indicated by the key authorization request.

In an optional implementation, the processor 902 is specifically configured to configure the temporary key for each to-be-diagnosed unit used for the current diagnostic.

In an optional implementation, the key authorization request may include at least one piece of characteristic information, and the at least one piece of characteristic information includes at least one of the first random value, the feature identifier, or an authorization code. The first random value is generated by the diagnostic device, the feature identifier indicates the to-be-diagnosed unit, and the authorization code indicates the diagnostic device. In this case, before the transceiver 903 sends the key authorization response to the diagnostic device, the processor 902 may further first encrypt the at least one piece of characteristic information by using a first symmetric key to generate a transmission security key, then encrypt the temporary key by using the transmission security key to generate a ciphertext, and finally generate the key authorization response based on the ciphertext. The ciphertext is used by the diagnostic device to perform decryption by using the transmission security key to obtain the temporary key.

In an optional implementation, the processor 902 is specifically configured to first encrypt the ciphertext and the at least one piece of characteristic information by using a second symmetric key to generate third verification information, and then generate the key authorization response based on the third verification information and the ciphertext. The second symmetric key is a symmetric key derived based on the first symmetric key, and the third verification information is used by the diagnostic device to perform verification before the ciphertext is decrypted.

In an optional implementation, after the transceiver 903 sends the key authorization response to the diagnostic device, the transceiver 903 may further receive fourth verification information sent by the diagnostic device, and the processor 902 may further generate fifth verification information by using one or more of the ciphertext, the third verification information, and the at least one piece of characteristic information. If determining that the fourth verification information matches the fifth verification information, the processor 902 may configure the temporary key for the to-be-diagnosed unit in the vehicle. The fourth verification information is generated based on one or more of the ciphertext, the third verification information, and the at least one piece of characteristic information.

In an optional implementation, the transmission security key may meet the following formula:

$$tK = HKDF(AK, ID\|Nonce1\|Nonce2\|string``TransportKey"),$$

where tK is the transmission security key, HKDF is a hash-based message authentication code-based key derivation function, AK is the first symmetric key, ID is the feature identifier, Nonce1 is the first random value, Nonce2 is the second random value, the second random value is generated by the key management system, and "TransportKey" is a character string corresponding to the "transmission security key".

Further, the ciphertext may meet the following formula:

$$C=\text{AES-GCM}(tK,\{M\}),$$

where C is the ciphertext, AES-GCM is an AES symmetric encryption algorithm that uses a counting mode and carries a Galois message authentication code, and {M} is the temporary key.

In an optional implementation, the second symmetric key may meet the following formula:

$$\text{macKey}=\text{HKDF}(\text{AK}, \text{ID}\|\text{Nonce1}\|\text{Nonce2}\|\text{string"MAC"}),$$

where macKey is the second symmetric key, HKDF is the hash-based message authentication code-based key derivation function, AK is the first symmetric key, ID is the feature identifier, Nonce1 is the first random value, Nonce2 is the second random value, the second random value is generated by the key management system, and MAC is the authorization code.

Further, the third verification information may meet the following formula:

$$\text{MAC11}=\text{HKDF}(\text{macKey,Hash} (\text{ID}\|\text{Nonce1}\|\text{Nonce2}\|C)),$$

where MAC11 is the third verification information, C is the ciphertext, and Hash is a hash function.

In an optional implementation, the fifth verification information may meet the following formula:

$$\text{MAC22}=\text{HMAC}(\text{macKey,Hash} (\text{ID}\|\text{Nonce1}\|\text{Nonce2}\|C\|\text{MAC11})),$$

where MAC22 is the fifth verification information, HMAC is the hash-based message authentication code generation function, macKey is the second symmetric key, Hash is the hash function, ID is the feature identifier, Nonce1 is the first random value, Nonce2 is the second random value, the second random value is generated by the key management system, C is the ciphertext, and MAC11 is the third verification information.

For concepts, explanations, detailed descriptions, and other steps of the vehicle diagnostic apparatus 901 that are related to the technical solutions of the key management system provided in embodiments of this application, refer to the descriptions of the content in the methods or other embodiments. Details are not described herein again.

When the vehicle diagnostic apparatus 901 corresponds to the diagnostic device in the methods, the vehicle diagnostic apparatus may include the processor 902, the transceiver 903, and the memory 904. The memory 904 is configured to store instructions. The processor 902 is configured to execute the instructions stored in the memory 904, to implement the related solution of the key diagnostic device in one or more corresponding methods shown in FIG. 1 to FIG. 8.

When the vehicle diagnostic apparatus 901 is the diagnostic device, the vehicle diagnostic apparatus 901 may be configured to perform the method performed by the diagnostic device in any one of Embodiment 1 to Embodiment 3.

When the vehicle diagnostic apparatus 901 is the diagnostic device, and Embodiment 1 or Embodiment 2 is performed: the transceiver 903 may send a key authorization request to a key management system in a vehicle; after the key management system generates a temporary key based on the key authorization request and configures the temporary key for a to-be-diagnosed unit in the vehicle, the transceiver 903 may receive a key authorization response sent by the key management system; and then the processor 902 initiates a diagnostic operation on the to-be-diagnosed unit by using the temporary key included in the key authorization response, where the temporary key is independent of a long-term key in the vehicle.

In an optional implementation, the processor 902 is specifically configured to encrypt to-be-diagnosed information by using the temporary key to generate a diagnostic request. The transceiver 903 is further configured to send the diagnostic request to the to-be-diagnosed unit, and receive a diagnostic result sent by the to-be-diagnosed unit. The diagnostic request is used by the to-be-diagnosed unit configured with the temporary key to perform a diagnostic based on the to-be-diagnosed information carried in the diagnostic request to obtain the diagnostic result.

In an optional implementation, the temporary key may further correspond to validity duration, and the validity duration corresponding to the temporary key may be pre-configured, or may be indicated by the key authorization request, or may correspond to a time period between a diagnostic start and a diagnostic end.

In an optional implementation, after the transceiver 903 sends the diagnostic request to the to-be-diagnosed unit, and before the transceiver 903 receives the diagnostic result sent by the to-be-diagnosed unit, the transceiver 903 may further send a security heartbeat message to the key management system based on preset period duration within the validity duration corresponding to the temporary key. The security heartbeat message is used by the key management system to continue to make the temporary key effective.

In an optional implementation, before the transceiver 903 sends the security heartbeat message to the key management system, the processor 902 may further generate first verification information by using at least one piece of characteristic information used when the temporary key is generated, and generate the security heartbeat message based on the first verification information. The first verification information is used to verify the security heartbeat message.

In an optional implementation, the at least one piece of characteristic information may include at least one of an initial key, a feature identifier, a first random value, or a second random value that is preset. The feature identifier indicates the to-be-diagnosed unit, the first random value may be generated by the diagnostic device and sent to the key management system, and the second random value may be generated by the key management system and sent to the diagnostic device. In this case, the first verification information may meet the following formula:

$$\text{MAC31}=\text{HMAC}(\text{macKey,Hash} (\text{ID}\|\text{Nonce1}\|\text{Nonce2})),$$

where MAC32 is the first verification information, HMAC is a hash-based message authentication code generation function, macKey is a symmetric key derived based on the preset initial key, ID is the feature identifier, Nonce1 is the first random value, and Nonce2 is the second random value.

In an optional implementation, the temporary key may further correspond to an application scope, and the application scope corresponding to the temporary key may indicate the to-be-diagnosed unit. The application scope corresponding to the temporary key may be pre-configured, or may be indicated by the key authorization request.

In an optional implementation, the key authorization response may include a ciphertext, the ciphertext may be obtained by the key management system by encrypting the temporary key based on a transmission security key, and the transmission security key is obtained by the key management system by encrypting at least one piece of characteristic information based on a first symmetric key. The at least one piece of characteristic information may be carried in the key authorization request and sent to the key management system. The at least one piece of characteristic information may include at least one of the first random value, the feature identifier, or an authorization code. The first random value may be generated by the diagnostic device, the feature identifier indicates the to-be-diagnosed unit, and the authorization code indicates the diagnostic device. In this case, after the transceiver 903 receives the key authorization response sent by the key management system, the processor 902 may further encrypt the at least one piece of characteristic information by using the first symmetric key to generate the transmission security key, and decrypt the ciphertext by using the transmission security key to obtain the temporary key.

In an optional implementation, the key authorization response may further include third verification information, the third verification information may be obtained by the key management system by encrypting the ciphertext and the at least one piece of characteristic information based on a second symmetric key, and the second symmetric key is a symmetric key derived based on the first symmetric key. In this case, before the processor 902 encrypts the at least one piece of characteristic information by using the first symmetric key to generate the transmission security key, the processor 902 may further first derive the second symmetric key based on the first symmetric key, and then encrypt the ciphertext and the at least one piece of characteristic information by using the second symmetric key to obtain sixth verification information. If determining that the sixth verification information matches the third verification information, the processor 902 may encrypt the at least one piece of characteristic information by using the first symmetric key to generate the transmission security key. If determining that the sixth verification information does not match the third verification information, the processor 902 may not generate the transmission security key.

In an optional implementation, after the processor 902 decrypts the ciphertext by using the transmission security key to obtain the temporary key, the processor 902 may further generate fourth verification information based on one or more of the ciphertext, the third verification information, and the at least one piece of characteristic information. The transceiver 903 may further send the fourth verification information to the key management system, so that the key management system verifies the fourth verification information before configuring the temporary key.

In an optional implementation, the transmission security key may meet the following formula:

$$tK=HKDF(AK, ID\|Nonce1\|Nonce2\|string``TransportKey"),$$

where tK is the transmission security key, HKDF is a hash-based message authentication code-based key derivation function, AK is the first symmetric key, ID is the feature identifier, Nonce1 is the first random value, Nonce2 is the second random value, the second random value is generated by the key management system, and "TransportKey" is a character string corresponding to the "transmission security key".

Further, the ciphertext may meet the following formula:

$$C=AES\text{-}GCM(tK,\{M\}),$$

where C is the ciphertext, AES-GCM is an AES symmetric encryption algorithm that uses a counting mode and carries a Galois message authentication code, and {M} is the temporary key.

In an optional implementation, the second symmetric key may meet the following formula:

$$macKey=HKDF(AK, ID\|Nonce1\|Nonce2\|string``MAC"),$$

where macKey is the second symmetric key, HKDF is the hash-based message authentication code-based key derivation function, AK is the first symmetric key, ID is the feature identifier, Nonce1 is the first random value, Nonce2 is the second random value, the second random value is generated by the key management system, and MAC is the authorization code.

Further, the sixth verification information may meet the following formula:

$$MAC12=HKDF(macKey,Hash (ID\|Nonce1\|Nonce2\|C)),$$

where MAC12 is the fourth verification information, C is the ciphertext, and Hash is a hash function.

In an optional implementation, the fourth verification information may meet the following formula:

$$MAC21=HMAC(macKey,Hash (ID\|Nonce1\|Nonce2\|C\|MAC11)),$$

where MAC21 is the fourth verification information, HMAC is the hash-based message authentication code generation function, macKey is the second symmetric key, Hash is the hash function, ID is the feature identifier, Nonce1 is the first random value, Nonce2 is the second random value, the second random value is generated by the key management system, C is the ciphertext, and MAC11 is the third verification information.

When the vehicle diagnostic apparatus 901 is the diagnostic device, and Embodiment 3 is performed: the transceiver 903 may send a key authorization request to a to-be-diagnosed unit in a vehicle, and after the to-be-diagnosed unit generates a temporary key based on the key authorization request, receive a key authorization response sent by the to-be-diagnosed unit; and the processor 902 may initiate a diagnostic operation on the to-be-diagnosed unit by using the temporary key included in the key authorization response, where the temporary key is independent of a long-term key in the vehicle.

In an optional implementation, the processor 902 is specifically configured to encrypt to-be-diagnosed information by using the temporary key to generate a diagnostic request. The transceiver 903 is further configured to send the diagnostic request to the to-be-diagnosed unit, and receive a diagnostic result sent by the to-be-diagnosed unit. The diagnostic request is used by the to-be-diagnosed unit to perform a diagnostic and obtain the diagnostic result based on the to-be-diagnosed information obtained by parsing the diagnostic request by using the temporary key.

In an optional implementation, the temporary key may further correspond to validity duration, and the validity duration corresponding to the temporary key may be pre-configured, or may be indicated by the key authorization request, or may correspond to a time period between a diagnostic start and a diagnostic end.

In an optional implementation, after the transceiver 903 sends the diagnostic request to the to-be-diagnosed unit, and before the transceiver 903 receives the diagnostic result sent by the to-be-diagnosed unit, the transceiver 903 may further send a security heartbeat message to the to-be-diagnosed unit based on preset period duration within the validity duration corresponding to the temporary key. The security heartbeat message is used by the to-be-diagnosed unit to continue to make the temporary key effective.

In an optional implementation, before the transceiver 903 sends the security heartbeat message to the to-be-diagnosed unit, the processor 902 may further generate first verification information by using at least one piece of characteristic information used when the temporary key is generated, and generate the security heartbeat message based on the first verification information. The first verification information is used by the to-be-diagnosed unit to verify the security heartbeat message.

In an optional implementation, the at least one piece of characteristic information may include at least one of an initial key, a feature identifier, a first random value, or a second random value that is preset. The feature identifier indicates the to-be-diagnosed unit, the first random value is generated by the diagnostic device and sent to the to-be-diagnosed unit, and the second random value is generated by the to-be-diagnosed unit and sent to the diagnostic device. In this case, the first verification information may meet the following formula:

$$MAC31=HMAC(macKey,Hash\ (ID\|Nonce1\|Nonce2)),$$

where MAC32 is the first verification information, HMAC is a hash-based message authentication code generation function, macKey is a symmetric key derived based on the preset initial key, ID is the feature identifier, Nonce1 is the first random value, and Nonce2 is the second random value.

In an optional implementation, the temporary key may further correspond to an application scope, and the application scope corresponding to the temporary key indicates the to-be-diagnosed unit. The application scope corresponding to the temporary key may be pre-configured, or may be indicated by the key authorization request.

In an optional implementation, the key authorization response may further include a ciphertext, the ciphertext is obtained by the to-be-diagnosed unit by encrypting the temporary key based on a transmission security key, and the transmission security key is obtained by the to-be-diagnosed unit by encrypting at least one piece of characteristic information based on a first symmetric key. The at least one piece of characteristic information is carried in the key authorization request and sent to the to-be-diagnosed unit. The at least one piece of characteristic information includes at least one of the first random value, the feature identifier, or an authorization code. The first random value is generated by the diagnostic device, the feature identifier indicates the to-be-diagnosed unit, and the authorization code indicates the diagnostic device. In this case, after the transceiver 903 receives the key authorization response sent by the to-be-diagnosed unit, the processor 902 may further encrypt the at least one piece of characteristic information by using the first symmetric key to generate the transmission security key, and decrypt the ciphertext by using the transmission security key to obtain the temporary key.

In an optional implementation, the key authorization response may further include third verification information, the third verification information is obtained by the to-be-diagnosed unit by encrypting the ciphertext and the at least one piece of characteristic information based on a second symmetric key, and the second symmetric key is a symmetric key derived based on the first symmetric key. In this case, before the processor 902 encrypts the at least one piece of characteristic information by using the first symmetric key to generate the transmission security key, the processor 902 may further first derive the second symmetric key based on the first symmetric key, and then encrypt the ciphertext and the at least one piece of characteristic information by using the second symmetric key to obtain sixth verification information. If the sixth verification information matches the third verification information, the processor 902 may encrypt the at least one piece of characteristic information by using the first symmetric key to generate the transmission security key. If the sixth verification information does not match the third verification information, the processor 902 may not generate the transmission security key.

In an optional implementation, after the processor 902 decrypts the ciphertext by using the transmission security key to obtain the temporary key, the processor 902 may further generate fourth verification information based on one or more of the ciphertext, the third verification information, and the at least one piece of characteristic information. The transceiver 903 may further send the fourth verification information to the to-be-diagnosed unit, so that the to-be-diagnosed unit verifies the fourth verification information before configuring the temporary key.

In an optional implementation, the transmission security key may meet the following formula:

$$tK=HKDF(AK,\ ID\|Nonce1\|Nonce2\|string"TransportKey"),$$

where tK is the transmission security key, HKDF is a hash-based message authentication code-based key derivation function, AK is the first symmetric key, ID is the feature identifier, Nonce1 is the first random value, Nonce2 is the second random value, the second random value is generated by the to-be-diagnosed unit, and "TransportKey" is a character string corresponding to the "transmission security key".

Further, the ciphertext may meet the following formula:

$$C=AES\text{-}GCM(tK,\{M\}),$$

where C is the ciphertext, AES-GCM is an AES symmetric encryption algorithm that uses a counting mode and carries a Galois message authentication code, and {M} is the temporary key.

In an optional implementation, the second symmetric key may meet the following formula:

$$macKey=HKDF(AK,\ ID\|Nonce1\|Nonce2\|string"MAC"),$$

where macKey is the second symmetric key, HKDF is the hash-based message authentication code-based key derivation function, AK is the first symmetric key, ID is the feature identifier, Nonce1 is the first random value, Nonce2 is the second random value, the second random value is generated by the to-be-diagnosed unit, and MAC is the authorization code.

Further, the sixth verification information may meet the following formula:

$$MAC12=HKDF(macKey,Hash\ (ID\|Nonce1\|Nonce2\|C)),$$

where MAC12 is the fourth verification information, C is the ciphertext, and Hash is a hash function.

In an optional implementation, the fourth verification information may meet the following formula:

$$MAC21=HMAC(macKey,Hash\ (ID\|Nonce1\|Nonce2\|C\|MAC11)),$$

where MAC21 is the fourth verification information, HMAC is the hash-based message authentication code generation function, macKey is the second symmetric key, Hash is the hash function, ID is the feature identifier, Nonce1 is the first random value, Nonce2 is the second random value, the second random value is generated by the to-be-diagnosed unit, C is the ciphertext, and MAC11 is the third verification information.

For concepts, explanations, detailed descriptions, and other steps of the vehicle diagnostic apparatus 901 that are related to the technical solutions of the diagnostic device provided in embodiments of this application, refer to the descriptions of the content in the methods or other embodiments. Details are not described herein again.

When the vehicle diagnostic apparatus 901 corresponds to the to-be-diagnosed unit in the methods, the vehicle diagnostic apparatus may include the processor 902, the transceiver 903, and the memory 904. The memory 904 is configured to store instructions. The processor 902 is configured to execute the instructions stored in the memory 904, to implement the related solution of the to-be-diagnosed unit in one or more corresponding methods shown in FIG. 1 to FIG. 8.

When the vehicle diagnostic apparatus 901 is the to-be-diagnosed unit, the vehicle diagnostic apparatus 901 may be configured to perform the method performed by the to-be-diagnosed unit in any one of Embodiment 1 to Embodiment 3.

When the vehicle diagnostic apparatus 901 is the to-be-diagnosed unit, and Embodiment 1 or Embodiment 2 is performed: the transceiver 903 may obtain a temporary key, and receive a diagnostic request sent by a diagnostic device, where the diagnostic request is generated by the temporary key encrypted information; and the processor 902 may decrypt the diagnostic request by using the temporary key to complete a diagnostic, where the temporary key is independent of a long-term key in the vehicle.

In an optional implementation, the transceiver 903 is specifically configured to receive temporary key effective information sent by a key management system in the vehicle, where the temporary key effective information includes the temporary key. The processor 902 is further configured to store the temporary key carried in the temporary key effective information in a RAM of the to-be-diagnosed unit.

In an optional implementation, after the processor 902 stores the temporary key carried in the temporary key effective information in the RAM of the to-be-diagnosed unit, the transceiver 903 may further receive temporary key ineffective information sent by the key management system, where the temporary key ineffective information includes the temporary key, and the processor 902 may further delete the temporary key carried in the temporary key ineffective information from the RAM of the to-be-diagnosed unit.

When the vehicle diagnostic apparatus 901 is the to-be-diagnosed unit, and Embodiment 3 is performed: the transceiver 903 may receive a key authorization request sent by a diagnostic device; the processor 902 may generate a temporary key based on the key authorization request; the transceiver 903 may further send a key authorization response to the diagnostic device, and add the temporary key to the key authorization response; and the processor 902 may further complete a diagnostic based on the temporary key, where the temporary key is independent of a long-term key in the to-be-diagnosed vehicle.

In an optional implementation, the processor 902 may further generate, for another to-be-diagnosed unit, a temporary key corresponding to the another to-be-diagnosed unit.

In an optional implementation, the transceiver 903 is specifically configured to receive a diagnostic request sent by the diagnostic device. The processor 903 is specifically configured to decrypt the diagnostic request by using the temporary key to obtain to-be-diagnosed information, and perform a diagnostic operation based on the to-be-diagnosed information to obtain a diagnostic result. The transceiver 903 is further configured to send the diagnostic result to the diagnostic device.

In an optional implementation, the temporary key may further correspond to validity duration, and the validity duration corresponding to the temporary key may be pre-configured, or may be indicated by the key authorization request, or may correspond to a time period between a diagnostic start and a diagnostic end.

In an optional implementation, after the transceiver 903 sends the key authorization response to the diagnostic device, the transceiver 903 may further wait for receiving a security heartbeat message sent by the diagnostic device. If the transceiver 903 does not receive, within preset period duration, the security heartbeat message sent by the diagnostic device, the processor 902 may make the temporary key ineffective. The security heartbeat message is periodically sent by the diagnostic device to the to-be-diagnosed unit within the validity duration corresponding to the temporary key.

In an optional implementation, the security heartbeat message may include first verification information, and the first verification information is generated based on at least one piece of characteristic information used when the temporary key is generated. The at least one piece of characteristic information includes at least one of an initial key, a feature identifier, a first random value, or a second random value that is preset. The feature identifier indicates the to-be-diagnosed unit, the first random value is generated by the diagnostic device and sent to the to-be-diagnosed unit, and the second random value is generated by the to-be-diagnosed unit and sent to the diagnostic device. In this case, if the transceiver 903 receives, within the preset period duration, the security heartbeat message sent by the diagnostic device, the processor 902 may further generate second verification information based on the at least one piece of characteristic information used when the temporary key is generated. If it is determined that the second verification information matches the first verification information, the temporary key may continue to be effective.

In an optional implementation, the second verification information may meet the following formula:

$$MAC32=HMAC(macKey,Hash(ID\|Nonce1\|Nonce2)),$$

where MAC32 is the second verification information, HMAC is a hash-based message authentication code generation function, macKey is a symmetric key derived based on the preset initial key, ID is the feature identifier, Nonce1 is the first random value, and Nonce2 is the second random value.

In an optional implementation, after the processor 902 generates the temporary key, the processor 902 may further make a configuration of the temporary key effective, and make the temporary key ineffective after validity duration corresponding to the temporary key expires.

In an optional implementation, the temporary key may further correspond to an application scope, and the application scope corresponding to the temporary key indicates the to-be-diagnosed unit. The application scope corresponding to the temporary key may be pre-configured, or may be indicated by the key authorization request.

In an optional implementation, the processor 902 is specifically configured to configure the temporary key for each to-be-diagnosed unit used for the current diagnostic.

In an optional implementation, the key authorization request may include at least one piece of characteristic information, and the at least one piece of characteristic information includes at least one of the first random value, the feature identifier, or an authorization code. The first random value is generated by the diagnostic device, the feature identifier indicates the to-be-diagnosed unit, and the authorization code indicates the diagnostic device. In this case, before the transceiver 903 sends the key authorization response to the diagnostic device, the processor 902 may further first encrypt the at least one piece of characteristic information by using a first symmetric key to generate a transmission security key, then encrypt the temporary key by using the transmission security key to generate a ciphertext, and finally generate the key authorization response based on the ciphertext. The ciphertext is used by the diagnostic device to perform decryption by using the transmission security key to obtain the temporary key.

In an optional implementation, the processor 902 is specifically configured to first encrypt the ciphertext and the at least one piece of characteristic information by using a second symmetric key to generate third verification information, and then generate the key authorization response based on the third verification information and the ciphertext. The second symmetric key is a symmetric key derived based on the first symmetric key, and the third verification information is used by the diagnostic device to perform verification before the ciphertext is decrypted.

In an optional implementation, after the transceiver 903 sends the key authorization response to the diagnostic device, the transceiver 903 may further receive fourth verification information sent by the diagnostic device, and the processor 902 may further generate fifth verification information by using one or more of the ciphertext, the third verification information, and the at least one piece of characteristic information. If determining that the fourth verification information matches the fifth verification information, the processor 902 may make the configuration of the temporary key effective. If determining that the fourth verification information does not match the fifth verification information, the processor 902 may not make the configuration of the temporary key effective. The fourth verification information is generated based on one or more of the ciphertext, the third verification information, and the at least one piece of characteristic information.

In an optional implementation, the transmission security key may meet the following formula:

$$tK=HKDF(AK, ID\|Nonce1\|Nonce2\|string"TransportKey"),$$

where tK is the transmission security key, HKDF is a hash-based message authentication code-based key derivation function, AK is the first symmetric key, ID is the feature identifier, Nonce1 is the first random value, Nonce2 is the second random value, the second random value is generated by the to-be-diagnosed unit, and "TransportKey" is a character string corresponding to the "transmission security key".

Further, the ciphertext may meet the following formula:

$$C=AES\text{-}GCM(tK,\{M\}),$$

where C is the ciphertext, AES-GCM is an AES symmetric encryption algorithm that uses a counting mode and carries a Galois message authentication code, and $\{M\}$ is the temporary key.

In an optional implementation, the second symmetric key may meet the following formula:

$$macKey=HKDF(AK, ID\|Nonce1\|Nonce2\|string"MAC"),$$

where macKey is the second symmetric key, HKDF is the hash-based message authentication code-based key derivation function, AK is the first symmetric key, ID is the feature identifier, Nonce1 is the first random value, Nonce2 is the second random value, the second random value is generated by the to-be-diagnosed unit, and MAC is the authorization code.

Further, the third verification information may meet the following formula:

$$MAC11=HKDF(macKey,Hash (ID\|Nonce1\|Nonce2\|C)),$$

where MAC11 is the third verification information, C is the ciphertext, and Hash is a hash function.

In an optional implementation, the fifth verification information may meet the following formula:

$$MAC22=HMAC(macKey,Hash (ID\|Nonce1\|Nonce2\|C\|MAC11)),$$

where MAC22 is the fifth verification information, HMAC is the hash-based message authentication code generation function, macKey is the second symmetric key, Hash is the hash function, ID is the feature identifier, Nonce1 is the first random value, Nonce2 is the second random value, the second random value is generated by the to-be-diagnosed unit, C is the ciphertext, and MAC11 is the third verification information.

In an optional implementation, the processor 902 is specifically configured to store the temporary key in a RAM of the to-be-diagnosed unit.

In an optional implementation, the processor 902 is specifically configured to delete the temporary key stored in the RAM of the to-be-diagnosed unit.

For concepts, explanations, detailed descriptions, and other steps of the vehicle diagnostic apparatus 901 that are related to the technical solutions of the to-be-diagnosed unit provided in embodiments of this application, refer to the descriptions of the content in the methods or other embodiments. Details are not described herein again.

Figure 10:
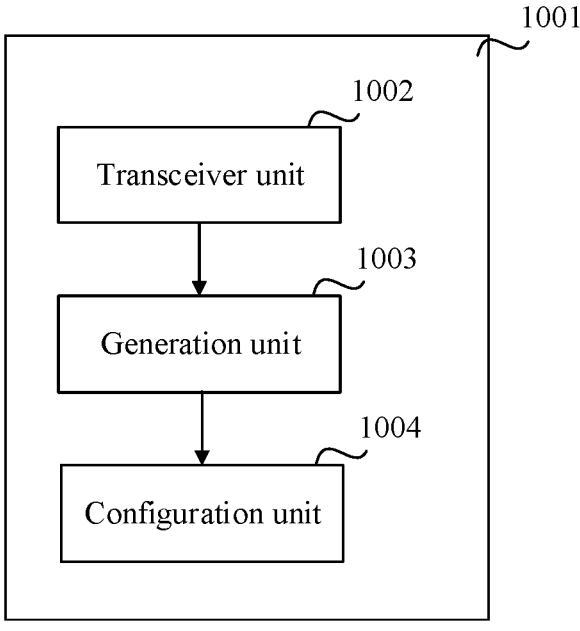
FIG. 10 is a schematic diagram of a structure of another vehicle diagnostic apparatus according to an embodiment of this application.

Based on the foregoing embodiments and the same concept, FIG. 10 is a schematic diagram of a vehicle diagnostic apparatus according to an embodiment of this application. As shown in FIG. 10, the vehicle diagnostic apparatus 1001 may be a key management system in a vehicle, or may be a chip or a circuit, for example, a chip or a circuit that may be disposed in a key management system.

The vehicle diagnostic apparatus may correspond to the key management system in the methods. The vehicle diagnostic apparatus may implement the steps performed by the key management system in any one or more corresponding methods shown in FIG. 1 to FIG. 8. The vehicle diagnostic apparatus may include a transceiver unit 1002, a generation unit 1003, and a configuration unit 1004.

When the vehicle diagnostic apparatus 1001 is the key management system, the transceiver unit 1002 may receive a key authorization request sent by a diagnostic device; the generation unit 1003 may generate a temporary key based on the key authorization request; the transceiver unit 1002 may further send a key authorization response to the diagnostic device, and add the temporary key to the key authorization response; the configuration unit 1004 may configure the temporary key to a to-be-diagnosed unit in the vehicle, so that the diagnostic device and the to-be-diagnosed unit complete a diagnostic based on the temporary key. The temporary key is independent of a long-term key in the vehicle.

The transceiver unit 1002 may be a sending unit or a transmitter when sending information. The transceiver unit 1002 may be a receiving unit or a receiver when receiving information. The transceiver unit 1002 may be a transceiver. The transceiver, the transmitter, or the receiver may be a radio frequency circuit. When the vehicle diagnostic apparatus 1001 includes a storage unit, the storage unit is configured to store computer instructions. The generation unit 1003 and the configuration unit 1004 are communicatively connected to the storage unit. The generation unit 1003 and the configuration unit 1004 separately execute the computer instructions stored in the storage unit, so that the vehicle diagnostic apparatus 1001 may be configured to perform the method performed by the key management system in either of Embodiment 1 and Embodiment 2. The generation unit 1003 or the configuration unit 1004 may be a general-purpose CPU, a microprocessor, or an ASIC.

When the vehicle diagnostic apparatus 1001 is the key management system, the transceiver unit 1002 may be an input and/or output interface, a pin, a circuit, or the like. The generation unit 1003 and the configuration unit 1004 may execute computer-executable instructions stored in the storage unit, so that the chip in the vehicle diagnostic apparatus 1001 performs the method performed in either of Embodiment 1 and Embodiment 2. Optionally, the storage unit is a storage unit in the chip, for example, a register or a buffer. The storage unit may alternatively be a storage unit that is in the vehicle diagnostic apparatus 1001 and that is located outside the chip, for example, a ROM, another type of static storage device that can store static information and instructions, or a RAM.

For concepts, explanations, detailed descriptions, and other steps of the vehicle diagnostic apparatus 1001 that are related to the technical solutions provided in embodiments of this application, refer to the descriptions of the content in the methods or other embodiments. Details are not described herein again.

Figure 11:
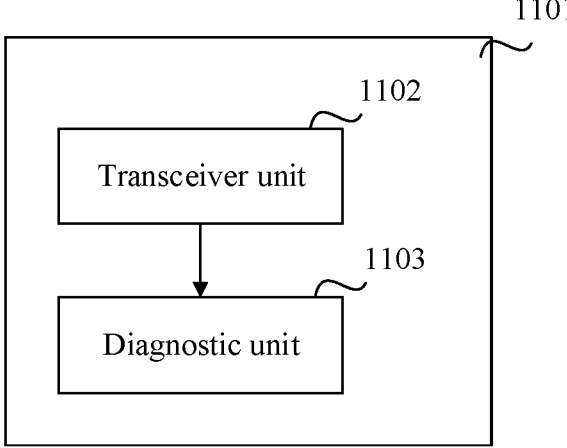
FIG. 11 is a schematic diagram of a structure of another vehicle diagnostic apparatus according to an embodiment of this application.

Based on the foregoing embodiments and the same concept, FIG. 11 is a schematic diagram of a vehicle diagnostic apparatus according to an embodiment of this application. As shown in FIG. 11, the vehicle diagnostic apparatus 1101 may be a diagnostic device in a vehicle, or may be a chip or a circuit, for example, a chip or a circuit that may be disposed in a diagnostic device.

The vehicle diagnostic apparatus may correspond to the diagnostic device in the methods. The vehicle diagnostic apparatus may implement the steps performed by the diagnostic device in any one or more corresponding methods shown in FIG. 1 to FIG. 8. The vehicle diagnostic apparatus may include a transceiver unit 1102 and a diagnostic unit 1103.

When the vehicle diagnostic apparatus 1101 is the diagnostic device and implements the steps performed by the diagnostic device in FIG. 3, the transceiver unit 1102 may send a key authorization request to a key management system in a vehicle, and after the key management system generates a temporary key based on the key authorization request and configures the temporary key for a to-be-diagnosed unit in the vehicle, receive a key authorization response sent by the key management system. The diagnostic unit 1103 may initiate a diagnostic operation on the to-be-diagnosed unit by using the temporary key included in the key authorization response. The temporary key is independent of a long-term key in the vehicle.

When the vehicle diagnostic apparatus 1101 is the diagnostic device and implements the steps performed by the diagnostic device in FIG. 8, the transceiver unit 1102 may send a key authorization request to a to-be-diagnosed unit in a vehicle, and after the to-be-diagnosed unit generates a temporary key based on the key authorization request, receive a key authorization response sent by the to-be-diagnosed unit, where the key authorization response includes the temporary key. The diagnostic unit 1103 may initiate a diagnostic operation on the to-be-diagnosed unit by using the temporary key. The temporary key is independent of a long-term key in the vehicle.

The transceiver unit 1102 may be a sending unit or a transmitter when sending information. The transceiver unit 1102 may be a receiving unit or a receiver when receiving information. The transceiver unit 1102 may be a transceiver. The transceiver, the transmitter, or the receiver may be a radio frequency circuit. When the vehicle diagnostic apparatus 1101 includes a storage unit, the storage unit is configured to store computer instructions. The diagnostic unit 1103 is communicatively connected to the storage unit. The diagnostic unit 1103 executes the computer instructions stored in the storage unit, so that the vehicle diagnostic apparatus 1101 may be configured to perform the method performed by the diagnostic device in any one of Embodiment 1 to Embodiment 3. The diagnostic unit 1103 may be a general-purpose central processing unit (CPU), a microprocessor, or an application-specific integrated circuit (ASIC).

When the vehicle diagnostic apparatus 1101 is a chip, the transceiver unit 1102 may be an input and/or output interface, a pin, a circuit, or the like. The diagnostic unit 1103 may execute computer-executable instructions stored in the storage unit, so that the chip in the vehicle diagnostic apparatus 1101 performs the method performed in either of Embodiment 1 and Embodiment 2. Optionally, the storage unit is a storage unit in the chip, for example, a register or a buffer. The storage unit may alternatively be a storage unit that is in the vehicle diagnostic apparatus 1101 and that is located outside the chip, for example, a ROM, another type of static storage device that can store static information and instructions, or a RAM.

For concepts, explanations, detailed descriptions, and other steps of the vehicle diagnostic apparatus 1101 that are related to the technical solutions provided in embodiments of this application, refer to the descriptions of the content in the methods or other embodiments. Details are not described herein again.

Figure 12:
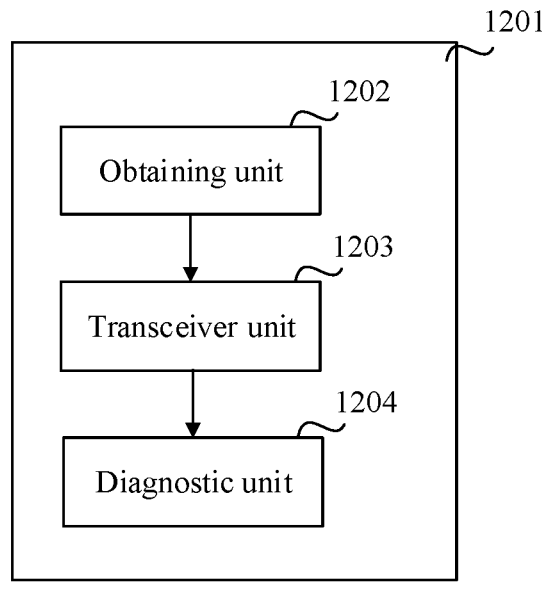
FIG. 12 is a schematic diagram of a structure of another vehicle diagnostic apparatus according to an embodiment of this application.

Based on the foregoing embodiments and the same concept, FIG. 12 is a schematic diagram of a vehicle diagnostic apparatus according to an embodiment of this application. As shown in FIG. 12, the vehicle diagnostic apparatus 1201 may be a to-be-diagnosed unit in a vehicle, or may be a chip or a circuit, for example, a chip or a circuit that may be disposed in a to-be-diagnosed unit. The to-be-diagnosed unit may be any ECU in the vehicle.

The vehicle diagnostic apparatus may correspond to the to-be-diagnosed unit in the methods. The vehicle diagnostic apparatus may implement the steps performed by the to-be-diagnosed unit in any one or more corresponding methods shown in FIG. 1 to FIG. 8. The vehicle diagnostic apparatus may include an obtaining unit 1202, a transceiver unit 1203, and a diagnostic unit 1204.

When the vehicle diagnostic apparatus 1201 is the to-be-diagnosed unit and implements the steps performed by the to-be-diagnosed unit in FIG. 3, the obtaining unit 1202 may obtain a temporary key; the transceiver unit 1203 may receive a diagnostic request sent by a diagnostic device, where the diagnostic request is generated by the temporary key encrypted information; and the diagnostic unit 1204 may decrypt the diagnostic request by using the temporary key to complete a diagnostic. The temporary key is independent of a long-term key in the vehicle.

The transceiver unit 1203 may be a sending unit or a transmitter when sending information. The transceiver unit 1203 may be a receiving unit or a receiver when receiving information. The transceiver unit 1203 may be a transceiver. The transceiver, the transmitter, or the receiver may be a radio frequency circuit. When the vehicle diagnostic apparatus 1201 includes a storage unit, the storage unit is configured to store computer instructions. The obtaining unit 1202 or the diagnostic unit 1204 may be communicatively connected to the storage unit. The obtaining unit 1202 or the diagnostic unit 1204 executes the computer instructions stored in the storage unit, so that the vehicle diagnostic apparatus 1201 may be configured to perform the method performed by the to-be-diagnosed unit in either of Embodiment 1 and Embodiment 2. The obtaining unit 1202 or the diagnostic unit 1204 may be a general-purpose CPU, a microprocessor, or an ASIC.

When the vehicle diagnostic apparatus 1201 is a chip, the transceiver unit 1203 may be an input and/or output interface, a pin, a circuit, or the like. The obtaining unit 1202 or the diagnostic unit 1204 may execute computer-executable instructions stored in the storage unit, so that the chip in the vehicle diagnostic apparatus 1201 performs the method performed by the to-be-diagnosed unit in either of Embodiment 1 and Embodiment 2. Optionally, the storage unit is a storage unit in the chip, for example, a register or a buffer. The storage unit may alternatively be a storage unit that is in the vehicle diagnostic apparatus 1201 and that is located outside the chip, for example, a ROM, another type of static storage device that can store static information and instructions, or a RAM.

For concepts, explanations, detailed descriptions, and other steps of the vehicle diagnostic apparatus 1201 that are related to the technical solutions provided in embodiments of this application, refer to the descriptions of the content in the methods or other embodiments. Details are not described herein again.

Figure 13:
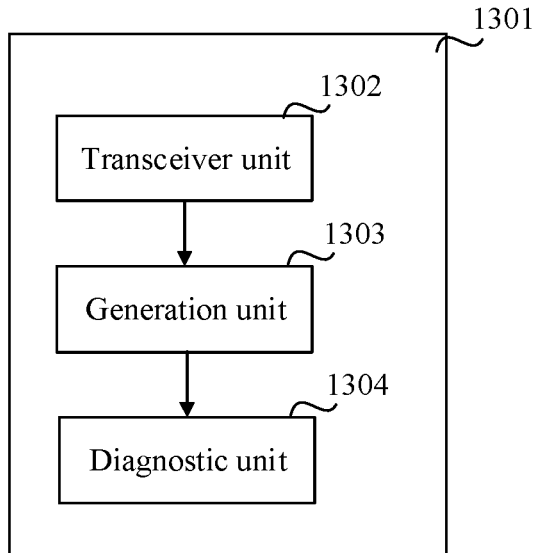
FIG. 13 is a schematic diagram of a structure of another vehicle diagnostic apparatus according to an embodiment of this application.

Based on the foregoing embodiments and the same concept, FIG. 13 is a schematic diagram of a vehicle diagnostic apparatus according to an embodiment of this application. As shown in FIG. 13, the vehicle diagnostic apparatus 1301 may be a to-be-diagnosed unit in a vehicle, or may be a chip or a circuit, for example, a chip or a circuit that may be disposed in a to-be-diagnosed unit. The to-be-diagnosed unit may be any ECU in the vehicle.

The vehicle diagnostic apparatus may correspond to the to-be-diagnosed unit in the methods. The vehicle diagnostic apparatus may implement the steps performed by the to-be-diagnosed unit in any one or more corresponding methods shown in FIG. 8. The vehicle diagnostic apparatus may include a transceiver unit 1302, a generation unit 1303, and a diagnostic unit 1304.

When the vehicle diagnostic apparatus 1301 is the to-be-diagnosed unit and implements the steps performed by the to-be-diagnosed unit in FIG. 8, the transceiver unit 1302 may receive a key authorization request sent by a diagnostic device; the generation unit 1303 may generate a temporary key based on the key authorization request; the transceiver unit 1302 may further send a key authorization response to the diagnostic device, where the key authorization response carries the temporary key; and the diagnostic unit 1304 may complete a diagnostic based on the temporary key. The temporary key is independent of a long-term key in the to-be-diagnosed vehicle.

The transceiver unit 1302 may be a sending unit or a transmitter when sending information. The transceiver unit 1302 may be a receiving unit or a receiver when receiving information. The transceiver unit 1302 may be a transceiver. The transceiver, the transmitter, or the receiver may be a radio frequency circuit. When the vehicle diagnostic apparatus 1301 includes a storage unit, the storage unit is configured to store computer instructions. The generation unit 1303 or the diagnostic unit 1304 may be communicatively connected to the storage unit. The generation unit 1303 or the diagnostic unit 1304 executes the computer instructions stored in the storage unit, so that the vehicle diagnostic apparatus 1301 may be configured to perform the method performed by the to-be-diagnosed unit in Embodiment 3. The generation unit 1303 or the diagnostic unit 1304 may be a general-purpose CPU, a microprocessor, or an ASIC.

When the vehicle diagnostic apparatus 1301 is a chip, the transceiver unit 1302 may be an input and/or output interface, a pin, a circuit, or the like. The generation unit 1303 or the diagnostic unit 1304 may execute computer-executable instructions stored in the storage unit, so that the chip in the vehicle diagnostic apparatus 1301 performs the method performed by the to-be-diagnosed unit in Embodiment 3. Optionally, the storage unit is a storage unit in the chip, for example, a register or a buffer. The storage unit may alternatively be a storage unit that is in the vehicle diagnostic apparatus 1301 and that is located outside the chip, for example, a ROM, another type of static storage device that can store static information and instructions, or a RAM.

For concepts, explanations, detailed descriptions, and other steps of the vehicle diagnostic apparatus 1301 that are related to the technical solutions provided in embodiments of this application, refer to the descriptions of the content in the methods or other embodiments. Details are not described herein again.

It should be understood that division of the units of the vehicle diagnostic apparatuses 1001, 1101, and 1201 is merely logical function division. In an actual implementation, all or some of the units may be integrated into one physical entity or may be physically separated. In embodiments of this application, the transceiver unit 1002, the transceiver unit 1102, the transceiver unit 1203, and the transceiver unit 1302 may be implemented by the transceiver 903 in FIG. 9, and the generation unit 1003, the configuration unit 1004, the diagnostic unit 1103, the obtaining unit 1202, the diagnostic unit 1204, the generation unit 1303, and the diagnostic unit 1304 may be implemented by the processor 902 in FIG. 9.

According to the methods provided in embodiments of this application, this application further provides a computer program product. The computer program product includes computer program code. When the computer program code is run on a computer, the computer is enabled to perform the method in any one of embodiments shown in FIG. 1 to FIG. 8.

According to the methods provided in embodiments of this application, this application further provides a computer-readable storage medium. The computer-readable medium stores program code. When the program code is run on a computer, the computer is enabled to perform the method in any one of embodiments shown in FIG. 1 to FIG. 8.

According to the methods provided in embodiments of this application, this application further provides a vehicle diagnostic system, including at least two of the key management system, the one or more diagnostic devices, and the one or more to-be-diagnosed units.

An embodiment of this application further provides a vehicle. The vehicle includes at least one to-be-diagnosed unit mentioned in the foregoing embodiments of this application, or the vehicle includes at least one key management system and at least one to-be-diagnosed unit mentioned in the foregoing embodiments of this application.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with illustrative logical blocks described in embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, such as a universal serial bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A vehicle diagnostic system in a vehicle and comprising:

a diagnostic device configured to send a key authorization request;

a to-be-diagnosed device; and a key management system configured to:

receive the key authorization request from the diagnostic device;

generate a temporary key based on the key authorization request, wherein the temporary key is independent of a long-term key in the vehicle and is for performing diagnostics;

send a key authorization response to the diagnostic device, wherein the key authorization response comprises the temporary key; and configure the temporary key for the to-be-diagnosed device in the vehicle, wherein the diagnostic device and the to-be-diagnosed device perform a diagnostic based on the temporary key, wherein the diagnostic device is further configured to:

receive the key authorization response from the key management system;

encrypt to-be-diagnosed information using the temporary key to generate a diagnostic request; and send the diagnostic request to the to-be-diagnosed device, wherein the to-be-diagnosed device is configured to:

obtain the temporary key from the key management system;

receive the diagnostic request from the diagnostic device;

decrypt the diagnostic request using the temporary key to obtain the to-be-diagnosed information;

perform a diagnostic operation based on the to-be-diagnosed information to obtain a diagnostic result; and send the diagnostic result to the diagnostic device, and wherein the diagnostic device is further configured to receive the diagnostic result from the to-be-diagnosed device.

2. The vehicle diagnostic system of claim 1, wherein the key management system is further configured to:

periodically receive, from the diagnostic device, a security heartbeat message within a validity duration corresponding to the temporary key; and set, when the security heartbeat message is not received within a preset period duration, the temporary key in the to-be-diagnosed device to be ineffective.

3. The vehicle diagnostic system of claim 2, wherein the security heartbeat message comprises first verification information, wherein the first verification information is based on at least one piece of characteristic information used when the temporary key is generated, and wherein the key management system is further configured to:

generate, when the diagnostic device is received within the preset period duration, second verification information based on the at least one piece of characteristic information used when the temporary key is generated; and continue to set, when determining that the second verification information matches the first verification information, the temporary key to be effective, wherein the diagnostic device is further configured to:

generate a first random value; and send the first random value to the key management system, wherein the key management system is further configured to:

generate a second random value; and send the second random value to the diagnostic device, wherein the at least one piece of characteristic information comprises at least one of an initial key, a feature identifier, the first random value, or the second random value that is preset, wherein the feature identifier indicates the to-be-diagnosed device.

4. The vehicle diagnostic system of claim 3, wherein the key authorization request comprises at least one piece of characteristic information, wherein the at least one piece of characteristic information comprises at least one of the first random value, the feature identifier, or an authorization code, wherein the authorization code indicates the diagnostic device, and wherein the key management system is configured to:

encrypt the at least one piece of characteristic information using a first symmetric key to generate a transmission security key;

encrypt the temporary key using the transmission security key to generate a ciphertext; and generate the key authorization response based on the ciphertext, wherein the diagnostic device is configured to perform decryption using the transmission security key and the ciphertext to obtain the temporary key.

5. The vehicle diagnostic system of claim 1, wherein the key management system is configured to set the temporary key in the to-be-diagnosed device to be ineffective after a validity duration corresponding to the temporary key expires.

6. The vehicle diagnostic system of claim 5, wherein the validity duration corresponding to the temporary key is pre-configured, indicated by the key authorization request, or corresponds to a time period between a diagnostic start and a diagnostic end.

7. The vehicle diagnostic system of claim 1, wherein the to-be-diagnosed device is pre-configured or indicated by the key authorization request.

8. The vehicle diagnostic system of claim 1, wherein the to-be-diagnosed device is configured to:

receive temporary key effective information from the key management system, wherein the temporary key effective information comprises the temporary key; and store the temporary key in a random-access memory (RAM) based on the temporary key effective information.

9. The vehicle diagnostic system of claim 8, wherein the to-be-diagnosed device is further configured to:

receive temporary key ineffective information from the key management system in the vehicle, wherein the temporary key ineffective information comprises the temporary key; and delete, based on the temporary key ineffective information, the temporary key stored in the RAM.

10. A vehicle diagnostic apparatus, comprising:

at least one memory configured to store program instructions; and one or more processors coupled to the at least one memory and configured to execute the program instructions to cause the vehicle diagnostic apparatus to:

receive, from a diagnostic device, a key authorization request comprising at least one piece of characteristic information, the at least one piece of characteristic information comprises an authorization code that indicates the diagnostic device;

generate a temporary key based on the key authorization request, wherein the temporary key is independent of a long-term key in a vehicle;

encrypt the at least one piece of characteristic information using a first symmetric key to generate a transmission security key;

encrypt the temporary key using the transmission security key to generate a ciphertext;

generate a key authorization response based on the ciphertext, wherein the key authorization response comprises the temporary key;

send the key authorization response to the diagnostic device, wherein the diagnostic device is configured to perform decryption using the transmission security key and the ciphertext to obtain the temporary key; and configure the temporary key for a to-be-diagnosed device in the vehicle, wherein the diagnostic device and the to-be-diagnosed device perform a diagnostic based on the temporary key.

11. The vehicle diagnostic apparatus of claim 10, wherein the one or more processors are further configured to execute the program instructions to cause the vehicle diagnostic apparatus to set, when a security heartbeat message from the diagnostic device is not received within a preset period duration, the temporary key in the to-be-diagnosed device to be ineffective, wherein the security heartbeat message is periodically received from the diagnostic device within a validity duration corresponding to the temporary key.

12. The vehicle diagnostic apparatus of claim 10, wherein the one or more processors are further configured to execute the program instructions to cause the vehicle diagnostic apparatus to set the temporary key in the to-be-diagnosed device to be ineffective after a validity duration corresponding to the temporary key expires.

13. The vehicle diagnostic apparatus of claim 12, wherein the validity duration corresponding to the temporary key is pre-configured, indicated by the key authorization request, or corresponds to a time period between a diagnostic start and a diagnostic end.

14. The vehicle diagnostic apparatus of claim 10, wherein the to-be-diagnosed device is pre-configured or indicated by the key authorization request.

15. A vehicle diagnostic apparatus, comprising:

at least one memory configured to store program instructions; and one or more processors coupled to the at least one memory and configured to execute the program instructions to cause the vehicle diagnostic apparatus to:

send a key authorization request to a key management system in a vehicle to generate a temporary key and configure the temporary key for a to-be-diagnosed device in the vehicle, wherein the temporary key is independent of a long-term key in the vehicle;

receive a key authorization response from the key management system, wherein the key authorization response comprises the temporary key;

encrypt to-be-diagnosed information using the temporary key to generate a diagnostic request;

send the diagnostic request to the to-be-diagnosed device; and initiate a diagnostic operation on the to-be-diagnosed device based on the diagnostic request.

16. The vehicle diagnostic apparatus of claim 15, wherein the one or more processors are further configured to execute the program instructions to cause the vehicle diagnostic apparatus to send a security heartbeat message to the key management system based on a preset period duration within a validity duration corresponding to the temporary key, wherein the key management system uses the security heartbeat message to continue to set the temporary key to be effective.

17. The vehicle diagnostic apparatus of claim 16, wherein the one or more processors are further configured to execute the program instructions to cause the vehicle diagnostic apparatus to:

generate first verification information based on at least one piece of characteristic information used when the temporary key is generated; and generate the security heartbeat message based on the first verification information, wherein the first verification information is used by the key management system to verify the security heartbeat message, wherein the vehicle diagnostic apparatus is further configured to:

generate a first random value; and send the first random value to the key management system, wherein the key management system is further configured to:

generate a second random value; and send the second random value to the vehicle diagnostic apparatus, wherein the at least one piece of characteristic information comprises at least one of an initial key, a feature identifier, the first random value, or the second random value that is preset, wherein the feature identifier indicates the to-be-diagnosed device.

18. The vehicle diagnostic apparatus of claim 16, wherein the validity duration corresponding to the temporary key is pre-configured, indicated by the key authorization request, or corresponds to a time period between a diagnostic start and a diagnostic end.

19. The vehicle diagnostic apparatus of claim 15, wherein the to-be-diagnosed device is pre-configured.

20. The vehicle diagnostic apparatus of claim 15, wherein the to-be-diagnosed device is indicated by the key authorization request.

* * * * *